(12) United States Patent
Obunai

(10) Patent No.: US 10,942,093 B2
(45) Date of Patent: Mar. 9, 2021

(54) POWDER COLLECTOR, POWDER COLLECTION DEVICE, AND AUTOMATIC POWDER COLLECTING SYSTEM

(71) Applicant: TANABE ENGINEERING CORPORATION, Zyouetsu (JP)

(72) Inventor: Takashi Obunai, Tokyo (JP)

(73) Assignee: TANABE ENGINEERING CORPORATION, Zyouetsu (JP)

( * ) Notice: Subject to any disclaimer, the term of this patent is extended or adjusted under 35 U.S.C. 154(b) by 103 days.

(21) Appl. No.: 16/091,351

(22) PCT Filed: Apr. 6, 2017

(86) PCT No.: PCT/JP2017/014321
§ 371 (c)(1),
(2) Date: Oct. 4, 2018

(87) PCT Pub. No.: WO2017/175821
PCT Pub. Date: Oct. 12, 2017

(65) Prior Publication Data
US 2019/0120729 A1    Apr. 25, 2019

(30) Foreign Application Priority Data

Apr. 7, 2016   (JP) .............................. JP2016-077053

(51) Int. Cl.
*B01J 4/00*    (2006.01)
*G01N 1/08*    (2006.01)
(Continued)

(52) U.S. Cl.
CPC ................ *G01N 1/08* (2013.01); *B01J 4/002* (2013.01); *B01J 4/007* (2013.01); *B01J 4/02* (2013.01);
(Continued)

(58) Field of Classification Search
CPC ...... G01N 1/08; G01N 35/10; G01N 35/0099; G01N 2035/00188; G01N 2035/00217;
(Continued)

(56) References Cited

U.S. PATENT DOCUMENTS 5,544,683 A * 8/1996 Guhl ........................ B06B 1/18
141/65
6,232,129 B1 * 5/2001 Wiktor .................... B01L 3/021
422/417
(Continued)

FOREIGN PATENT DOCUMENTS

DE   102012105241 A1 * 12/2013 .......... B25J 15/0491
JP   H03-113327 A      5/1991
(Continued)

OTHER PUBLICATIONS

JPH-10263421-A_English_Translation_of_Specification.pdf (Year: 1998).*
(Continued)

*Primary Examiner* — Mary E McManmon
*Assistant Examiner* — Stephanie A Shrieves
(74) *Attorney, Agent, or Firm* — Birch, Stewart, Kolasch & Birch, LLP

(57) ABSTRACT

Provided is a powder collector or the like, which is capable of efficiently performing the work of collecting each powder of a different kind and the like while easily preventing a foreign matter such as another kind of powder from being mixed. The powder collector includes: a connecting part (12) having an air passage (11) that is to be removably connected to a pipe (35) for air intake and air supply; a collecting part (14) having an air passage (13) in which powder is collected to be kept through use of a suction force caused by air intake from the pipe (35) reaching the air passage (13) of the collecting part (14) through the air (Continued)

passage (11) of the connecting part (12) and from which the collected powder is discharged through use of a discharge force caused by air supply from the pipe (35); a first filter part (15), which is arranged at a midway position of the air passage (13) of the collecting part (14) and is configured to block passage of the powder to be collected; a relaying part (17) having an air passage (16) connecting the air passage (11) of the connecting part (12) and the collecting part (14) to each other; and a second filter part (18), which is arranged at a midway position of the air passage (16) of the relaying part (17) or in an end portion of the relaying part (17) on the connecting part (12) side, and is configured to block passage of the powder having passed through the first filter part (15).

5 Claims, 62 Drawing Sheets

(51) Int. Cl.
 *B01J 4/02* (2006.01)
 *G01N 35/10* (2006.01)
 *B01L 3/02* (2006.01)
 *G01N 35/00* (2006.01)
(52) U.S. Cl.
 CPC .......... *B01L 3/021* (2013.01); *G01N 35/0099* (2013.01); *G01N 35/10* (2013.01); *B01L 2200/04* (2013.01); *B01L 2200/0657* (2013.01); *B01L 2300/0681* (2013.01); *G01N 2035/00188* (2013.01); *G01N 2035/00217* (2013.01)
(58) Field of Classification Search
 CPC ....... B01J 4/007; B01J 4/00; B01J 4/02; B01J 4/002; B65B 1/22; B65B 1/20; B65B 1/04; B65B 1/08; B65B 37/04; B67C 3/004; B01L 3/021; B01L 2200/0657; B01L 2300/0681; B01L 2200/04
 USPC .......................................... 141/69, 71–75, 90
 See application file for complete search history.

(56) References Cited

U.S. PATENT DOCUMENTS

| | | | | |
|---|---|---|---|---|
| 7,134,459 | B2 * | 11/2006 | Carlson ................... | B01F 3/188 141/130 |
| 7,449,342 | B2 * | 11/2008 | Kane ......................... | B01F 3/18 221/224 |
| 7,617,849 | B2 * | 11/2009 | Dubois ..................... | B65B 1/32 141/165 |
| 8,087,314 | B2 * | 1/2012 | Matsusaka ............. | G01N 11/06 73/866 |
| 2004/0122222 | A1 * | 6/2004 | Sakurai ................. | G01N 35/109 536/25.4 |
| 2004/0146434 | A1 | 7/2004 | Kane et al. | |
| 2004/0261897 | A1 * | 12/2004 | Carlson ..................... | B65B 1/16 141/130 |
| 2005/0265900 | A1 * | 12/2005 | Gard ....................... | B01L 9/543 422/400 |
| 2006/0177352 | A1 * | 8/2006 | Ziegmann ................. | B01L 3/02 422/400 |
| 2008/0182340 | A1 * | 7/2008 | Lemmo ................. | B01L 3/0289 436/180 |
| 2009/0056826 | A1 * | 3/2009 | Mertens .................... | B65B 1/36 141/1 |
| 2009/0294385 | A1 * | 12/2009 | Tajima ................. | B01D 61/145 210/808 |
| 2012/0145806 | A1 * | 6/2012 | Yang ..................... | G01F 13/001 239/102.1 |
| 2013/0203089 | A1 * | 8/2013 | Wingo ................... | B01L 3/021 435/7.92 |
| 2013/0280143 | A1 * | 10/2013 | Zucchelli ........... | G01N 35/0099 422/501 |

FOREIGN PATENT DOCUMENTS

| | | | |
|---|---|---|---|
| JP | H06-503749 A | | 4/1994 |
| JP | H10-263421 A | | 10/1998 |
| JP | H-10263421 A | * | 10/1998 |
| JP | H10263421 A | * | 10/1998 |
| JP | 2000-266643 A | | 9/2000 |
| JP | 2006-231326 A | | 9/2006 |
| JP | 2013-542849 A | | 11/2013 |
| WO | WO 92/08964 A1 | | 5/1992 |
| WO | WO 2006/123688 A1 | | 11/2006 |
| WO | WO 2012/040333 A | | 3/2012 |

OTHER PUBLICATIONS

DE-102012105241-A1_English_Translation_of_Specification.pdf(Year: 2013).*
English translation of International Preliminary Report on Patentability and Written Opinion dated Oct. 18, 2018, in PCT/JP2017/014321 (Forms PCT/IB/338, PCT/IB/373, and PCT/ISA/237).
Extended European Search Report dated Aug. 1, 2019, in European Patent Application No. 17779199.3.
International Search Report for PCT/JP2017/014321 (PCT/ISA/210) dated Jul. 4, 2017.
Written Opinion of the International Searching Authority for PCT/JP2017/014321 (PCT/ISA/237) dated Jul. 4, 2017.
European Patent Office Communication under Rule 71(3) EPC issued in the corresponding European Patent Application No. 17779199.3 dated Apr. 22, 2020.

* cited by examiner (a)

(b)

(a)

(b)

POWDER COLLECTOR, POWDER COLLECTION DEVICE, AND AUTOMATIC POWDER COLLECTING SYSTEM

TECHNICAL FIELD

The present invention relates to a powder collector to be used in a work step of collecting, moving, and discharging a small amount of powder in work of analysis, a test, formulation, medicine manufacture, and the like which are performed through use of a powder sample, and relates to a powder collecting device and an automatic powder collecting system which use the powder collector.

BACKGROUND ART

As a tool and a device configured to collect a small amount of powder, those exemplified below have hitherto been known.

For example, there has been known a powder dispensing device (Patent Literature 1) including a powder dispensing tip, a nozzle, a suction means, pressure means, and means for switching those two means. The powder dispensing tip includes a filter, which is provided at a dropper-like distal end hole of the tip and has fine pores capable of retaining powder to be dispensed. The nozzle has a distal end configured to removably hold the tip. The suction device is connectable to the nozzle. The pressure means is connectable to the nozzle.

Further, there has been known a powder particle fixed quantity distributor (Patent Literature 2) including a cylindrical body and a rod. The rod is inserted into the cylindrical body so as to be movable in an axial direction and is arranged so as to be protrudable and retractable at one end portion of the cylindrical body. A recessed measuring part configured to retain a fixed quantity of a powder particle sample is formed at a peripheral drum portion of the protruding and retracting part of the rod.

CITATION LIST

Patent Literature

[PTL 1] JP 10-263421 A
[PTL 2] JP 2000-266643 A

SUMMARY OF INVENTION

Technical Problem

However, the powder dispensing device disclosed in Patent Literature 1 has a problem in that, when different kinds of powder are to be collected, fine powder having passed through the filter arranged in the powder dispensing tip may be mixed with subsequent powder of a different kind when the subsequent powder of a different kind is collected and discharged. That is, in the powder dispensing device, a filter stopper may be mounted to a distal end opening of the nozzle holding the powder dispensing tip, but the filter stopper is not replaced even when the powder dispensing tip is replaced. Therefore, in the powder dispensing device, the fine powder adhering to and remaining on the filter stopper is separated from the filter stopper when being pressurized with compressed air at a time when the subsequent powder of a different kind is collected and discharged, and thereafter also passes through the filter on the powder dispensing tip to be discharged in some cases. As a result, the previous powder may be mixed with the subsequent powder of a different kind.

Further, the powder particle fixed quantity distributor disclosed in Patent Literature 2 has a problem in that, even when the work of collecting a plurality of different kinds of powder and the like are performed, the powder particle fixed quantity distributor cannot be used because measures against mixing of different kinds of powder are not taken. When the powder particle fixed quantity distributor is used for collecting a plurality of different kinds of powder, every time the work of collecting powder of a different kind and the like are performed, it is required to perform the work of cleaning the powder particle fixed quantity distributor, with the result that the work becomes significantly complicated.

Besides, some of powder samples are harmful for human bodies and the like. Therefore, in particular, when it is required to perform the work of collecting harmful powder and the like, it is desired that the work of collecting harmful powder and the like be automated through use of a robot device or the like without being manually performed.

The present invention has been made in view of the above-mentioned circumstances and provides a powder collector capable of efficiently performing the work of collecting each powder of a different kind and the like while easily preventing a foreign matter such as another kind of powder from being mixed, and a powder collecting device which uses the powder collector. The present invention also provides an automatic powder collecting system capable of performing the work of collecting each powder of a different kind and the like through use of the powder collecting device by automation.

Further, the present invention provides an automatic powder collecting system having a simple configuration, which is capable of efficiently performing the work of collecting powder and the like by automation.

Solution to Problem

According to the invention (A1), provided is a powder collector, including: a connecting part having an air passage to be removably connected to a pipe for air intake and air supply; a collecting part having an air passage in which powder is collected to be kept through use of a suction force caused by air intake from the pipe reaching the air passage of the collecting part through the air passage of the connecting part and from which the collected powder is discharged through use of a discharge force caused by air supply from the pipe; a first filter part, which is arranged at a midway position of the air passage of the collecting part, and is configured to block passage of the powder to be collected; a relaying part having an air passage connecting the air passage of the connecting part and the collecting part to each other; and a second filter part, which is arranged at a midway position of the air passage of the relaying part or in an end portion of the relaying part on the connecting part side, and is configured to block passage of the powder having passed through the first filter part.

According to a powder collector of the invention (A2), in the powder collector of the invention A1, the second filter part includes: a storage container which has a storage space having a setting area larger than an opening area of the air passage of the relaying part; and a porous material set in the storage space of the storage container.

According to a powder collector of the invention (A3), in the powder collector of the invention A1, the collecting part is configured as a component that is removably mounted together with the first filter part to an end portion of the relaying part on a side opposite to the connecting part directly or through intermediation of a connecting pipe for adaptation.

Further, according to the invention (B1), provided is a powder collecting device, including: a support in which a pipe for air intake and air supply is arranged; and a plurality of powder collectors, which are used by being removably mounted to the support, and are configured to collect powder through use of a suction force caused by air intake from the pipe and discharge the collected powder through use of a discharge force caused by air supply from the pipe. The powder collector includes the powder collector of any one of the inventions A1 to A3.

According to a powder collecting device of the invention (B2), in the powder collecting device of the invention B1, the connecting part of the powder collector includes a site to be attracted to and connected to the support by magnetic force, and the support includes a mounting part in which the connecting part of the powder collector is fitted and a magnet configured to cause the connecting part to be attracted to the support by the magnetic force is arranged.

According to a powder collecting device of the invention (B3), in the powder collecting device of the invention B1, the connecting part of the powder collector includes a site to be connected to the support with a one-touch mounting and dismounting joint, and the support includes a mounting part to be connected to the connecting part of the powder collector with the one-touch mounting and dismounting joint.

According to a powder collecting device of the invention (B4), in the powder collecting device of the invention B1, the support includes a vibration device configured to vibrate the powder collector mounted to the support.

According to a powder collecting device of the invention (B5), in the powder collecting device of the invention B1, the support includes a coupling part to be removably coupled to a robot hand.

According to a powder collecting device of the invention (B6), in the powder collecting device of the invention B1, the support includes: a gripping part to be gripped by a hand; and a manipulation part to be manipulated by hand after selection of an operation.

According to a powder collecting device of the invention (B7), the powder collection device of the invention B6 further includes: an air intake device, which is connected to the support through intermediation of the pipe, and is configured to perform air intake; and an air supply device, which is connected to the support through intermediation of the pipe, and is configured to perform air supply.

According to the invention (B8), provided is a powder collecting device, including: a pipe for air intake and air supply including a connected part; and a plurality of powder collectors, which are used by being removably mounted to the connected part of the pipe, and are configured to collect powder through use of a suction force caused by air intake from the pipe and discharge the collected powder through use of a discharge force caused by air supply from the pipe. The powder collector includes the powder collector of any one of the inventions A1 to A3.

According to a powder collecting device of the invention (B9), in the powder collecting device of the invention B8, the connecting part of the powder collector includes a site to be connected to the connected part of the pipe with a one-touch mounting and dismounting joint, and the connected part of the pipe includes a mounting part to be connected to the connecting part of the powder collector with the one-touch mounting and dismounting joint.

According to a powder collecting device of the invention (B10), in the powder collecting device of the invention B8, the connected part of the pipe and the connecting part of the powder collector each include a site to be gripped and held by a robot hand.

According to a powder collecting device of the invention (B11), the powder collecting device of the invention B8 further includes: an air intake device, which is connected to the pipe, and is configured to perform air intake; and an air supply device, which is connected to the pipe, and is configured to perform air supply.

According to the invention (C1), provided is an automatic powder collecting system, including: the powder collecting device of any one of the inventions B1 to B6; an air intake device, which is connected to the support of the powder collecting device through intermediation of the pipe, and is configured to perform air intake; an air supply device, which is connected to the support of the powder collecting device through intermediation of the pipe, and is configured to perform air supply; and a robot device including a robot arm and a robot hand that are operated so as to perform at least work of collecting, moving, and discharging the powder with the powder collector being mounted to the support of the powder collecting device.

According to an automatic powder collecting system of the invention (C2), in the system of the invention C1, the robot device is configured to cause the robot arm to perform work of replacing the powder collector to be mounted to the support.

According to an automatic powder collecting system of the invention (C3), in the system of the invention C1, the robot device is configured to cause the robot arm and the robot hand to hold the powder collector so that the collecting part is laid down after the work of collecting the powder is finished and to perform the work of moving and discharging the powder while holding the powder collector under a state in which the collecting part is laid down.

According to an automatic powder collecting system of the invention (C4), the system of the invention C3 further includes an auxiliary vibration member with which a part of the powder collector is capable of being brought into contact with when the work of discharging the powder is performed. When the work of discharging the powder is performed, the robot arm and the robot hand of the robot device move the powder collector to a position at which the part of the powder collector is capable of being brought into contact with the auxiliary vibration member, and the vibration device in the support of the powder collecting device is operated to vibrate the powder collector.

According to an automatic powder collecting system of the invention (C5), the system of the invention C3 further includes an auxiliary vibration member with which a part of the powder collector is capable of being brought into contact when the work of discharging the powder is performed. When the work of discharging the powder is performed, the robot arm and the robot hand of the robot device move the powder collector to a position at which the part of the powder collector is capable of being brought into contact with the auxiliary vibration member, and the vibration device in the support of the powder collecting device is operated to vibrate the powder collector.

According to an automatic powder collecting system of the invention (C6), in the system of the invention C1, the robot device is configured to cause the robot arm and the robot hand to move the powder collector to a cleaning position, directly or after the collecting part is removed, to perform work of cleaning, and the air supply device is configured to supply air to the powder collector having moved to the cleaning position.

According to an automatic powder collecting system of the invention (C7), in the system of the invention C6, the support includes a vibration device configured to vibrate the powder collector mounted to the support, and the powder collecting device is configured so that the vibration device in the support vibrates the powder collector when being moved to the cleaning position to be cleaned.

According to the invention (C8), provided is an automatic powder collecting system, including: the powder collecting device of any one of the inventions B8 to B10; an air intake device, which is connected to the pipe of the powder collecting device, and is configured to perform air intake; an air supply device, which is connected to the pipe of the powder collecting device, and is configured to perform air supply; and a robot device including a robot arm and a robot hand that are operated so as to perform at least work of collecting, moving, and discharging the powder with the powder collector being connected to the pipe of the powder collecting device.

According to an automatic powder collecting system of the invention (C9), in the system of the invention C8, the robot device is configured to cause the robot arm and the robot hand to perform work of replacing the powder collector to be mounted to the pipe.

According to an automatic powder collecting system of the invention (C10), the system of the invention C8 further includes a first vibration applying device configured to apply vibration to the powder collector by being brought into contact with a part of the powder collector when the work of collecting the powder is finished. The automatic powder collecting system is configured so that, when the work of collecting the powder is finished, the robot arm and the robot hand of the robot device move the powder collector to a position at which the part of the powder collector is brought into contact with the first vibration applying device, and the first vibration applying device applies vibration to the powder collector.

According to an automatic powder collecting system of the invention (C11), in the system of the invention C8, the robot device is configured to cause the robot arm and the robot hand to hold the powder collector so that the collecting part is laid down after the work of collecting the powder is finished and to perform the work of moving and discharging the powder while holding the powder collector under a state in which the collecting part is laid down.

According to an automatic powder collecting system of the invention (C12), the system of the invention C11 further includes a second vibration applying device configured to apply vibration to the powder collector by being brought into contact with a part of the powder collector when the work of discharging the powder is performed. The automatic powder collecting system is configured so that, when the work of discharging the powder is performed, the robot arm and the robot hand of the robot device move the powder collector to a position at which the part of the powder collector is brought into contact with the second vibration applying device, and the second vibration applying device applies vibration to the powder collector.

According to an automatic powder collecting system of the invention (C13), in the system of the invention C11, a container which is configured to take in the powder discharged from the powder collector through an upper end opening and accommodate the powder is set so that the upper end opening is inclined. When the work of discharging the powder is performed, the robot arm and the robot hand of the robot device move the powder collector so that the collecting part enters the container from the upper end opening under a state of being inclined.

According to an automatic powder collecting system of the invention (C14), in the system of the invention C8, the robot device is configured to cause the robot arm and the robot hand to move the powder collector to a cleaning position, directly or after the collecting part is removed, to perform work of cleaning, and the air supply device is configured to supply air to the powder collector having moved to the cleaning position.

According to an automatic powder collecting system of the invention (C15), the system of the invention C14 further includes a third vibration applying device configured to apply vibration to the powder collector having been moved to the cleaning position by being brought into contact with a part of the powder collector. The third vibration applying device is configured to apply vibration to the powder collector having been moved to the cleaning position.

According to the invention (C16), provided is an automatic powder collecting system, including: a powder collecting device including: a pipe for air intake and air supply including a connected part; and a plurality of powder collectors each including: a connecting part having an air passage to be connected to the pipe; a collecting part having an air passage in which powder is collected to be kept through use of a suction force caused by air intake from the pipe reaching the air passage of the collecting part through the air passage of the connecting part and from which the collected powder is discharged through use of a discharge force caused by air supply from the pipe; a relaying part having an air passage connecting the air passage of the connecting part and the air passage of the collecting part to each other; and a filter part, which is arranged at a predetermined position of the air passage in the collecting part and is configured to block passage of the powder to be collected; an air intake device, which is connected to the pipe of the powder collecting device, and is configured to perform air intake; an air supply device, which is connected to the pipe of the powder collecting device, and is configured to perform air supply; and a robot device including a robot arm and a robot hand that are operated so as to perform at least work of collecting, moving, and discharging the powder with the powder collector being mounted through intermediation of the pipe of the powder collecting device.

According to an automatic powder collecting system of the invention (C17), in the system of the invention C16, the robot device is configured to cause the robot arm to perform work of replacing the collecting part in the powder collector.

According to an automatic powder collecting system of the invention (C18), the system of the invention C16 further includes a first vibration applying device configured to apply vibration to the powder collector by being brought into contact with a part of the powder collector when the work of collecting the powder is finished. The automatic powder collecting system is configured so that, when the work of collecting the powder is finished, the robot arm and the robot hand of the robot device move the powder collector to a position at which the part of the powder collector is brought into contact with the first vibration applying device, and the first vibration applying device applies vibration to the powder collector.

According to an automatic powder collecting system of the invention (C19), in the system of the invention C16, the robot device is configured to cause the robot arm and the robot hand to hold the powder collector so that the collecting part is laid down after the work of collecting the powder is finished and to perform the work of moving and discharging the powder while holding the powder collector under a state in which the collecting part is laid down.

According to an automatic powder collecting system of the invention (C20), the system of the invention C19 further includes a second vibration applying device configured to apply vibration to the powder collector by being brought into contact with a part of the powder collector when the work of discharging the powder is performed. The automatic powder collecting system is configured so that, when the work of discharging the powder is performed, the robot arm and the robot hand of the robot device move the powder collector to a position at which the part of the powder collector is brought into contact with the second vibration applying device, and the second vibration applying device applies vibration to the powder collector.

According to an automatic powder collecting system of the invention (C21), in the system of the invention C19, a container which is configured to take in the powder discharged from the powder collector through an upper end opening and accommodate the powder is set so that the upper end opening is inclined, and, when the work of discharging the powder is performed, the robot arm and the robot hand of the robot device move the powder collector so that the collecting part enters the container from the upper end opening under a state of being inclined.

According to an automatic powder collecting system of the invention (C22), in the system of the invention C16, the robot device is configured to cause the robot arm and the robot hand to move the powder collector to a cleaning position, directly or after the collecting part is removed, to perform work of cleaning, and the air supply device is configured to supply air to the powder collector having moved to the cleaning position.

According to an automatic powder collecting system of the invention (C23), the system of the invention C22 further includes a third vibration applying device configured to apply vibration to the powder collector having been moved to the cleaning position by being brought into contact with a part of the powder collector. The third vibration applying device is configured to apply vibration to the powder collector having been moved to the cleaning position.

According to an automatic powder collecting system of the invention (C24), the system of the invention C22 further includes a diselectrifying device configured to diselectrify the powder collector having been moved to the cleaning position. The diselectrifying device is configured to diselectrify the powder collector having been moved to the cleaning position.

Advantageous Effects of Invention

In the powder collector of the invention A1, the passage of powder is blocked by the first filter part or the second filter part. Therefore, when the work of collecting different kinds of powder and the like are performed through use of a plurality of powder collectors while replacing the powder collectors, the work can be efficiently performed while a foreign matter such as another kind of powder is prevented from being mixed.

In the powder collecting device of the inventions B1 and B8, the plurality of powder collectors each including the first filter part and the second filter part can be used by being removably mounted to the support or the pipe while being replaced. Therefore, the work of collecting different kinds of powder and the like can be efficiently performed while a foreign matter such as another kind of powder is prevented from being mixed.

In the automatic powder collecting system of the inventions C1 and C8, the powder collecting device can be used by automation with the robot device. Therefore, the work of collecting different kinds of powder and the like can be further efficiently performed automatically while a foreign matter such as another kind of powder is prevented from being mixed. Further, in the automatic powder collecting system of the invention C16, the powder collecting device having a simple configuration can be used by automation with the robot device. Therefore, the work of collecting different kinds of powder and the like can be automatically and efficiently performed while mixing of a foreign matter such as another kind of powder is suppressed.

Further, in the automatic powder collecting system of the inventions C1, C8, and C16, even when it is required to perform the work of collecting powder harmful for human bodies and the like, the work can be performed by automation through use of the robot device, and hence the work can be efficiently performed without involving adverse effects on human bodies.

DESCRIPTION OF EMBODIMENTS

Now, modes for carrying out the present invention (simply referred to as "embodiments") are described with reference to the accompanying drawings.

First Embodiment

Figure 1:
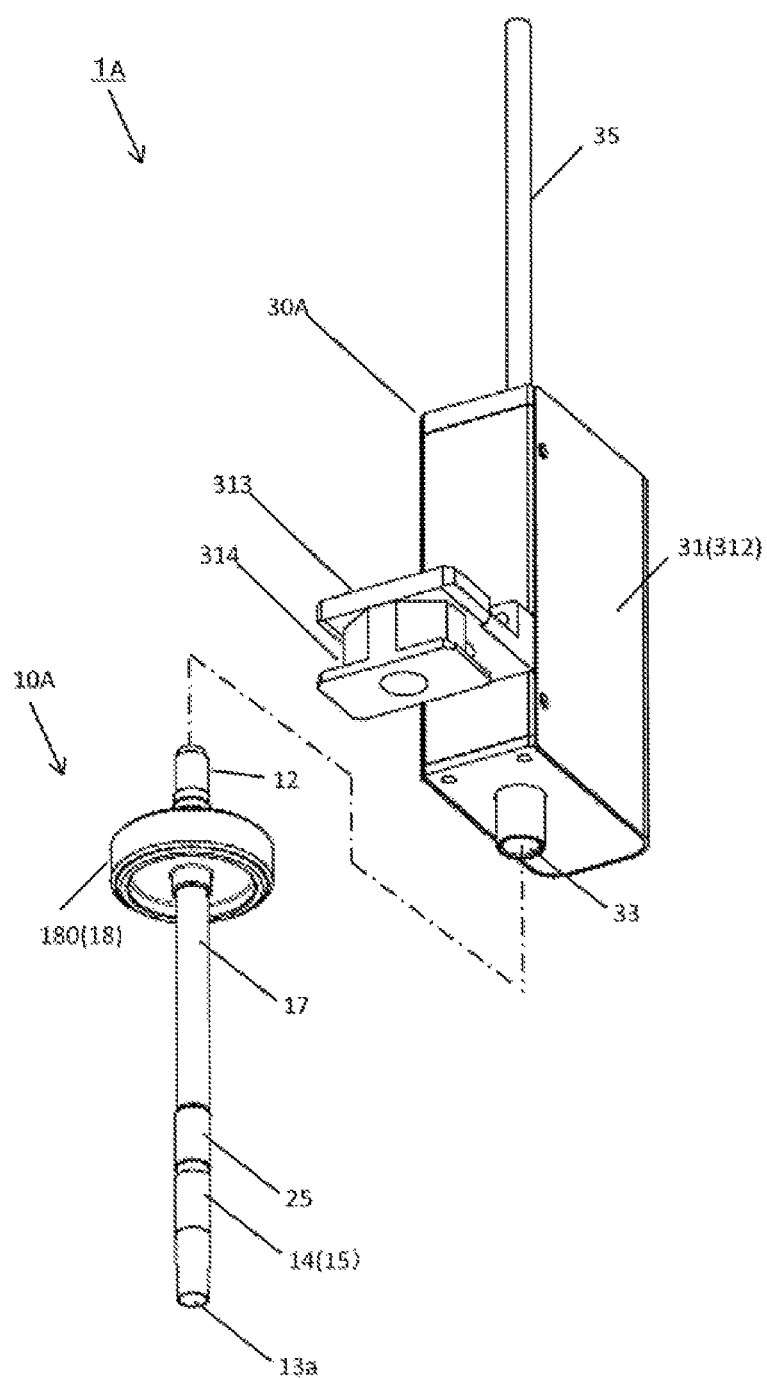
FIG. 1 is a perspective view for illustrating one state (state in which a powder collector and a support are separated from each other) of a powder collecting device according to a first embodiment.
Figure 2:
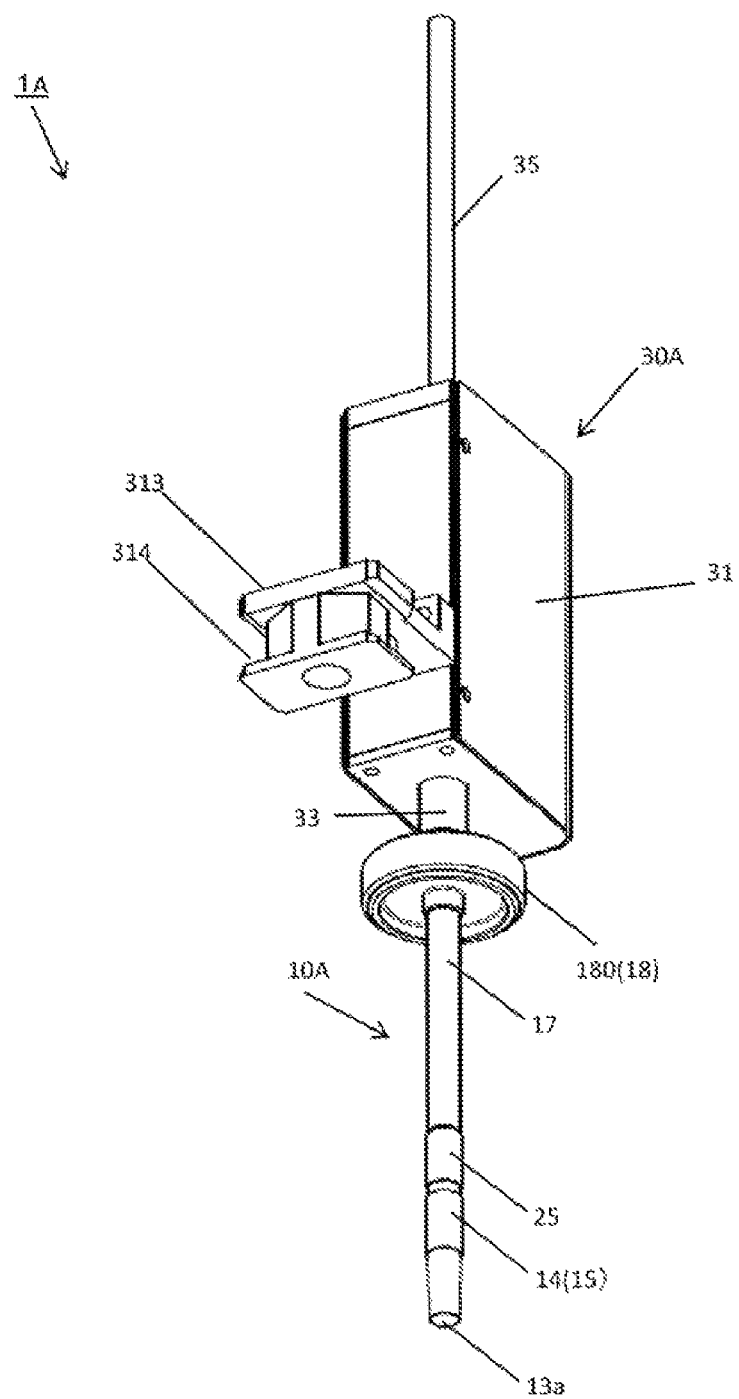
FIG. 2 is a perspective view for illustrating another state (state in which the powder collector and the support are integrated with each other) of the powder collecting device of FIG. 1.
Figure 3:
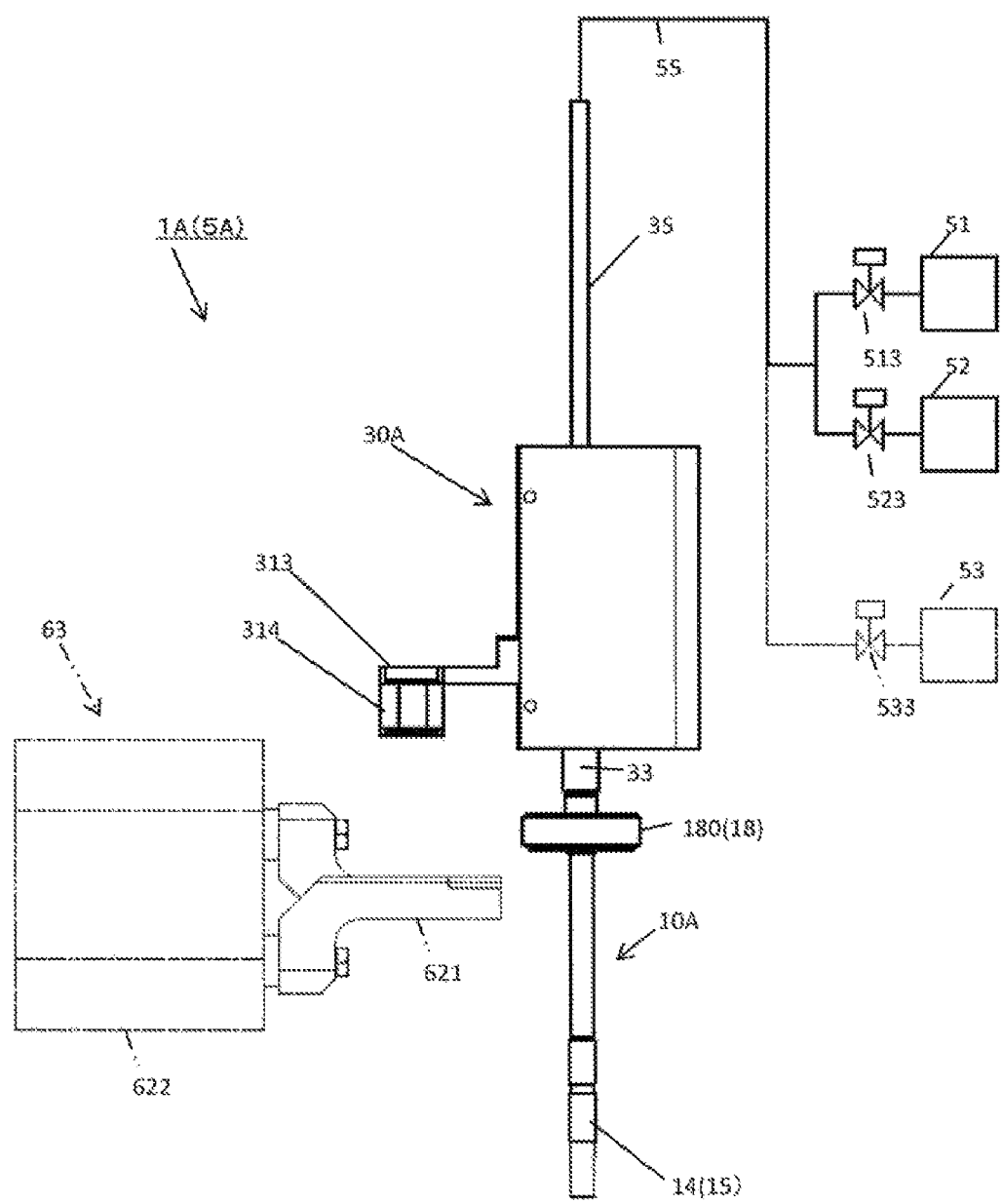
FIG. 3 is an explanatory view for illustrating an overview of a system component of an automatic powder collecting system including the powder collecting device according to the first embodiment.

FIG. 1 to FIG. 3 are each a view for illustrating a powder collecting device 1A using a powder collector 10A according to a first embodiment. FIG. 1 is a view for illustrating a state in which the powder collector 10A and a support 30A in the powder collecting device 1A are separated from each other (actually, a state in which the powder collector 10A is removed from the support 30A). FIG. 2 is a view for illustrating a state in which the powder collector 10A and the support 30A are integrated with each other (actually, a state in which the powder collector 10A is mounted to the support 30A). FIG. 3 is a view for illustrating an overview of a system component 5A forming main portions of an automatic powder collecting system when the powder collecting device 1A is used in combination with a robot device.

<Configuration of Powder Collecting Device>

As illustrated in FIG. 1, FIG. 2, and the like, the powder collecting device 1A is a device at least including the support 30A in which a pipe 35 for air intake and air supply is arranged, and a plurality of powder collectors 10A, which are used by being removably mounted to the support 30A and are configured to collect powder through use of a suction force caused by air intake from the pipe 35 and discharge the collected powder through use of a discharge force caused by air supply from the pipe 35. In FIG. 1, FIG. 2, and the like, only one of the plurality of powder collectors 10A is illustrated for convenience.

In this case, as powder to be handled by the powder collecting device 1A (powder collector 10A), there are given, for example, a raw material for medicine, an intermediate product thereof, and a material for a chemical drug (having an average particle diameter of, for example, from 1 μm to 1 mm).

<Configuration of Powder Collector>

Specifically, as illustrated in FIG. 1, FIG. 2, FIG. 4 to FIG. 6, and the like, the powder collector 10A includes a connecting part 12, a collecting part 14, a first filter part 15, a relaying part 17, and a second filter part 18. The connecting part 12 is removably mounted to the support 30A, and has an air passage 11 to be connected to the pipe 35 of the support 30A. The collecting part 14 has an air passage 13 in which powder is collected to be kept through use of the above-mentioned suction force reaching the air passage 13 of the collecting part 14 through the air passage 11 of the connecting part 12. The first filter part 15 is arranged at a midway position of the air passage 13 of the collecting part 14, and is configured to block passage of the powder to be collected. The relaying part 17 has an air passage 16 connecting the air passage 11 of the connecting part 12 and the collecting part 14 to each other. The second filter part 18 is arranged in an end portion of the air passage 16 of the relaying part 17 on the connecting part 12 side, and is configured to block passage of the powder having passed through the first filter part 15.

The connecting part 12 is a site that is located on an upper end side of the powder collector 10A at a time of use. The connecting part 12 includes a cylindrical two-stage fitting portion 121 to be fitted in a mounting part (33) described later in the support 30A. The cylindrical air passage 11 is continuously formed on an inner side of the fitting portion 121. An opening of the air passage 11 positioned at an upper end of the fitting portion 121 is formed as a connecting port 11a to be used for connection to the pipe 35. Further, a groove 123 in which a ring member (O-ring) 124 made of a rubber or the like is fitted is formed in a large-diameter portion of the fitting portion 121 on a lower stage side. The ring member 124 is mounted in order to ensure adhesiveness between the connecting part 12 and the mounting part (33).

In the connecting part 12 in the first embodiment, a container upper portion 181 serving as an upper portion of a storage container (180) described later in the second filter part 18 is formed at a lower end of the fitting portion 121. The container upper portion 181 has a shape including a disc-like upper surface portion having a diameter larger than that of (the air passage 11 of) an upper end portion 122 of the connecting part 12, and an annular side wall portion hanging from the periphery of the upper surface portion. In the container upper portion 181, a disc-like storage space S1 is defined on an inner side surrounded by the upper surface portion and the side wall portion, and a lower end of the side wall portion is formed as a circular opening end 182. Further, the storage space S1 in the container upper portion 181 has a structure in which the storage space S1 is connected to the air passage 11 in a center portion of the upper surface portion so that ventilation can be performed.

Further, the connecting part 12 in the first embodiment includes a site 125, which is attracted to and mounted to the mounting part (33) of the support 30A by magnetic force so as to be removably mounted thereto. Actually, in the site 125, the entire connecting part 12 (including the container upper portion 181) is made of a material having a magnetic property (for example, stainless steel having a magnetic property).

The collecting part 14 is a site that is located on a lower end side of the powder collector 10A at a time of use and inserted into a container or the like accommodating powder to be collected. The collecting part 14 includes a cylindrical body portion 141, and a cylindrical connecting portion 142 having an inner diameter slightly larger than that of the body portion 141 at an upper end of the body portion 141. Further, in the collecting part 14, the cylindrical air passage 13 is continuously formed on an inner side of the body portion 141 and the connecting portion 142.

The body portion 141 of the collecting part 14 is used as an accommodating portion in which the collected powder is temporarily accommodated and kept. A lower end opening 13a of the air passage 13, which is used as a suction port and a discharge port at a time of suction and discharge of powder, is formed at a lower end of the body portion 141. The connecting portion 142 has a space (part of the air passage 13) in which a part of a connecting pipe (25) for adaptation described later is removably fitted.

The collecting part 14, in particular, the body portion 141 can be formed as a site that is varied in dimension depending on conditions such as the collection amount and the kind of powder. Specifically, a plurality of kinds of collecting parts 14 (single products), which differ from each other in dimensions such as an inner diameter and a length of the air passage 13 in the body portion 141, are prepared and suitably replaced to be used in accordance with the collection amount of powder, the kind of powder, and the like. In this case, the connecting portion 142 of the collecting part 14 is also changed in dimension in accordance with the difference in dimension of the body portion 141.

When the arrangement position of the first filter part 15 is constant, it is only required that the length of the air passage 13 of the body portion 141 be set so that the distance from the first filter part 15 to a lower end portion of the body portion 141 (distance from the first filter part 15 to the position of the lower end portion in which the lower end opening 13a is present) is set to a required dimension in advance in accordance with the collection amount. In addition, the length of the air passage 13 of the body portion 141 may be set so as to be adjusted to a required length by first forming the body portion 141 into a shape with a relatively long dimension, and at a time of actual use, cutting the body portion 141 at a required position adapted to a variation in collection amount, to thereby remove a part of the lower end side of the body portion 141 formed so as to be relatively long.

Further, the dimension of the air passage 13 and the pore diameter of the lower end opening 13a in the body portion 141 can be suitably set in accordance with conditions such as the collection amount and the kind of powder. In particular, the pore diameter of the lower end opening 13a may be set so as to be adjusted by forming the body portion 141 (having the air passage 13) as a member having a shape tapered to the lower end opening 13a and cutting the body portion 141 at a midway position of the tapered portion.

When the latter configuration is adopted regarding the length of the air passage 13, it is only required that an automatic powder collecting system, in which a cutter device configured to cut and remove the collecting part 14 in accordance with the collection amount is installed, be constructed, and the work of cutting and removing be performed automatically by the cutter device. Further, in this case, when a sterilized part is used as the collecting part 14, it is only required that the work of cutting and removing the cutting part 14 be performed automatically by the cutter device installed in a work space under a sterile condition. With this, the collecting part 14 can be used while being maintained in a sterilized state.

Further, when the different kinds of collecting parts 14 are replaced to be used, in order to enable each of the collecting parts 14 to be mounted, the connecting pipe 25 for adaptation is used in common as an adaptor enabling connection between the connecting portion 142 of each of the collecting parts 14 and a lower end portion 172 of the relaying part 17. When the collecting parts 14 of the same kind are replaced to be used, it is not required to use the connecting pipe 25 for adaptation in common.

The connecting pipe 25 for adaptation is a pipe member having a shape including an upper connecting portion 251 to be connected to the lower end portion 172 of the relaying part 17, and a lower connecting portion 252 to be removably connected to the connecting portion 142 of each of the collecting parts 14. Through formation of coupling means such as a screw thread, the upper connecting portion 251 can be coupled to the lower end portion 172 of the relaying part 17 through the coupling means such as a screw thread. The dimensions such as an outer diameter and a length of the lower connecting portion 252 are set to values adapted to the dimension of each of the collecting parts 14 that are replaced to be used. Further, an air passage 26 to be connected to the air passage 13 of the collecting part 14 and the air passage 16 of the relaying part 17 are continuously formed on an inner side of the upper connecting portion 251 and the lower connecting portion 252 of the connecting pipe 25 for adaptation.

The first filter part 15 is formed so as to include a first filter member 21 having a function of blocking passage of powder to be collected at a required position of the air passage 13 in the collecting part 14.

As the first filter member 21, for example, there is used a porous member, which has an air passage portion having a pore diameter capable of blocking passage of powder while ensuring passage of a gas. As the porous member, there is employed a material, which is suitably selected in accordance with conditions such as an average particle diameter of a powder 9 and avoidance of becoming an obstacle to ventilation. For example, a material having an average pore diameter of from 20 μm to 30 μm is employed.

Further, the first filter member 21 in the first embodiment is arranged at a required position of the air passage 13 in the body portion 141 or the connecting portion 142 of the collecting part 14. The arrangement position of the first filter member 21 is suitably set to a position at which the volume of the air passage 13 capable of temporarily accommodating and keeping the powder 9 can be ensured in accordance with the collection amount of the powder to be collected and the like. In the first embodiment, the first filter member 21 is arranged in a portion of the air passage 13 corresponding to a site on an upper end side of the body portion 141 or a site on a lower end side of the connecting portion 142. The first filter member 21 is arranged, for example, by being fitted in the air passage 13.

The collecting part 14 in the first embodiment is configured as a component that is removably mounted together with the first filter part 15 to an end portion (lower end portion 172) of the relaying part 17 on a side opposite to the connecting part 12. Further, when the connecting pipe 25 for adaptation is used in common, the collecting part 14 serves as a component that is removably mounted to the lower connecting portion 252 of the connecting pipe 25 for adaptation to be mounted to the end portion (lower end portion 172) of the relaying part 17. When the connecting pipe 25 for adaptation is not used in common, the collecting part 14 is directly and removably mounted to the lower end portion 172 of the relaying part 17.

The relaying part 17 is a site formed so as to connect the air passage 11 of the connecting part 12 and (the air passage 13 of) the collecting part 14 to each other so that at least ventilation can be performed. The relaying part 17 in the first embodiment includes a body portion 171 formed of a linear cylindrical tube, and the lower end portion 172 connected to the connecting pipe 25 for adaptation described above on a lower end side of the body portion 171. The cylindrical air passage 16 is continuously formed on an inner side of the body portion 171 and the lower end portion 172.

In the relaying part 17, a container lower portion 183 serving as a lower portion of the storage container (180) described later in the second filter part 18 is formed at an upper end of the body portion 171. The container lower portion 183 has a shape including a disc-like lower surface portion having a diameter larger than that of (the air passage 16 of) the body portion 171 of the relaying part 17, and an annular side wall portion rising from the periphery of the lower surface portion. In the container lower portion 183, a disc-like storage space S2 is defined on an inner side surrounded by the lower surface portion and the side wall portion, and an upper end of the side wall portion is formed as an opening end 184. Further, the storage space S2 in the container lower portion 183 has a structure in which the storage space S2 is connected to the air passage 16 in a center portion of the lower surface portion so that ventilation can be performed.

The second filter part 18 is formed so as to include a second filter member 23 in the storage container 180 provided in an end portion positioned on the connecting part 12 side of the air passage 16 of the relaying part 17.

As the second filter member 23, for example, there is used a porous member, which has an air passage portion having an average pore diameter capable of blocking at least passage of powder having passed through the first filter part 15. As the porous member, there is employed a material, which is suitably selected in accordance with conditions such as an average particle diameter of powder to be prevented from passing and avoidance of becoming an obstacle to ventilation. For example, a material having an average pore diameter of from 0.2 μm to 0.4 μm is employed. In principle, the average pore diameter of the porous member forming the second filter member 23 has a value smaller than that of the average pore diameter of the porous member forming the first filter member 21.

Further, the second filter member 23 is a member capable of being stored in the disc-like storage space S1 (S2 or the like) defined in the storage container 180.

The storage container 180 is a structure obtained by combining the container upper portion 181 and the container lower portion 183 with each other. The storage container 180 in the first embodiment has a configuration in which the container upper portion 181 and the container lower portion 183 can be combined by locking the hanging side wall portion of the container upper portion 181 with an outer peripheral side of the rising side wall portion of the container lower portion 183, for example, through threaded engagement through intermediation of a screw thread.

The main storage space S1 (S2) of the storage container 180 is a space having a setting area (area of a disc-like bottom surface portion) larger than an opening area (sectional area) of the air passage 16 of the relaying part 17 on which the storage container 180 is arranged. The storage space S1 of the container upper portion 181 is a space connected to an auxiliary accommodating space S3 that is also a part of the air passage 11 in the upper end fitting portion 121 of the connecting part 12. Further, the storage space S2 of the container lower portion 183 is a space connected to auxiliary accommodating spaces S4 and S5 having a two-stage structure with two kinds of opening areas that are larger than the opening area of the air passage 16 in the body portion 171 of the relaying part 17 and smaller than the setting area of the storage space S2.

The second filter member 23 in the first embodiment is formed into a shape including a disc-like body portion 231 to be accommodated in the storage space S1 or S2 of the storage container 180, an upward protruding portion 232 protruding upward in a center portion of the body portion 231 on an upper surface side, and a downward protruding portion 233 producing downward in a center portion of the body portion 231 on a lower surface side. The body portion 231 has a dimension and a shape capable of being accommodated in the disc-like storage space S1 or S2 of the storage space 180. The upward protruding portion 232 has a dimension and a shape capable of being accommodated in the space S3 of the connecting part 12. Further, the downward protruding portion 233 has a dimension and a shape capable of being accommodated in the two-stage accommodating spaces S4 and S5 of the relaying part 17. The second filter member 23 exerts a function of blocking passage of powder in whole combination of the body portion 231, the upward protruding portion 232, and the downward protruding portion 233.

Further, the second filter member 23 in the first embodiment has a structure including an accommodating case 235 and an actual filter member 236. The accommodating case 235 is an example of a packaging material having a shape with an internal space and an outer appearance corresponding to the body portion 231, the upward protruding portion 232, and the downward protruding portion 233. The actual filter member 236 is accommodated in the internal space of the accommodating case 235. An upper end and a lower end of portions corresponding to the upward protruding portion 232 and the downward protruding portion 233 of the accommodating case 235 are opened so as to ensure ventilation.

Further, the second filter member 23 in the first embodiment includes ring members (O-rings) 185 and 186 made of a rubber or the like in order to prevent occurrence of a leak phenomenon or the like in which powder passes through a gap defined between the second filter member 23 and the storage container 180 together with a gas by ensuring adhesiveness with respect to inner wall surfaces of the storage container 180 in the storage spaces S1 and S2. Specifically, an annular groove 184 is formed in a site, which is opposed to an upper surface of the body portion 231 of the second filter member 23, of an inner wall surface of the container upper portion 181 of the storage container 180, and the first ring member 185 is mounted to the groove 184. Further, an annular groove 187 is formed in a site, which is opposed to a lower surface of the body portion 231 of the second filter member 23, of an inner wall surface of the container lower portion 182 of the storage container 180, and the second ring member 186 is mounted to the groove 187.

Further, in the powder collector 10A, for example, the connecting part 12, the relaying part 17, and the connecting pipe 25 for adaptation are made of a material such as a metal, and the collecting part 14 is made of a material such as a synthetic resin. Further, regarding an opening diameter of each air passage, each diameter of the air passage 11 of the fitting portion 121 in the connecting part 12, the air passage 16 of the body portion 171 in the relaying part 17, and the air passage 26 of the lower connecting portion 252 in the connecting pipe 25 for adaptation is set to a smallest value. The smallest opening diameter in each of the air passages is suitably set, and set, for example, within a range of from 1 mm to 15 mm.

Further, the powder collector 10A is assembled, for example, by the following procedure.

First, the ring member 123 is mounted to the groove 123 in an outer peripheral portion of the fitting portion 121 of the connecting part 12, and the first ring member 185 is mounted to the groove 184 on the inner wall surface defining the storage container S1 of the container upper portion 181.

Then, the second ring member 186 is mounted to the groove 187 on the inner wall surface defining the storage space S2 of the container lower portion 183 in the relaying part 17, and thereafter the second filter member 23 is set. After that, the container upper portion 182 in the connecting part 12 is fixed to the container lower portion 183 by fitting the container upper portion 181 on the container lower portion 183 from an outer side so that the container upper portion 181 is threadedly engaged therewith. With this, the connecting part 12 and the relaying part 17 are connected to each other. Further, the second filter part 18 having the second filter member 23 set in the storage space S1 or S2 and the auxiliary accommodating spaces S3 to S5 of the storage container 180 is assembled.

Then, after the connecting pipe 25 for adaptation is mounted to the lower end portion 172 of the relaying part 17, the collecting part 14 having the first filter part 15 arranged thereon in advance is mounted to the lower connecting portion 252 of the connecting pipe 25 for adaptation.

Figure 4:
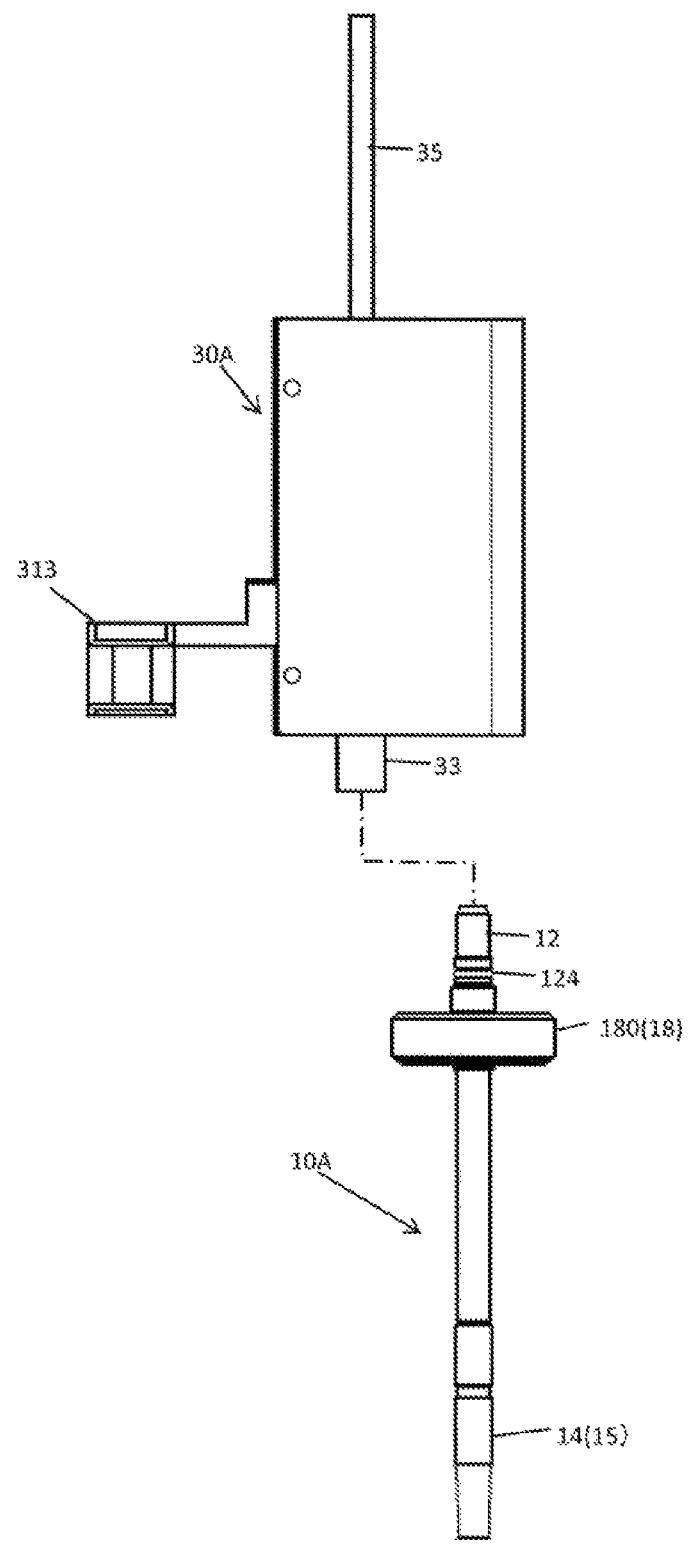
FIG. 4 is a side view for illustrating a state in which the powder collector is removed from the support in FIG. 1.
Figure 5:
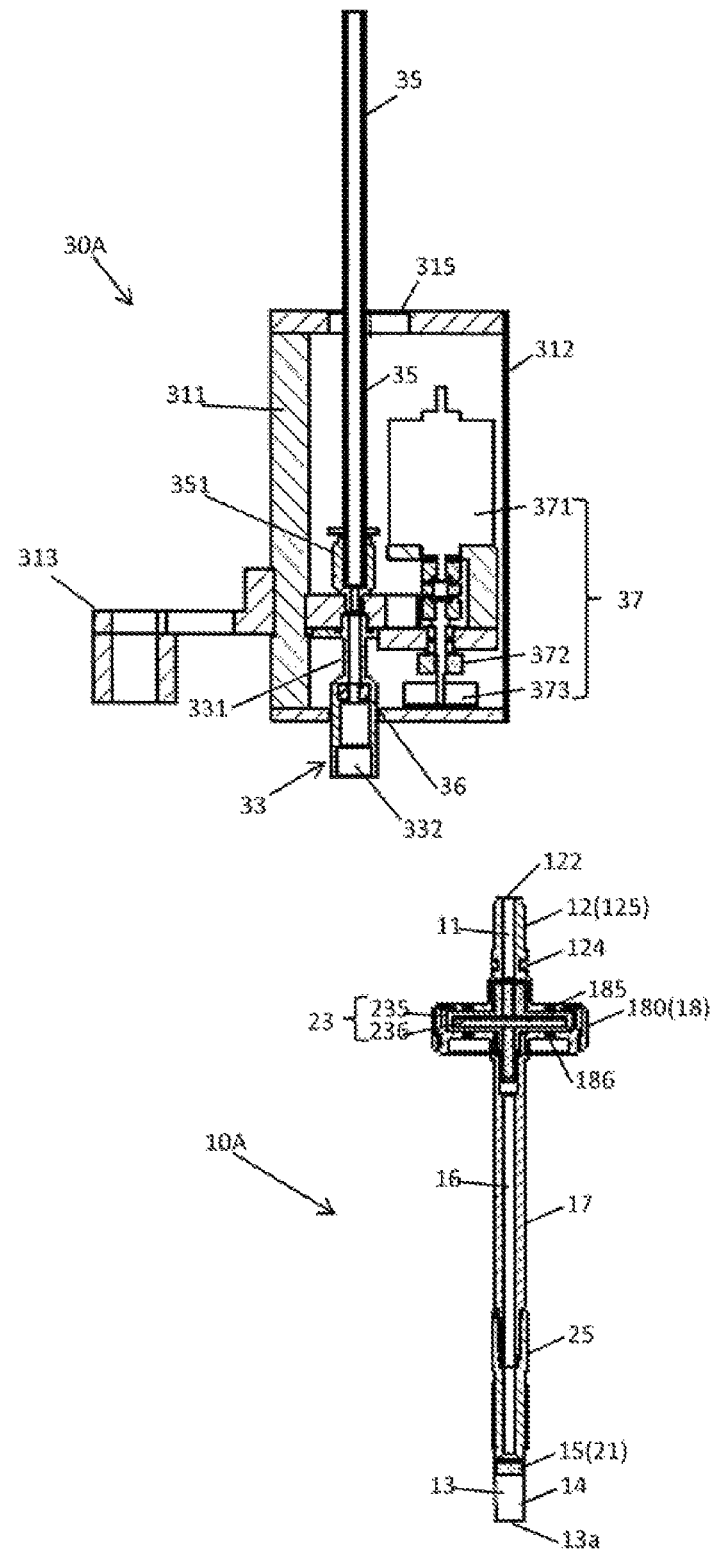
FIG. 5 is a schematic sectional view for illustrating the powder collector and the support of FIG. 4.
Figure 6:
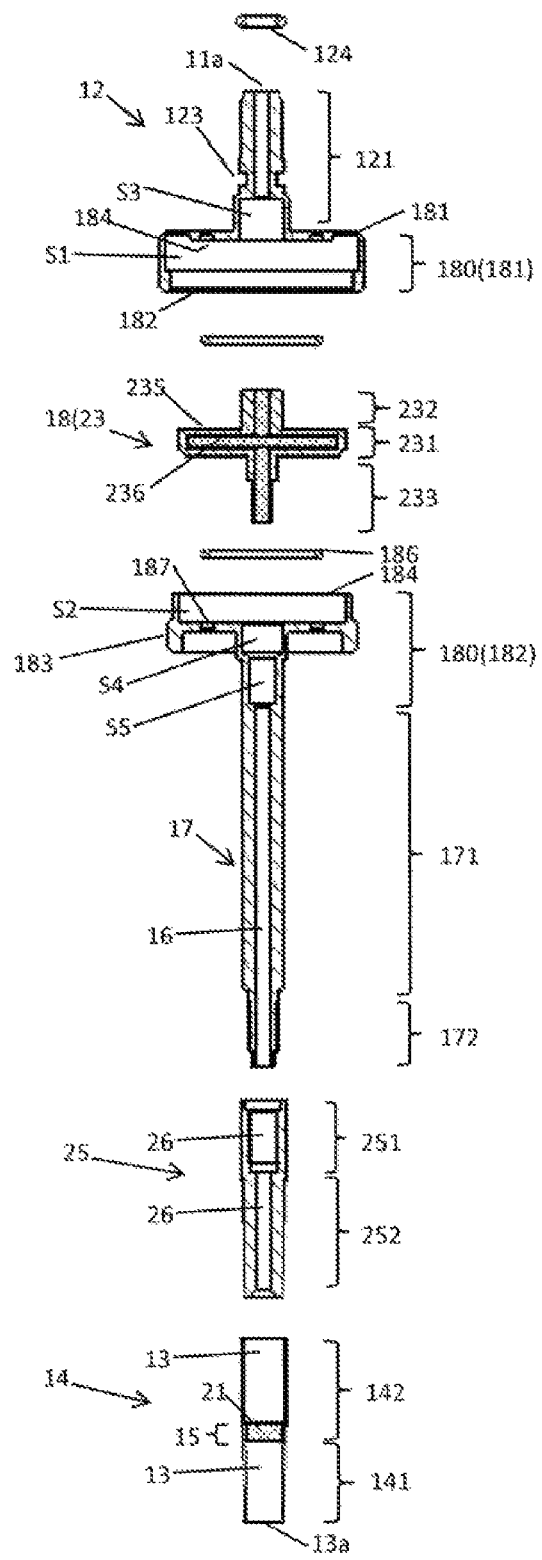
FIG. 6 is an exploded sectional view for illustrating the powder collector of FIG. 1.

With this, the powder collector 10A having the outer appearance and connection state illustrated in FIG. 1, FIG. 4, FIG. 5, and the like is completed. The outer appearance of the powder collector 10A is an outer appearance including an elongated bar-like portion and a disc-like portion formed on an upper portion side of the bar-like portion.

<Configuration of Support in Powder Collecting Device>

As illustrated in FIG. 1 to FIG. 5 and the like, the support 30A includes a body portion 31, a pipe 35 for air intake and air supply, which is arranged in the body portion 31, and the mounting part 33, which is arranged in a site of the body portion 31, in which one end portion of the pipe 35 is present. The connecting part 12 of the powder collector 10A having the above-mentioned configuration is removably mounted to the mounting part 33.

As illustrated in FIG. 5 and the like, the body portion 31 includes a support member 311 having a required frame shape, an exterior material 312 configured to cover the support member 311 and the like, and a hand coupling portion 313, which is fixed to a part of the support member 131 and protrudes to an outer side of the exterior material 312.

Of those components, the hand coupling portion 313 is formed so as to correspond to the structure of a grip part (621) in a robot hand (63) described later and is removably coupled to the grip part (621). For example, when the grip part (621) of the robot hand (63) has a configuration in which two pinching claw members having recessed portions in sites opposed to each other are brought close to each other and separated from each other, for the hand coupling portion 313, there is adopted a structure having a portion 314 to be gripped, which has a three-dimensional shape (block shape for gripping) to be pinched and held from both sides by the recessed portions in the two pinching claw members.

The pipe 35 is a connecting pipe configured to connect the support 30A to an air intake device (51) and an air supply device (52) described later. The pipe 35 is arranged by introducing the pipe 35 from a pipe introducing port 315 formed in an upper surface of the body portion 31 and fitting an end portion of the pipe 35 on a connection side in a connecting hole of a cylindrical pipe connection receiving portion 351 fixed to a part of the support member 131 of the body portion 31. As the pipe 35, for example, a pipe material such as a tube made of a material having flexibility is used.

The mounting part 33 is formed of a cylindrical receiving member 331 fixed to a part of the support member 131 of the body portion 31. The receiving member 331 has a cylindrical two-stage fitting hole 332 in which the connecting part 12 (two-stage fitting portion 121) of the powder collector 10A is fitted. In the receiving member 331, the fitting hole 332 is connected to the connecting hole of the pipe connection receiving portion 351 through a through hole forming the air passage. The receiving member 331 in the first embodiment is arranged so that a part of a lower end portion of the receiving member 331 protrudes to an outside from a lower surface of the body portion 31 of the support 30A.

Further, the mounting part 33 is arranged under a state in which a magnet 36 is fixed to an upper end portion of the fitting hole 332 of the receiving member 331. With this, the connecting part 12 (fitting portion 121) of the powder collector 10A is attracted to and fixed to the fitting hole 332 by magnetic force of the magnet 36. As the magnet 36, for example, a magnet having a ring shape is used because a through hole for ensuring an air passage in a center portion of the magnet 36 is required.

Further, as illustrated in FIG. 5 and the like, the support 30A includes a vibration device 37 configured to vibrate the powder collector 10A mounted to the mounting part 33.

The vibration device 37 includes an electric motor 371 arranged so as to be fixed to a part of the support member 311 of the body portion 31, and an eccentric member 373 mounted so as to be fixed to a distal end of a drive shaft 372 of the electric motor 371. In the vibration device 37, when the electric motor 371 is driven to rotate, vibration (shaking) generated by the eccentric member 373 that is eccentrically rotated around the drive shaft 372 is transmitted to the connecting part 12 of the powder collector 10A through the support member 311 and the receiving member 331. With this, the entire powder collector 10A is vibrated. Further, in the vibration device 37, the magnitude and time of vibration applied to the powder collector 10A can be adjusted by suitably controlling the rotation speed, rotation drive time, and the like of the electric motor 371.

As illustrated in FIG. 3 and the like, the powder collecting device 1A includes the air intake device 51, which is connected to the support 30A through intermediation of the pipe 35 and is configured to perform air intake, and the air supply device 52, which is connected to the support 30A through intermediation of the pipe 35 and is configured to perform air supply.

The air intake device 51 is a device configured to perform air intake capable of applying a suction force required for sucking powder to the collecting part 14 of the powder collector 10A mounted to the support 30A. As the air intake device 51, for example, an electric vacuum pump (suction side) or an ejector is used. The air intake device 51 has a configuration in which an air intake portion thereof and the pipe 35 of the support 30 are connected to each other through intermediation of a required connecting pipe 55, and an open/close valve 513 configured to open or close a passage of the connecting pipe 55 is set at a midway position of the connecting pipe 55 as necessary. Further, the air intake device 51 is driven so as to satisfy air intake conditions for generating a suction force required for sucking powder.

The air supply device 52 is a device configured to perform air supply capable of applying a discharge force required for discharging the powder collected in the collecting part 14 of the powder collector 10A mounted to the support 30A. As the air supply device 52, for example, an electric vacuum pump (discharge side) or an electric air compressor is used. The air supply device 52 has a configuration in which an air supply portion thereof and the pipe 35 of the support 30A are connected to each other through intermediation of the required connecting pipe 55, and an open/close valve 523 configured to open or close a passage of the connecting pipe 55 is set at a midway position of the connecting pipe 55 as necessary. Further, the air supply device 52 is driven so as to satisfy air supply conditions for generating a discharge force required for discharging powder.

As the connecting pipe 55, a common connecting pipe shared by the air intake device 51 and the air supply device 52 is employed, but dedicated connecting pipes (connecting pipe for air intake and connecting pipe for air supply) may be respectively used as necessary. Further, the connecting pipe 55 may be formed of a pipe obtained by directly extending the pipe 35 arranged in the support 30A. Further, as the open/close valves 513 and 523, for example, an electromagnetic operation type valve configured to be opened or closed by electromagnetic force is employed.

A set including the powder collecting device 1A (device formed of the support 30A including the arm coupling portion 313 and the plurality of powder collectors 10A), the air intake device 51, and the air supply device 52 serves as the system component 5A forming a part (mainly portions excluding the robot device) of an automatic powder collecting system (6A) capable of performing, for example, the work of collecting powder by automation through use of the robot device described later (FIG. 3). In this case, the system component 5A can include a storage medium or the like storing a control program to be used in a control unit 65 described later required for operating the robot arm and the robot hand in the robot device in accordance with work contents.

<Configuration of Automatic Powder Collecting System>

The above-mentioned powder collecting device 1A (or the system component 5A) forms a part of the following automatic powder collecting system 6A.

Figure 9:
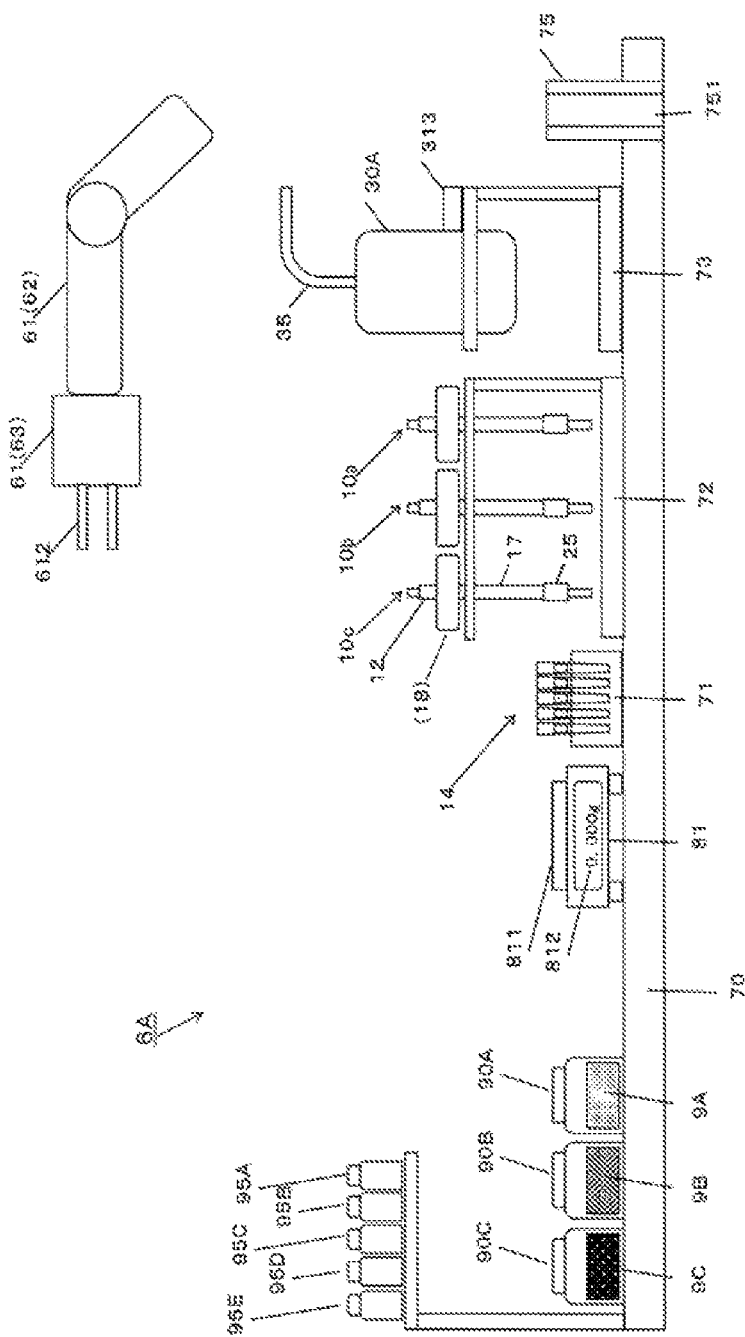
FIG. 9 is an explanatory view for schematically illustrating a configuration (basic configuration) of a practical example of the automatic powder collecting system according to the first embodiment.

As illustrated in FIG. 3, FIG. 9, and the like, the automatic powder collecting system 6A includes the powder collecting device 1A (in particular, the device including the air intake device 51 and the air supply device 52) having the above-mentioned configuration, and a robot device 61 including a robot arm 62 and the robot hand 63 that are operated so as to perform at least the work of collecting, moving, and discharging powder with the powder collector 10A being removably mounted to the support 30A of the powder collecting device 1A.

As the robot device 61, an existing industrial robot including the robot arm 62 capable of being operated so as to perform the above-mentioned work is employed. The robot arm 62 has a structure capable of being removably coupled to and holding the support 30A in the powder collecting device 1A and capable of being operated so as to perform required work. Specifically, the robot arm 62 includes the robot hand 63 having the grip part 621 capable of removably holding (gripping) the hand coupling portion 313 of the support 30A in the powder collecting device 1A (see FIG. 3). As indicated by the two-dot chain lines in FIG. 3, the robot hand 63 includes the grip part 621 formed of a pinching claw mechanism and a support drive portion 622 configured to support and drive the grip part 621. Further, as the robot arm 62, there is employed a robot arm having an articulated structure capable of performing various detailed operations under a state in which the robot hand 63 is mounted to a distal end portion of the robot arm 62.

The robot arm 62 may be of a single-arm type in which a support body of a robot includes only one arm or may be of a type (for example, double-arm type) in which the support body of the robot includes a plurality of arms. Further, as the robot device 61, a fixed type robot device that cannot move in its entirety is employed, but a movable type robot device may be employed depending on conditions such as required work contents.

Figure 7:
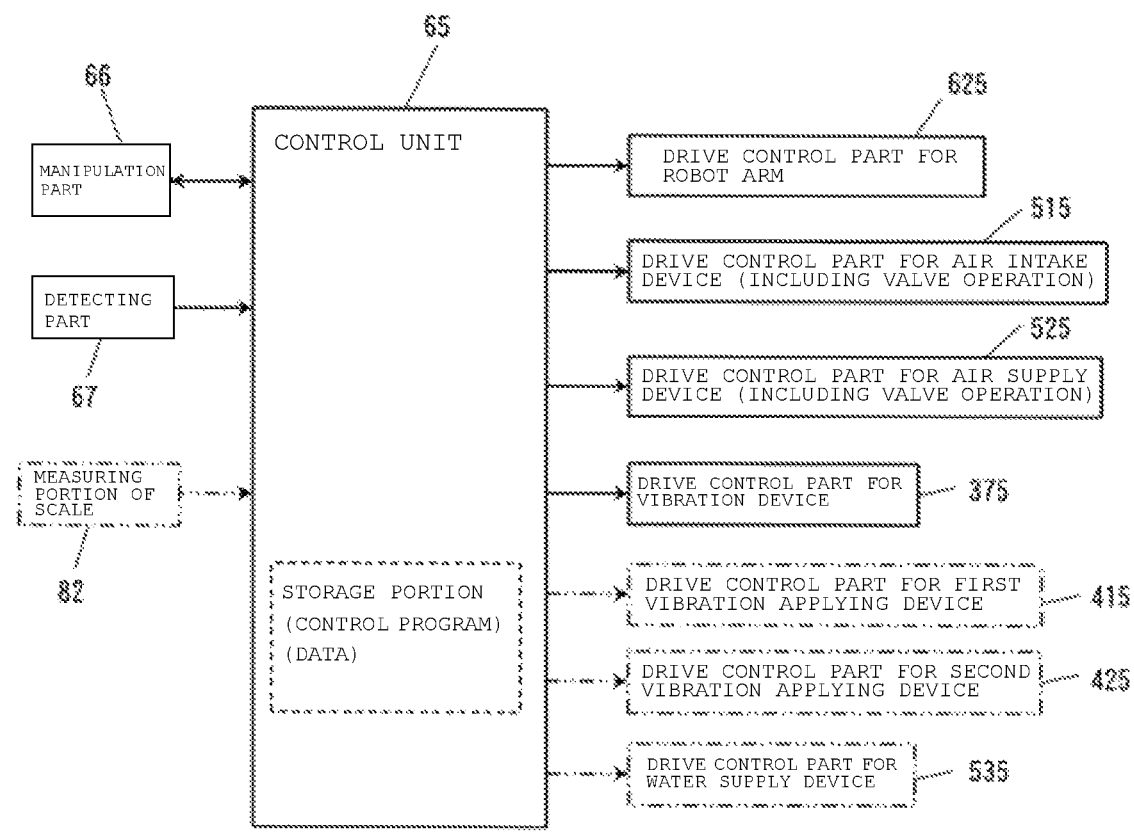
FIG. 7 is a block diagram for illustrating a configuration of a main control system of the automatic powder collecting system according to the first embodiment.

Further, as illustrated in FIG. 7, the automatic powder collecting system 6A includes the control unit 65 configured to control each operation.

The control unit 65 includes, for example, an arithmetic processing device, a storage portion (for example, storage element or storage device), and an input/output device.

Further, the control unit 65 is connected to control targets, for example, a drive control part 625 for a robot arm configured to control an operation of a drive device such as an electric motor configured to drive the robot arm 62 (including the robot hand 63), a drive control part 515 for an air intake device configured to control an operation of a drive device configured to drive the air intake device 51 (including the open/close valve 513), a drive control part 525 for an air supply device configured to control an operation of a drive device configured to drive the air supply device 52 (including the open/close valve 523), and a drive control part 375 for a vibration device configured to control an operation of a drive device configured to drive the vibration device 37.

Further, the control unit 65 is connected to a manipulation part 66 configured to perform various manipulations (input and selection of information, display of a state, and the like) regarding the system 6A, various sensors configured to detect information, such as a state, required in each operation of the system 6A (each of the above-mentioned drive control parts), a detecting part 67 such as an imaging device, and the like.

The control unit 65 is configured to send a required control signal to each of the control targets based on a control program and data stored and memorized in the storage portion. Further, the control unit 65 is configured to send a required control signal generated based on information input from the manipulation part 66 and the detecting part 65 to each of the control targets.

In the automatic powder collecting system 6A including the control unit 65, the powder collecting device 1A, the air intake device 51, and the air supply device 52 except the robot device 61 (the foregoing corresponds to portions of the system component 5A) are operated as described below.

Figure 8:
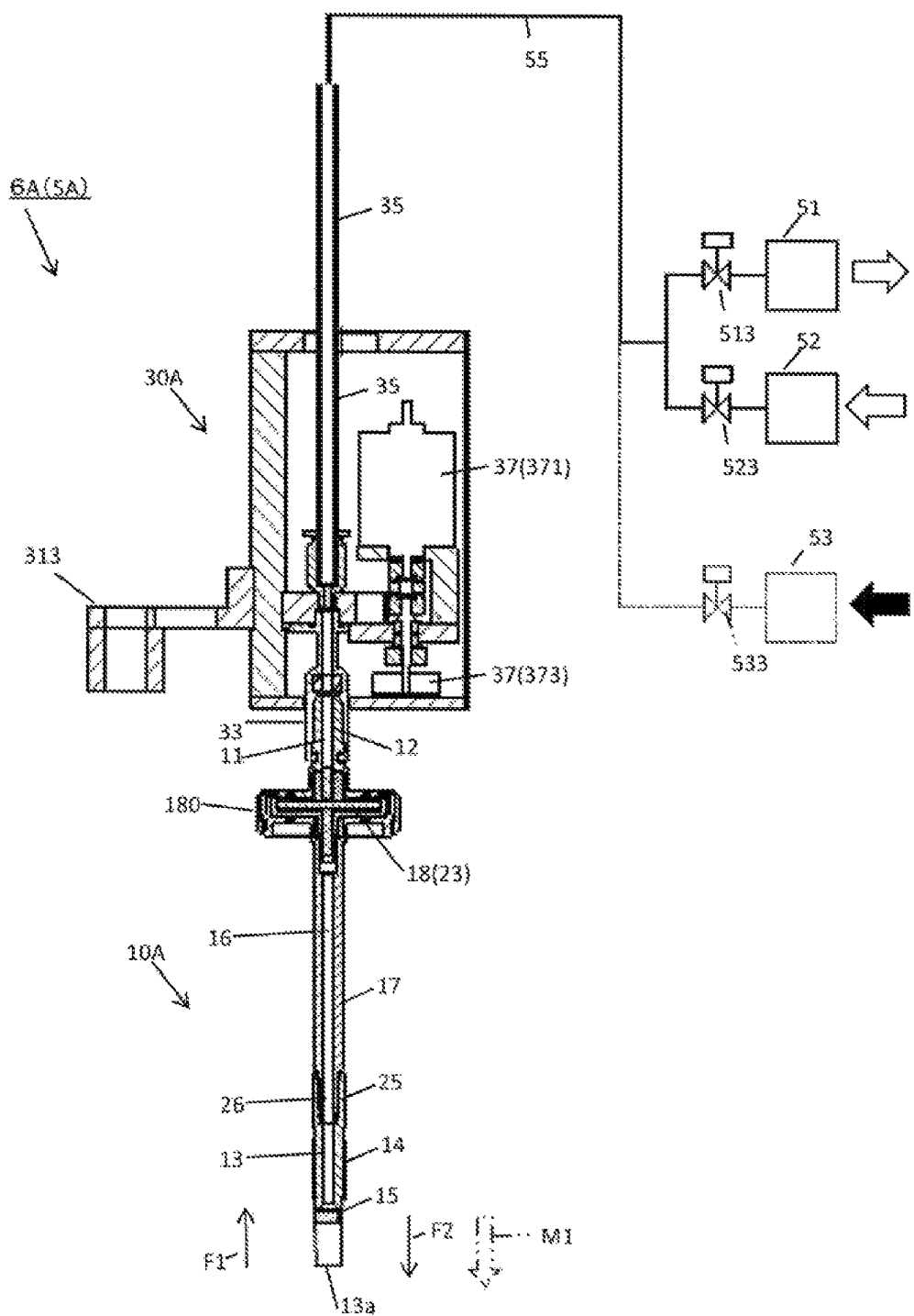
FIG. 8 is an explanatory view for illustrating an operation state of the system component of FIG. 3.

First, when the air intake device 51 is driven by the control of the control unit 65, the air intake device 51 is started, and the open/close valve 513 is opened. Then, as illustrated in FIG. 8, action of air intake that occurs in the air intake device 51 (rightward outlined arrow in FIG. 8) is successively transmitted to each of the air passages 11, 16, 25, and 13 in the powder collector 10A through the connecting pipe 55 and the pipe 35, and finally, a suction force F1 for sucking a gas is generated in the lower end opening 13a and further in the air passage 13 of the collecting part 14.

With this, the powder collector 10A is brought into a state capable of sucking powder into the air passage 13 of the collecting part 14. Further, when air intake caused by the air intake device 51 is continued, the collected powder can be kept in the air passage 13 of the collecting part 14 in the powder collector 10A in combination with action of the first filter part 14 of blocking passage of powder. Further, when air intake is performed by the air intake device 51, a gas that is taken in and flows from the lower end opening 13a of the collecting part 14 of the powder collector 10A due to the air intake passes through the first filter part 15 and the second filter part 18 in the powder collector 10A in the stated order.

Further, when the air supply device 52 is driven by the control of the control unit 65, the air supply device 52 is started, and the open/close valve 523 is opened. Then, as illustrated in FIG. 8, action of air supply that occurs in the air supply device 52 (leftward outlined arrow in FIG. 8) is successively transmitted to each of the air passages 11, 16, 25, and 13 in the powder collector 10A through the connecting pipe 55 and the pipe 35, and finally, a discharge force F2 for discharging a gas is generated in the air passage 13 and further in the lower end opening 13a of the collecting part 14.

With this, in the powder collector 10A, the powder that is collected and temporarily kept in the air passage 13 of the collecting part 14 can be discharged to the outside from the lower end opening 13a of the collecting part 14. Further, when air supply is performed by the air supply device 52, a gas flowing from the air passage 11 of the connecting part 12 of the powder collector 10A due to the air supply passes through the second filter part 18 and the first filter part 15 in the powder collector 10A in the stated order.

<Practical Example of Automatic Powder Collecting System>

The automatic powder collecting system 6A can be applied, for example, in order to perform work that is schematically illustrated in FIG. 9.

The automatic powder collecting system 6A illustrated in FIG. 9 is a system configured to perform the work of collecting a predetermined amount of powders 9A to 9C accommodated in a plurality of first containers 90A to 90C each being sealed with a lid (not shown) and transferring the powders 9A to 9C to a plurality of second containers 95A to 95E. The powders 9A to 9C handled by the system 6A are, for example, powder that are partially or entirely harmful for human bodies (specifically, for example, powder having high pharmacological activity), but the entire powder may be harmless for human bodies as a matter of course.

The automatic powder collecting system 6A includes the powder collecting device 1A, the air intake device 51, the air supply device 52 (the foregoing devices correspond to the automatic powder collecting system component 5A), and the robot device 61. The automatic powder collecting system 6A further includes the following components.

The components include, for example, a work table 70, a first holder portion 71, a second holder portion 72, a third holder portion 73, and a cleaning treatment portion 74. The work table 70 is set in a work room such as a clean room or a sterilization room. The first holder portion 71 is configured to removably hold the plurality of collecting parts 14 (each including the first filter part 15) satisfying required dimensional conditions, which are arrayed side by side. The second holder portion 72 is configured to removably hold portions 10a, 10b, and 10c of the plurality of powder collectors 10A before the collecting parts 14 are mounted, which are arrayed side by side. The third holder portion 73 is configured to removably hold the support 30A connected to the pipe 35. The cleaning treatment portion 75 is configured to clean the remaining portions 10a, 10b, and 10c of the powder collectors 10A after the collecting parts 14 are removed. The portions 10a, 10b, and 10c of the powder collectors before the collecting parts 14 are mounted refer to portions excluding the collecting parts 14. That is, the portions 10a, 10b, and 10c are each formed of the connecting part 12, the relaying part 17, the second filter part 18, and the connecting pipe 25 for adaptation.

Further, in the automatic powder collecting system 6A, there is also arranged a disposal portion (not shown) configured to dispose of the used collecting part 14 and the used powder collector 10A (the portions 10a, 10b, and 10c excluding the collecting parts 14 and the entirety including the collecting part 14). Further, in the automatic powder collecting system 6A, the robot device 61 is configured to be capable of performing the work of moving each of the containers 90 and 95 and mounting or dismounting the lids.

In the robot device 61 of FIG. 9 and the like, only the robot arm 62 and the robot hand 63 are illustrated, and illustration of the support body and the control unit 65 is omitted. Further, in FIG. 9 and the like, the first holder portion 71, the second holder portion 72, the third holder portion 73, the cleaning treatment portion 75, and the like are illustrated under a state of being laterally arrayed in a row on the work table 70 for convenience. However, actually, those components are respectively installed at positions suitably set from the viewpoint of work contents, work efficiency, and the like.

The plurality of collecting parts 14 are prepared so as to be replaced to be used. The first holder portion 71 is a structure having a plurality of holding holes. The plurality of collecting parts 14 are inserted into the holding holes and held therein under a state in which each boundary (stepped portion) between the body portion 141 and the connecting portion 142 is hung on the holding hole. With this, the connecting portion 142 of each of the collecting parts 14 is held under a state of protruding above the holding hole. Further, in each of the collecting parts 14, the first filter member 21 forming the first filter part 15 is fitted on a lower end side of the connecting portion 142.

The portions 10a, 10b, and 10c of the three powder collectors 10A include the connecting parts 12, the relaying parts 17, the second filter parts 18, and the connecting pipes 25 for adaptation, which respectively have the same configurations, and are used under a state in which the collecting parts 14 are mounted. The second holder portion 72 is a structure having a plurality of holding holes. The portions 10a, 10b, and 10c of the respective powder collectors 10A are inserted into the holding holes and held therein under a state in which each lower surface of the storage container 180 forming the second filter part 18 is hung on the holding hole. The portions 10a, 10b, and 10c of the three powder collectors 10A may partially have a different configuration relationship.

The third holder portion 73 is a structure configured to removably hold a part of the support 30A. In the support 30A held by the third holder portion 73, the pipe 35 is connected to the air intake device 51 and the air supply device 52 (not shown) (see FIG. 3). The air intake device 51 and the air supply device 52 are arranged, for example, on a floor in the vicinity of the work table 70.

The cleaning treatment portion 75 includes, for example, a tubular treatment portion 751 having a through-hole space that allows insertion of the portions 10a, 10b, and 10c of the powder collectors 10A under a state in which the collecting parts 14 are removed (specifically, portions each excluding the collecting part 14 located below the second filter part 18), a suction device (not shown) connected to a lower end of the tubular treatment portion 751, and a collection container (not shown) configured to collect a substance (powder or the like) to be removed by suction.

Further, a scale 81 configured to measure a weight (mass) of the second container 95 and a weight of the second container 95 under a state of accommodating a collected powder is set on the work table 70. As the scale 81, for example, a digital display type scale is employed, and the weight is displayed as information such as numbers on a digital type display portion 812.

<Operation (Work) of Automatic Powder Collecting System>

Now, an operation of the automatic powder collecting system 6A illustrated in FIG. 9 is described. This operation is carried out by the control of the control unit 65 described above.

Figure 10:
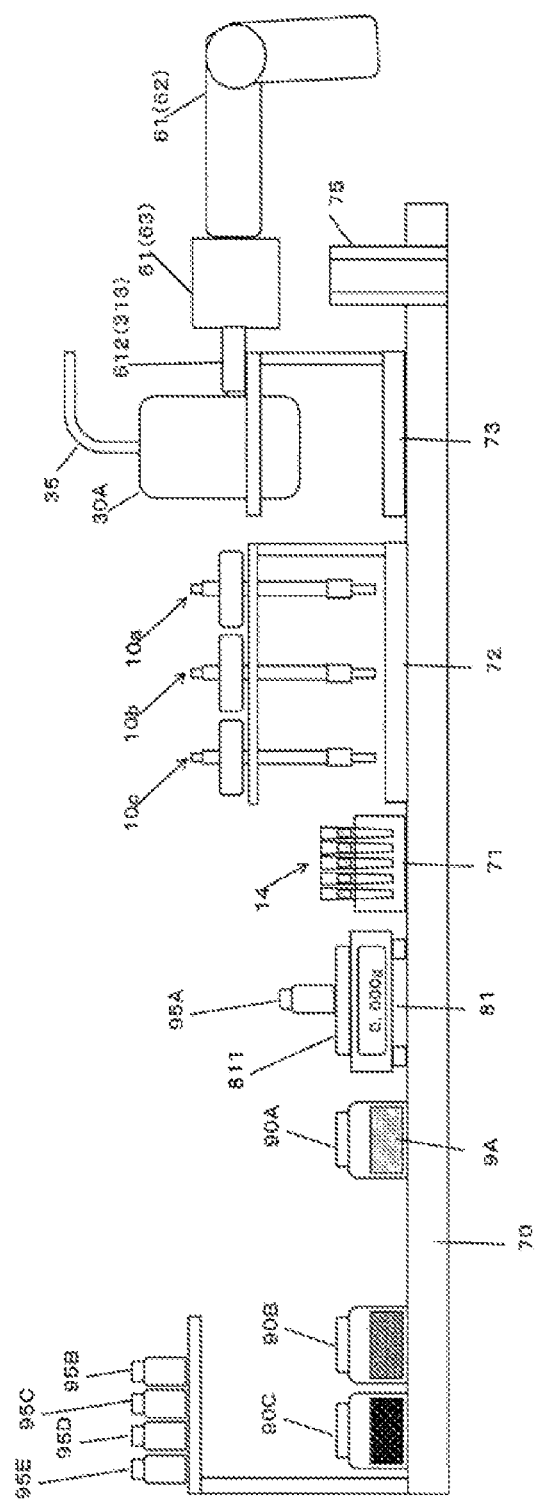
FIG. 10 is an explanatory view for illustrating a preparation operation (state) at a time when the work of collecting powder and the like are performed in the automatic powder collecting system of FIG. 9.

First, as illustrated in FIG. 10, the automatic powder collecting system 6A performs the work of moving the first container 90A in which the powder 9A to be collected is accommodated to a collection work position, and the work of placing the second container 95A configured to accommodate the collected powder 9A for transfer on a measuring platform 811 of the scale 81 by operating the robot arm 62 and the robot hand 63 of the robot device 61.

With the above-mentioned work, preliminary preparation for performing the work of collecting the first powder 9A and the like is completed. In this case, the scale 81 is adjusted so that the weight of the second container 95A is displayed as "0.000 g" on the display portion 812. With this, the scale 81 can be handled so as to be capable of measuring only the weight of the powder 9A to be collected, which is accommodated in the second container 95A.

Figure 11:
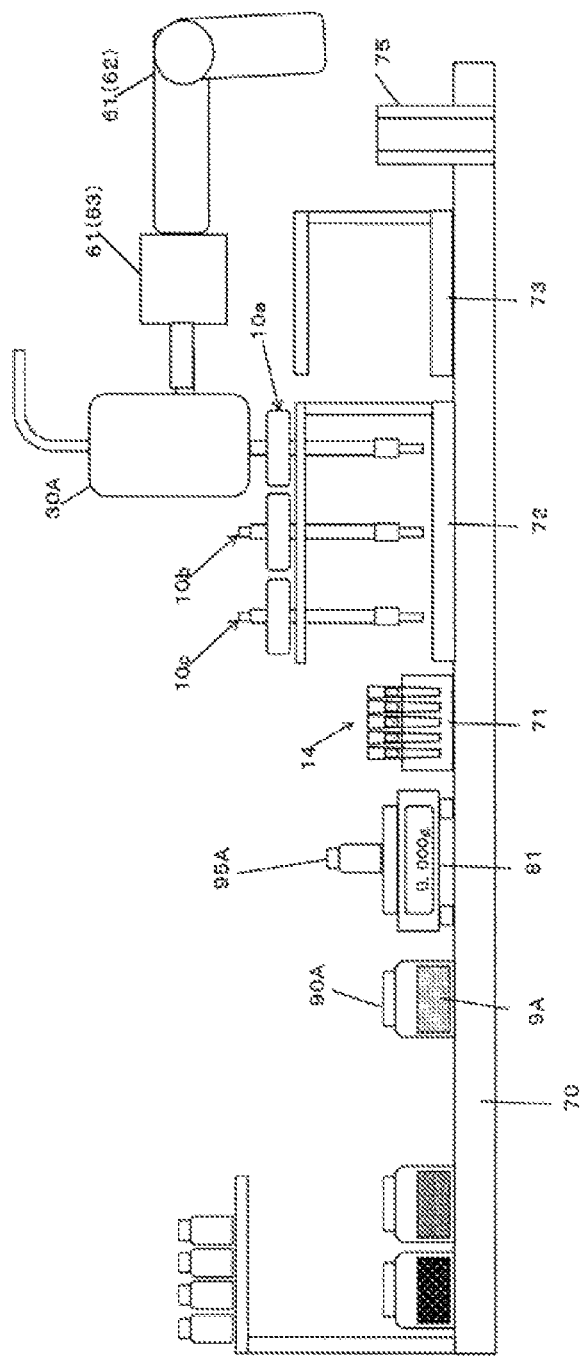
FIG. 11 is an explanatory view for illustrating an operation state of the work of holding the support in the automatic powder collecting system of FIG. 9.
Figure 12:
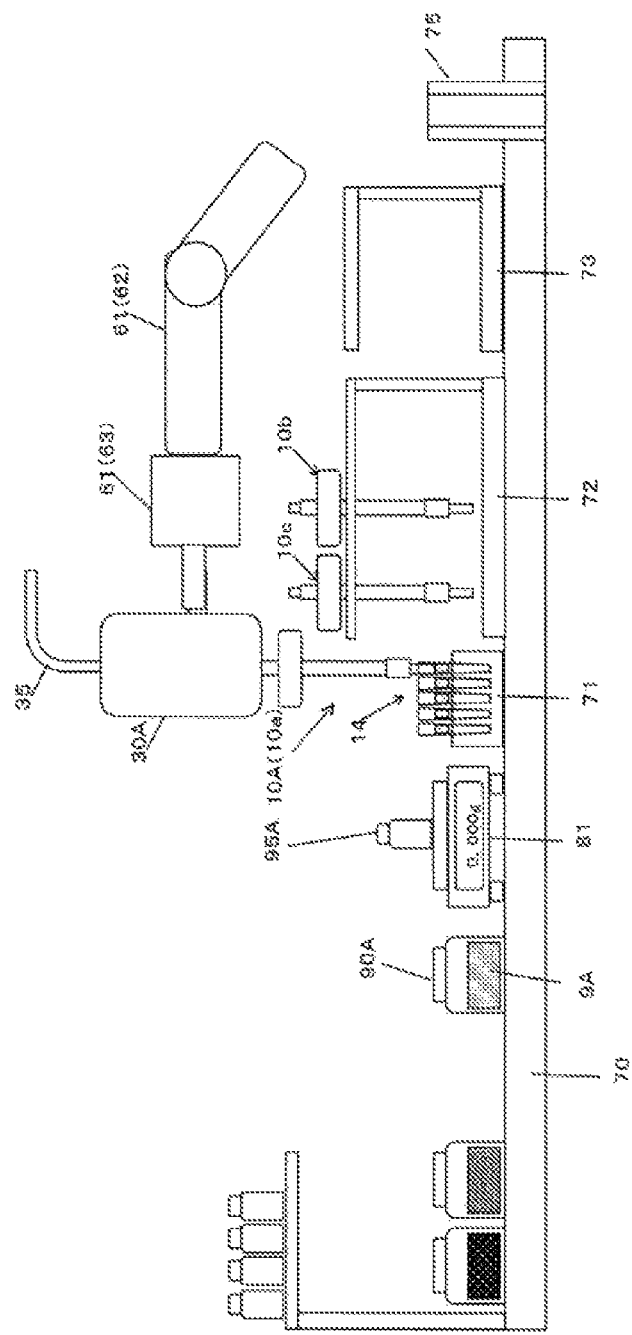
FIG. 12 is an explanatory view for illustrating an operation state of the work of holding the powder collector (portion excluding a collecting part) in the automatic powder collecting system of FIG. 9.

Then, as illustrated in FIG. 10, the automatic powder collecting system 6A performs the work of gripping and holding the support 30A in the powder collecting device 1A with (the grip part 612 of) the robot hand 63 by operating the robot arm 62 and the robot hand 63 of the robot device 61. Subsequently, as illustrated in FIG. 11, the system 6A performs the work of mounting the portion (remaining portion excluding the collecting part 14) 10a of one powder collector 10A in the powder collecting device 1 to the held support 30A. After that, as illustrated in FIG. 12, the system 6A performs the work of mounting the first collecting part 14 (having the first filter part 15 arranged thereon) to the portion 10a (the lower connecting portion 252 of the connecting pipe 25 for adaptation in this example) of the powder collector 10A mounted to the support 30A.

In this case, the portion 10a of the powder collector 10A is mounted to the support 30A as described below.

Specifically, the support 30A gripped and held by the robot hand 63 as described above is moved to the mounting part 33 so that the connecting part 12 in the portion 10a of the powder collector 10A held by the second holder portion 72 is fitted on the mounting part 33. Then, the connecting part 12 in the portion 10a of the powder collector 10A is attracted to and fixed to the fitting hole 332 by magnetic force of the magnet 36 provided to the mounting part 33 of the support 30A, and thus mounting is completed.

Further, the collecting part 14 is mounted to the portion 10a of the powder collector 10A as described below.

Specifically, the portion 10a of the powder collector 10A mounted to the support 30A gripped and held by the robot hand 63 as described above is moved so that the connecting portion 252 of the connecting pipe 25 for adaptation located on a lower end side of the relaying part 17 is inserted into the connecting portion 142 of the collecting part 14. Then, the connecting portion 142 of the collecting part 14 is brought into a state of being fitted on the connecting portion 252 of the connecting pipe 25 for adaptation, and thus mounting is completed.

When the above-mentioned work is carried out, the automatic powder collecting system 6A is brought into a completed state as an automatic powder collecting system configured to perform the work of collecting the powder 9A and the like (FIG. 12).

Figure 13:
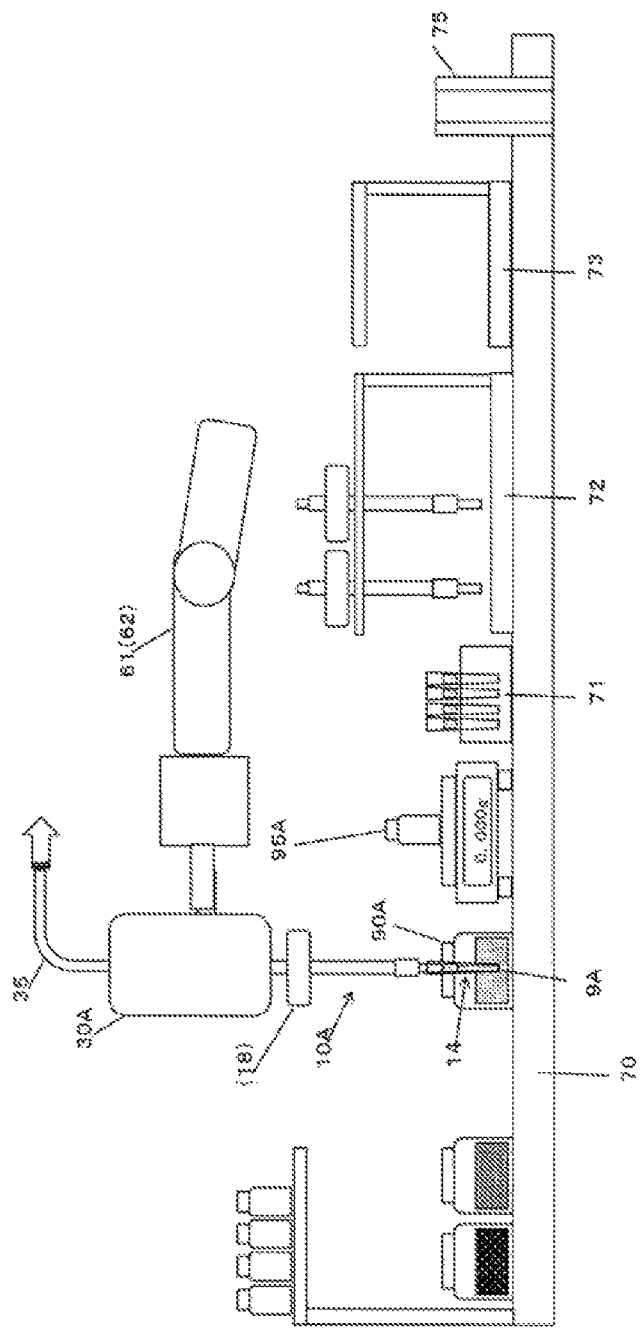
FIG. 13 is an explanatory view for illustrating an operation state of the work of mounting the collecting part to the powder collector in the automatic powder collecting system of FIG. 9.

Then, as illustrated in FIG. 13, the automatic powder collecting system 6A performs the work of collecting the powder 9A with the powder collector 10A (including the collecting part 14) mounted to the support 30A held by the robot hand 63.

In this case, through operation of the robot arm 62 and the robot hand 63, the powder collector 10A is moved so that the collecting part 14 enters the first container 90A, and the lower end opening 13a of the collecting part 14 is brought close to a surface of an accumulation of the powder 9A or inserted into a portion of the accumulation of the powder 9A. Further, when the movement of the powder collector 10A is finished, the air intake operation by the air intake device 51 is started.

With this, the powder collector 10A generates the suction force (F1) in the air passage 13 of the collecting part 14 through air intake action by the air intake device 51, and the powder 9A accommodated in the first container 90A is sucked and collected into the air passage 13.

The collected powder 9A is retained under a state of being kept in the air passage 13 of the collecting part 14 when the suction operation by the air intake device 51 is continued.

Specifically, the powder 9A receives the suction force to be retained under a state of being kept in a portion of the air passage 13 of the collecting part 14, which is located on a lower side with respect to the first filter part 15 and on an inner side with respect to the lower end opening 13a.

Further, the passage of the collected powder 9A is blocked by the first filter part 15 arranged in the collecting part 14, and the powder 9A is prevented from flowing and moving to the other air passages 26, 16, and 11 located on an inner side with respect to the first filter part 15 or flowing and moving to the pipe 35 and the connecting pipe 55 side located beyond the powder collector 10A. Further, in the powder collector 10A, even when the powder 9A passes through the first filter part 15, the passage of the powder 9A having passed through the first filter part 15 is blocked by the second filter part 18. Therefore, in the automatic powder collecting system 6A, the powder 9A is prevented from flowing and moving to the air passage 11 of the powder collector 10A and the pipe 35 and the connecting pipe 55 side beyond the powder collector 10A.

Figure 14:
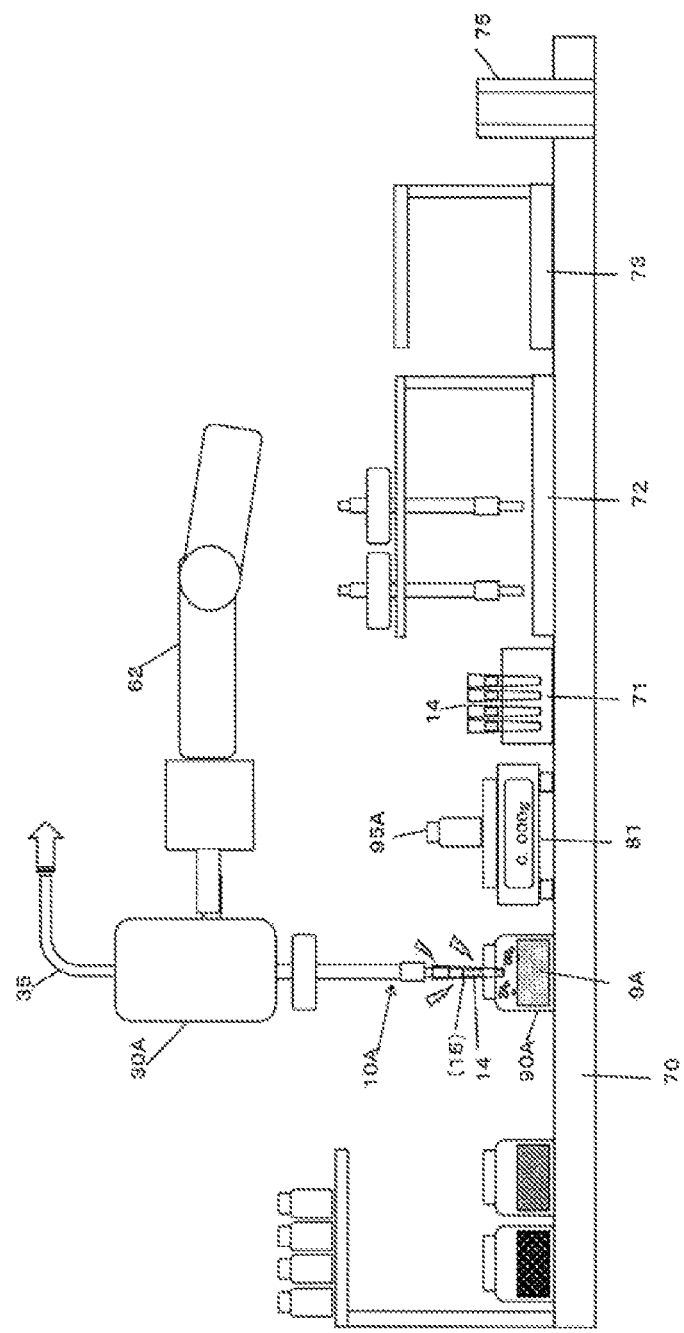
FIG. 14 is an explanatory view for illustrating an operation state of the work of collecting powder by the powder collector in the automatic powder collecting system of FIG. 9.

Subsequently, as illustrated in FIG. 14, the automatic powder collecting system 6A performs the work of shaking off the unnecessary powder 9A adhering to an outer peripheral surface of the collecting part 14 in the powder collector 10A after collection of the powder 9A is completed.

In this case, through operation of the robot arm 62, the powder collector 10A is slightly raised so that the lower end opening 13a of the collecting part 14 is separated from the accumulation surface of the powder 9A in the first container 90A. After that, the vibration device 37 in the support 30A is operated to apply vibration generated in the vibration device 37 to the powder collector 10A, and thus the powder collector 10A is vibrated under a state in which the lower end opening 13a of the collecting part 14 is present in the first container 90A.

With this, in the powder collector 10A having completed collection of the powder 9A, the unnecessary powder 9A adhering to the outer peripheral surface of the collecting part 14 is shaken off to be removed by vibration. Further, the powder 9A that has been shaken off is returned into the first container 90A. Therefore, when the work of discharging the powder 9A to the second container 95A described later is performed, the unnecessary powder 9 adhering to the outer peripheral surface of the collecting part 14 is prevented from being mistakenly accommodated in the second container 95A.

Figure 15:
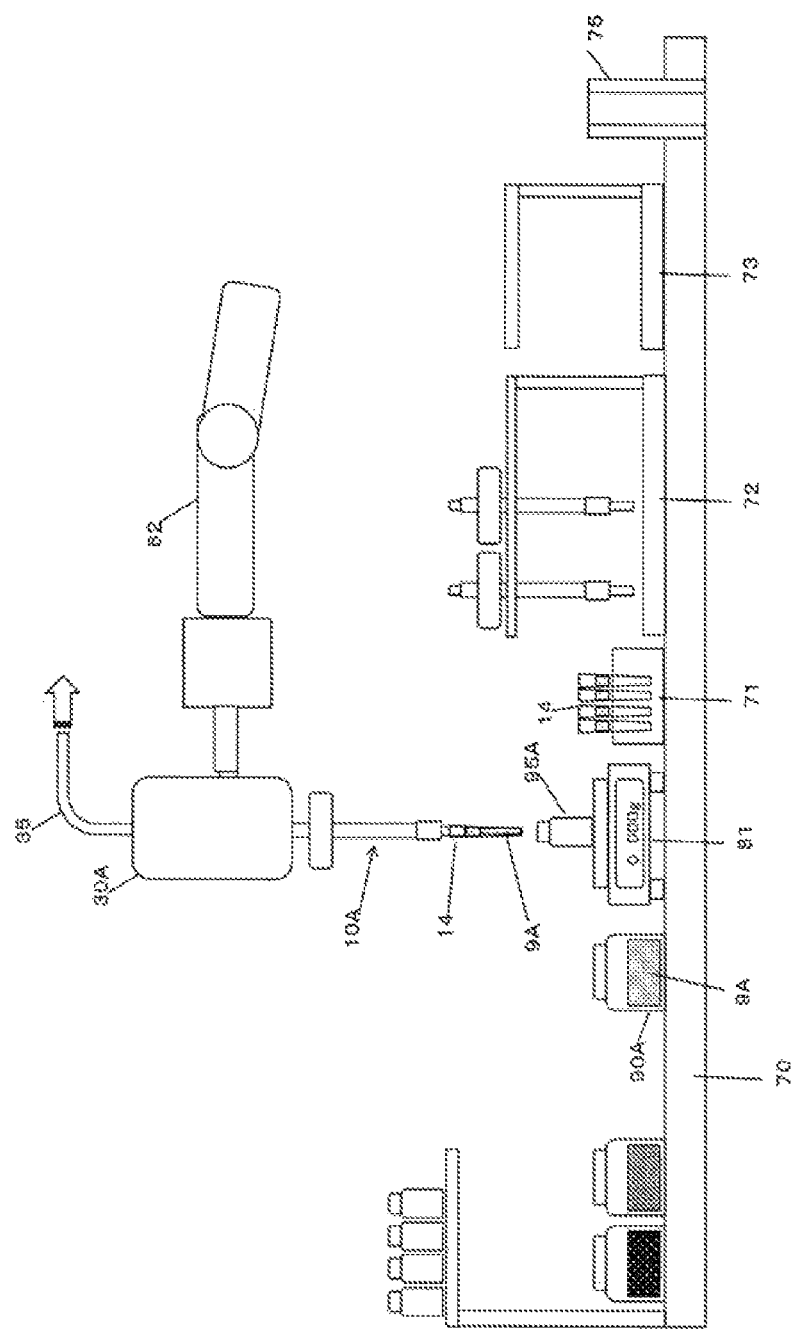
FIG. 15 is an explanatory view for illustrating a state after finish of collection of powder by the powder collector in the automatic powder collecting system of FIG. 9.
Figure 16:
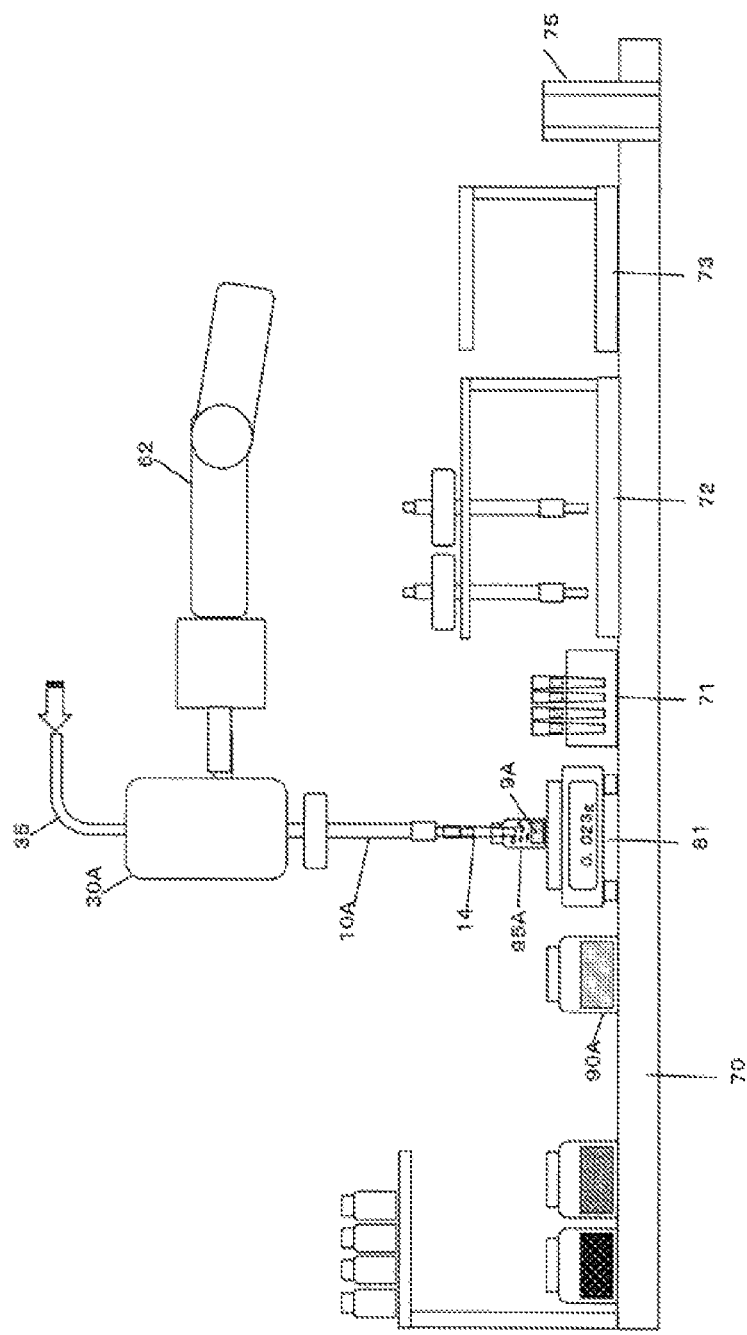
FIG. 16 is an explanatory view for illustrating an operation state of the work of discharging the powder collected by the powder collector and the like in the automatic powder collecting system of FIG. 9.

Then, as illustrated in FIG. 15 and FIG. 16, the automatic powder collecting system 6A performs the work of discharging the powder 9A collected in the collecting part 14 in the powder collector 10A into the second container 95A so that the powder 9A is accommodated therein.

In this case, through operation of the robot arm 62, the powder collector 10A having collected the powder 9A is taken out from the first container 90A and moved to a position above the second container 95A (FIG. 15). After that, the powder collector 10A is moved so that the collecting part 14 is lowered to a position at which the collecting part 14 enters the second container 95A (FIG. 16). Further, when the movement of the powder collector 10A is finished, the air supply operation by the air supply device 52 is started (FIG. 16).

With this, the powder collector 10A generates the discharge force (F2) in the air passage 13 of the collecting part 14 through air supply action by the air supply device 52, and the powder 9A collected to be kept in the air passage 13 in the collecting part 14 is discharged into the second container 95A.

Figure 17:
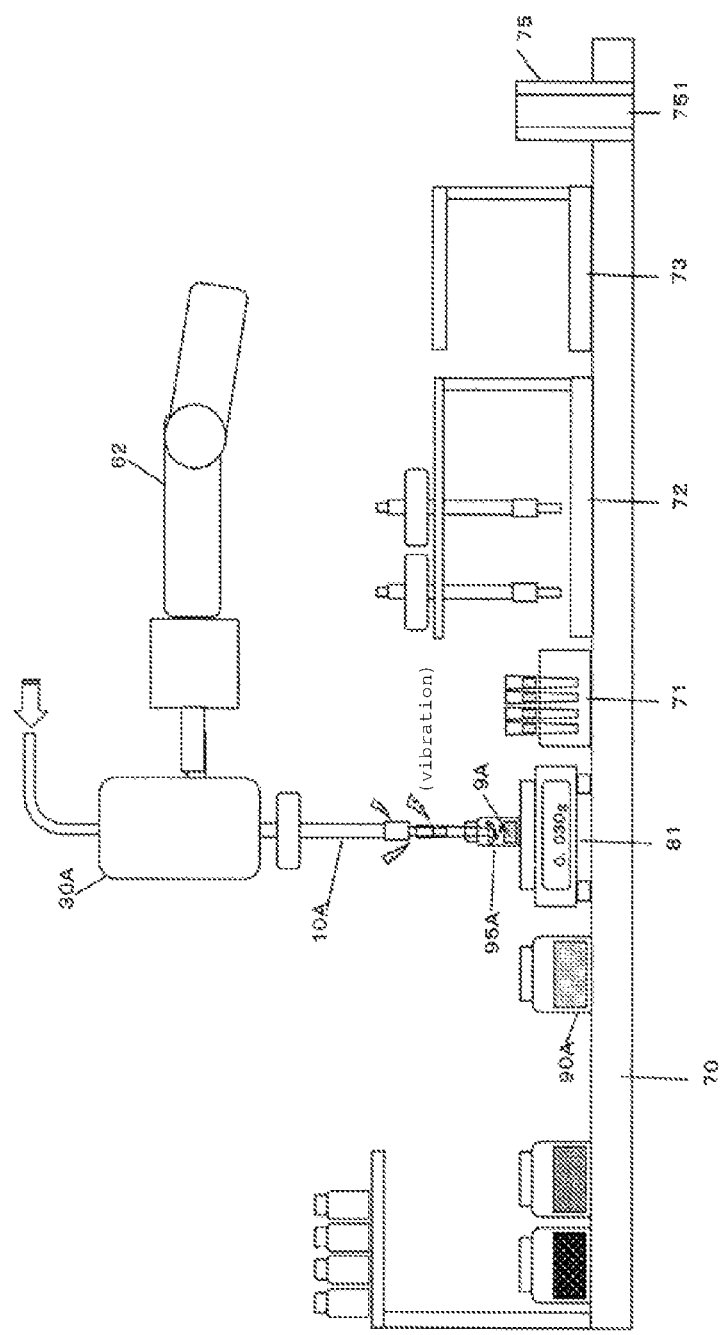
FIG. 17 is an explanatory view for illustrating an operation state after finish of discharge of the powder collected by the powder collector in the automatic powder collecting system of FIG. 9.

In this case, as illustrated in FIG. 17, in the automatic powder collecting system 6A, the vibration device 37 in the support 30A is operated as necessary to vibrate the powder collector 10A. In this case, the collected powder 9A located in the air passage 13 (inner wall and the like) of the collecting part 14 in the powder collector 10A can be shaken off to be discharged without being left. In other words, the entire powder 9A collected in the air passage 13 of the collecting part 14 can be accommodated in the second container 95A.

As a result, a predetermined amount (for example, 0.030 g indicated on the display portion 812 of the scale 81) of the powder 9A collected by the powder collector 10A of the powder collecting device 1A is accommodated in the second container 95A (FIG. 17).

When the automatic powder collecting system 6A is configured to complete transfer (distribution) of the powder 9A having a weight set in advance from the first container 90A to the second container 95A by performing the work of collecting, moving, and discharging the powder 9A with the powder collector 10A in one operation, the above-mentioned operation (operation involving performing the work of collecting, moving, and discharging the powder 9A illustrated in FIG. 13 to FIG. 17) is finished.

Meanwhile, when the automatic powder collecting system 6A is configured to transfer the powder 9A having a weight set in advance from the first container 90A to the second container 95A by repeating the operation involving performing the work of collecting, moving, and discharging the powder 9A with the powder collector 10A a plurality of times, the above-mentioned operation (in particular, the operation involving performing the work of collecting, moving, and discharging the powder 9A illustrated in FIG. 13 to FIG. 17) is repeated in the same manner a required number of times.

Figure 18:
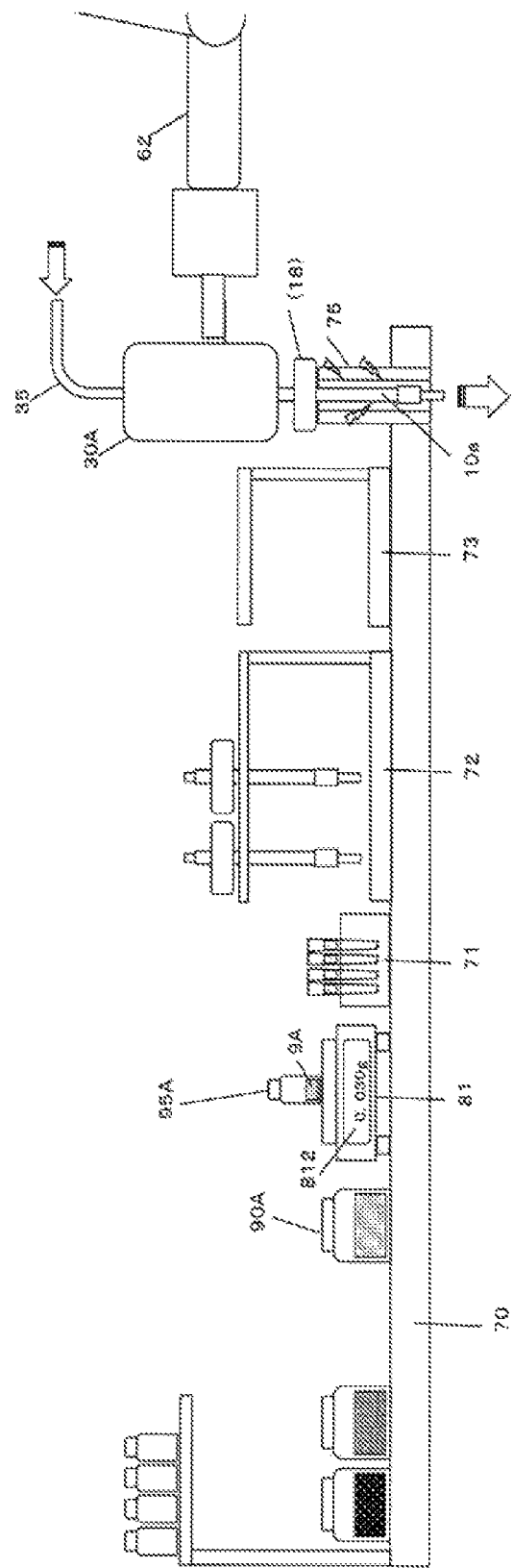
FIG. 18 is an explanatory view for illustrating an operation state of the work of cleaning the powder collector after the used collecting part is removed in the automatic powder collecting system of FIG. 9.

Further, when the automatic powder collecting system 6A finishes the whole operation involving performing the work of collecting, moving, and discharging the powder 9A, the automatic powder collecting system 6A performs the work of cleaning the portion 10a of the powder collector after the used collecting part 14 is removed as illustrated in FIG. 18. This work of cleaning is performed after the used collecting part 14 is removed from the powder collector 10A with the disposal portion (not shown) or before the used powder collector 10A is removed from the support 30A and returned to the second holder portion 72 in order to perform the work of collecting subsequent powder of a different kind and the like.

In this case, through operation of the robot arm 62 and the robot hand 63, the portion 10a of the powder collector is moved to the position of the cleaning treatment portion 75, and then a lower portion (relaying part 17 and connecting pipe 25 for adaptation) of the portion 10a of the powder collector 10A is moved to a position (cleaning position) at which the lower portion enters the tubular treatment portion 751. Further, when the movement of portion 10a of the powder collector 10A is finished, the air supply device 52 is operated to perform the air supply operation. Further, when the cleaning treatment portion 75 includes the suction device connected to the tubular treatment portion 751, the suction device is operated to perform the suction operation alone or perform the suction operation together with the air supply operation by the air supply device 52.

With this, in the portion 10a of the powder collector after the collecting part 14 is removed, when the air supply operation (or the suction operation or both of the operations) is performed in the cleaning treatment portion 75, a gas fed by air supply (or a gas to be sucked) passes through the second filter part 18, and thereafter, passes through the air passage 16 of the relaying part 17 and the air passage 26 of the connecting pipe 25 for adaptation to be discharged to the outside (treatment tube of the cleaning treatment portion 75).

As a result, the powder 9A adhering to and remaining in the second filter part 18 in the portion 10a of the powder collector and the powder 9A adhering to and remaining in each of the air passages 16 and 26 are removed by being discharged to the outside together with the above-mentioned air, and the inside of the second filter part 18 and the inside of each of the air passages 16 and 26 are cleaned. Further, in this case, when the suction operation is performed, even in the case in which the powder 9A remains on and adheres to an outer surface of the relaying part 17 and an outer surface of the connecting pipe 25 for adaptation, the powder 9A is also removed through suction action, and each of the outer surfaces is also cleaned.

Further, in this case, as necessary, vibration may be applied to the powder collector 10A by operating the vibration device 37 in the support 30A. With this, the powder 9A adhering to the inside and the outer surface of the air passage of the powder collector 10A so as to remain thereon can be shaken off to be removed into the treatment tube of the cleaning treatment portion 75.

Through the above-mentioned cleaning work, the powder 9A remaining on and adhering to the portion 10a of the powder collector after the used collecting part 14 is removed can be removed. As a result, even when the portion 10a of the powder collector is used again to perform the work of collecting the subsequent powder 9A and the like, there is no risk in that the powder 9A remaining on the portion 10a of the powder collector be excessively accommodated in the second container 95A when being discharged thereto.

Next, when the automatic powder collecting system 6A performs the work of collecting the subsequent powder 9B of a different kind and the like, the automatic powder collecting system 6A is operated as described below.

Figure 19:
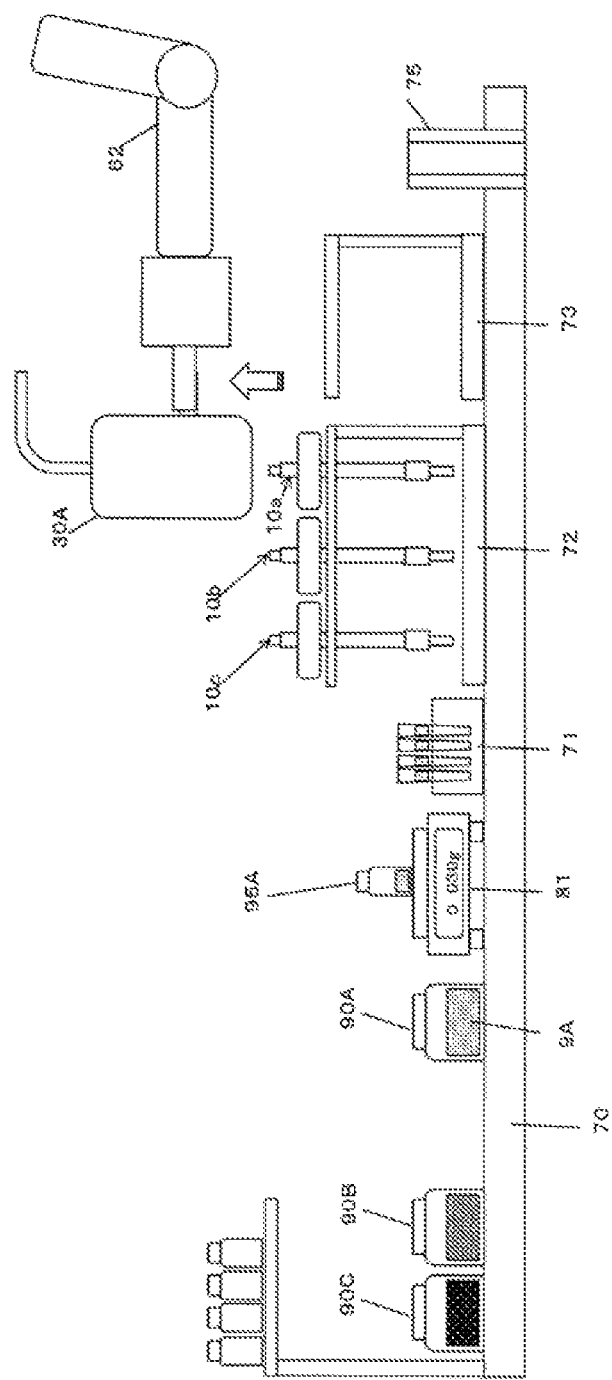
FIG. 19 is an explanatory view for illustrating an operation state of preparation work at a time when the work of collecting each powder of a different kind and the like are continuously performed in the automatic powder collecting system of FIG. 9.

First, as illustrated in FIG. 19, the automatic powder collecting system 6A performs the work of removing (the portion 10a of) the used powder collector 10A previously from the support 30A and returning the powder collector 10A to the second holder portion 72. Then, as illustrated in FIG. 20, the automatic powder collecting system 6A performs the work of removing the support 30A from the robot hand 63 of the robot arm 62 and returning the support 30A to the third holder portion 73.

Figure 20:
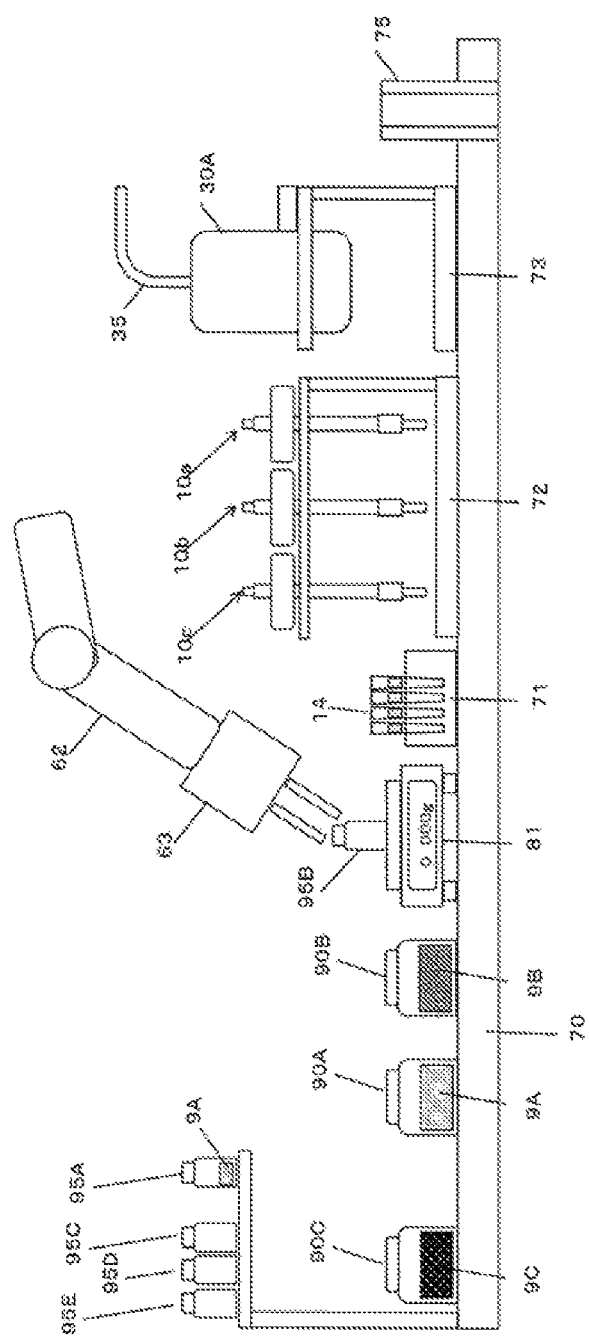
FIG. 20 is an explanatory view for illustrating an operation state of subsequent preparation work to be continued in the automatic powder collecting system of FIG. 19.

After that, through operation of the robot arm 62 and the robot hand 63, the automatic powder collecting system 6A performs the work of returning the first container 90A in which the previously handled powder 9A is accommodated and the second container 95A in which the powder 9A is transferred to be accommodated to original positions, the work of moving the first container 90B in which the subsequent powder 9B is accommodated to the collection work position, and the work of placing the second container 95B configured to collect the subsequent powder 9B and then accommodate the powder 9B for transfer on the measuring platform 811 of the scale 81 (FIG. 20).

Figure 21:
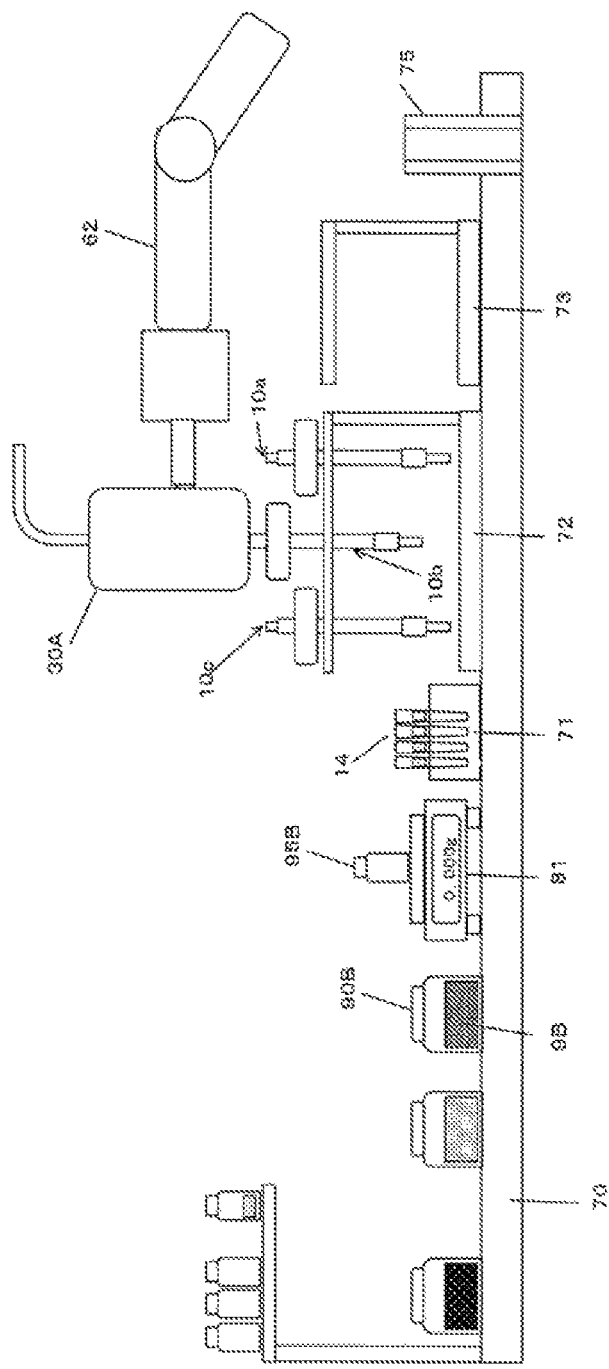
FIG. 21 is an explanatory view for illustrating an operation state of the work of holding a new powder collector (portion excluding the collecting part) in the automatic powder collecting system of FIG. 19.

Then, as illustrated in FIG. 21, through operation of the robot arm 62 and the robot hand 63 of the robot device 61, the automatic powder collecting system 6A performs the work of gripping and holding again the support 30A in the powder collecting device 1A with the robot hand 63 and thereafter mounting the portion (remaining portion excluding the collecting part 14) 10b of another powder collector in the powder collecting device 10A to the held support 30A.

In the automatic powder collecting system 6A, through use of the portion 10b of the powder collector 10A by replacement, the powder 9A remaining on and adhering to the second filter part 18 of the powder collector 10A (or the portion 10a thereof) is prevented from being mixed in the second container 95B in the work of discharging the powder 9B and the like, for example, unlike the case in which the powder collector 10A (or the portion 10a thereof) used in the work of collecting the previous powder 9A and the like is re-used in the work of collecting the powder 9B and the like.

Figure 22:
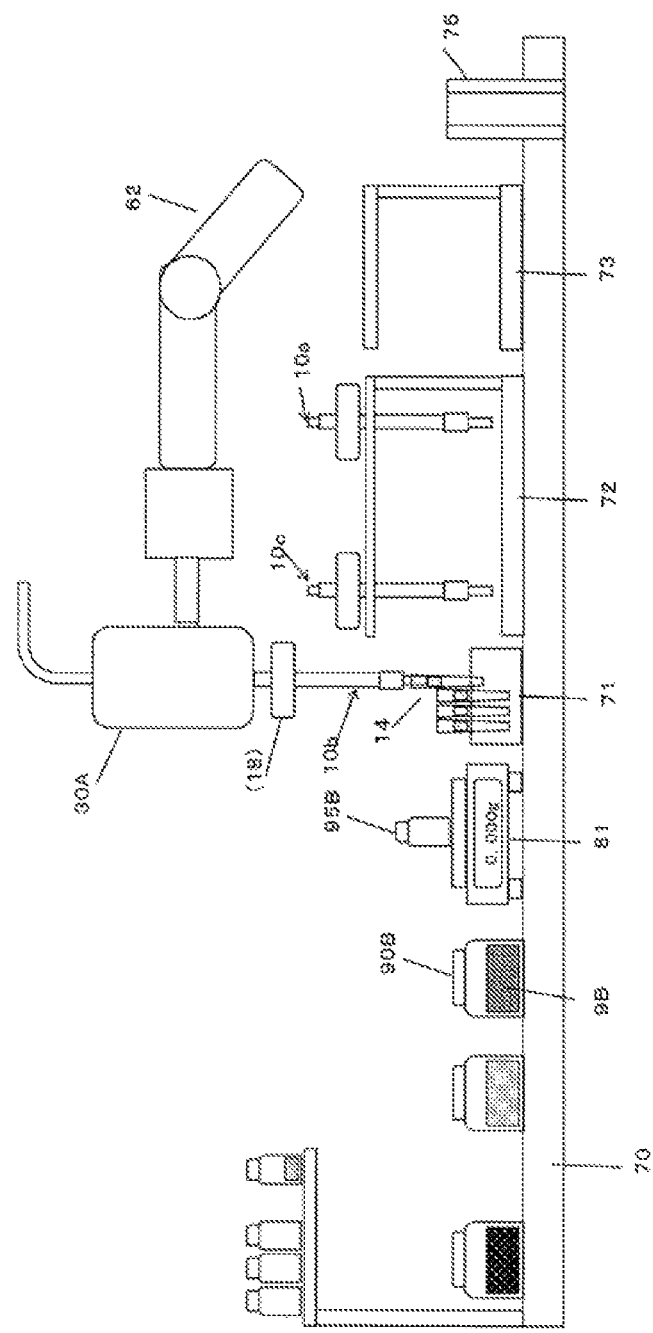
FIG. 22 is an explanatory view for illustrating an operation state of the work of mounting a new collecting part to the powder collector in the automatic powder collecting system of FIG. 21.

Then, as illustrated in FIG. 22, the automatic powder collecting system 6A performs the work of mounting a new collecting part 14 (having the first filter part 15 arranged thereon) to the mounted portion 10b of the powder collector.

In this case, the collecting part 14 to be newly mounted may have the same configuration as that of the collecting part 14 used at a time of collecting the previous powder 9A or may have a configuration in which a collection amount is different.

Further, in the automatic powder collecting system 6A, through use of the powder collector 10A having the new collecting part 14 mounted thereto by replacement, the previous powder 9A remaining on and adhering to the collecting part 14 and the first filter part 15 is prevented from being mixed in the second container 95B in the work of collecting and discharging the powder 9B to be subsequently handled and the like, for example, unlike the case of re-using the collecting part 14 and the first filter part 15 having been used in the work of collecting the previous powder 9A and the like.

Thus, in the automatic powder collecting system 6A, when the work of collecting and discharging each powder of a different kind (for example, the powder 9B) and the like are performed, a foreign matter (for example, the powder 9A) is reliably prevented from being mixed.

When the above-mentioned work is carried out, the automatic powder collecting system 6A is brought into a completed state as an automatic powder collecting system configured to perform the work of collecting the powder 9B and the like (FIG. 22).

Figure 23:
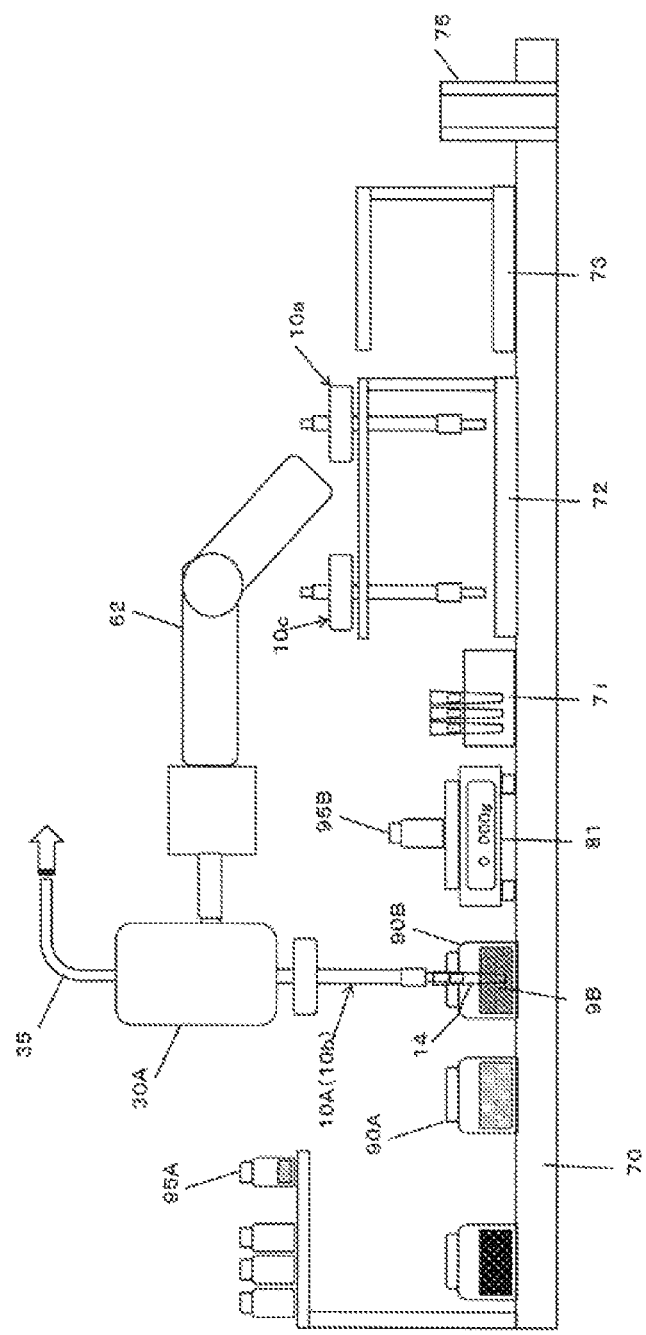
FIG. 23 is an explanatory view for illustrating an operation state of the work of collecting each powder of a different kind by the powder collector in the automatic powder collecting system of FIG. 22.

Then, as illustrated in FIG. 23, the automatic powder collecting system 6A performs the work of collecting the powder 9B with the new powder collector 10A (powder collector including the portion 10b of the powder collector and the new collecting part 14) mounted to the support 30A held by the robot hand 63.

The subsequent operations are performed in the same manner as in each of the operations during the above-mentioned work of collecting, moving, discharging, and cleaning the powder 9A and the like.

In the automatic powder collecting system 6A, when the powder 9A, the powder 9B, and the like collected by the powder collector 10A are discharged in a small amount, for example, it is only required that discharge be performed as described below.

Specifically, in the system 6A, a discharge operation is set to be performed under a condition that the air supply operation by the air supply device 52 is weakened as compared to that during a normal discharge operation. Further, the discharge operation is set to be performed while the powder collector 10A is vibrated through application of vibration from the vibration device 37 together with the weak air supply operation by the air supply device 52.

Further, the discharge operation is set to be performed only through application of vibration from the vibration device 37.

Further, in the automatic powder collecting system 6A, when the powder 9A, the powder 9B, and the like collected by the powder collector 10A are discharged under a state in which a part of the powder 9A, the powder 9B, and the like collected in the air passage 13 of the collecting part 14 is left, it is only required that discharge be set to be performed as described below.

Specifically, in the collecting system 6A, when the discharge of a required amount of the powder 9A, the powder 9B, and the like is completed, the vibration operation by the vibration device 37 is stopped so that the powder 9A, the powder 9B, and the like to be left do not drop to be discharged from the collecting part 14, whereas the air intake operation by the air intake device 51 is set to be performed.

As described above, in the powder collecting device 1A using the powder collector 10A, and in the automatic powder collecting system 6A formed through use of the powder collecting device 1A and the like, the work of collecting each powder 9 of a different kind and the like can be performed efficiently (or performed automatically, efficiently, and stably) while a foreign matter such as another kind of powder is easily prevented from being mixed.

Further, in particular, in the automatic powder collecting system 6A, even when the work of collecting powder harmful for human bodies and the like are required, a human is not involved in the work, and hence the work can be automatically and efficiently performed without a concern about the adverse effects on human bodies.

<Modification Example of Automatic Powder Collecting System>

In the automatic powder collecting system 6A according to the first embodiment, apart of the configuration thereof can be changed as exemplified below.

Figure 24:
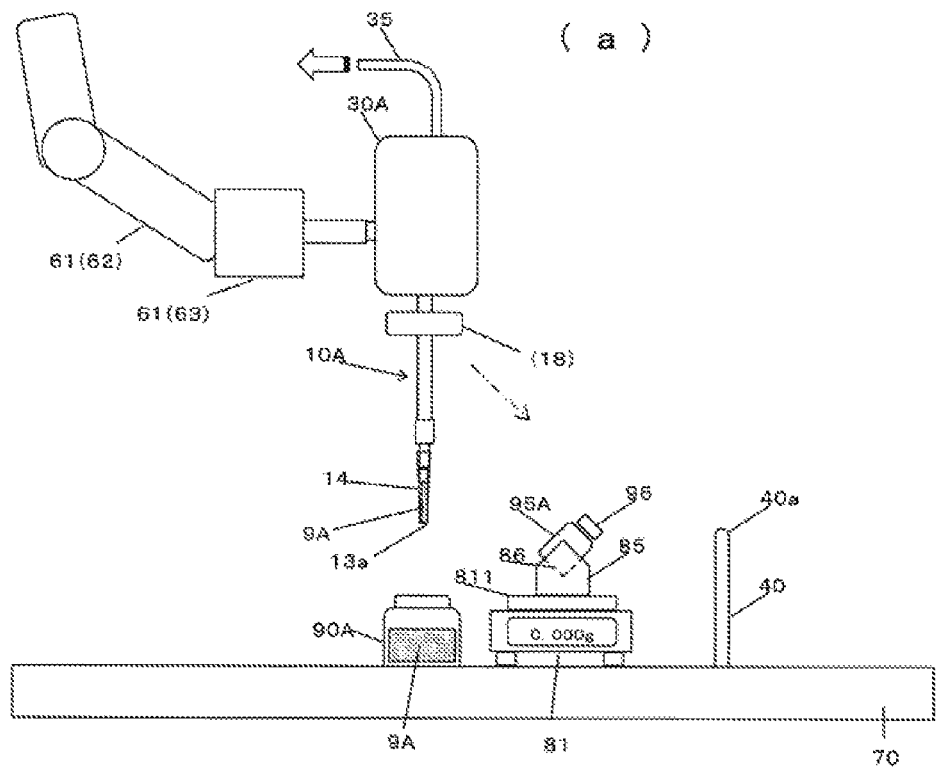
FIG. 24 are explanatory views for illustrating a modification example obtained by changing a part of the automatic powder collecting system according to the first embodiment and an operation state after powder is collected.
Figure 24:
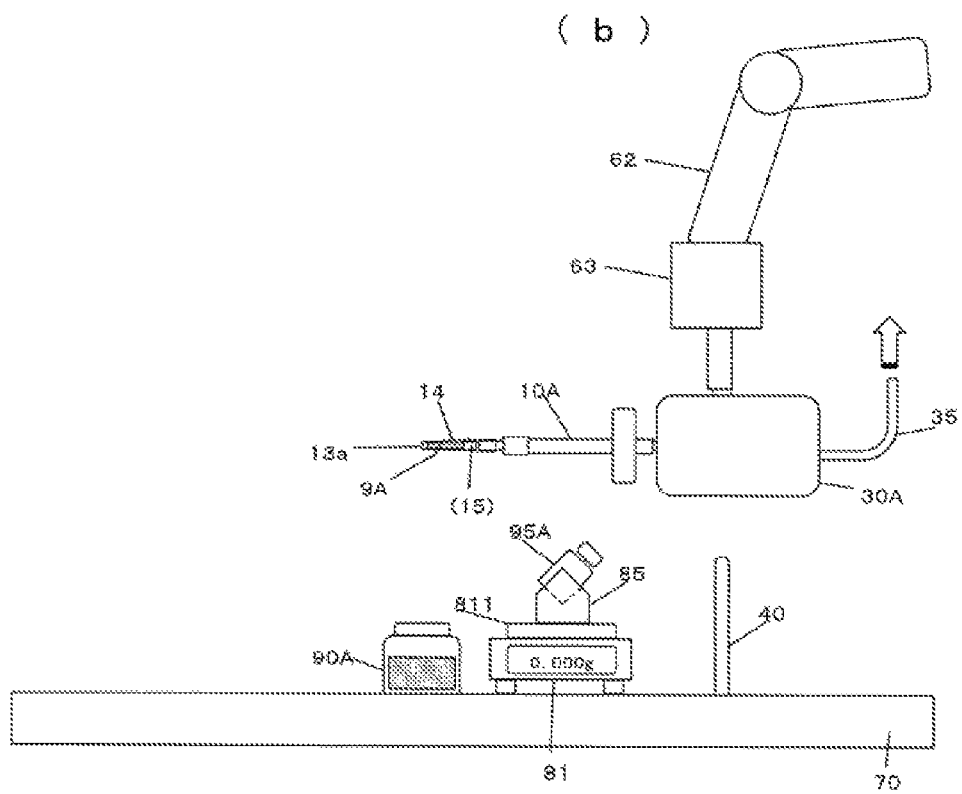
Figure 25:
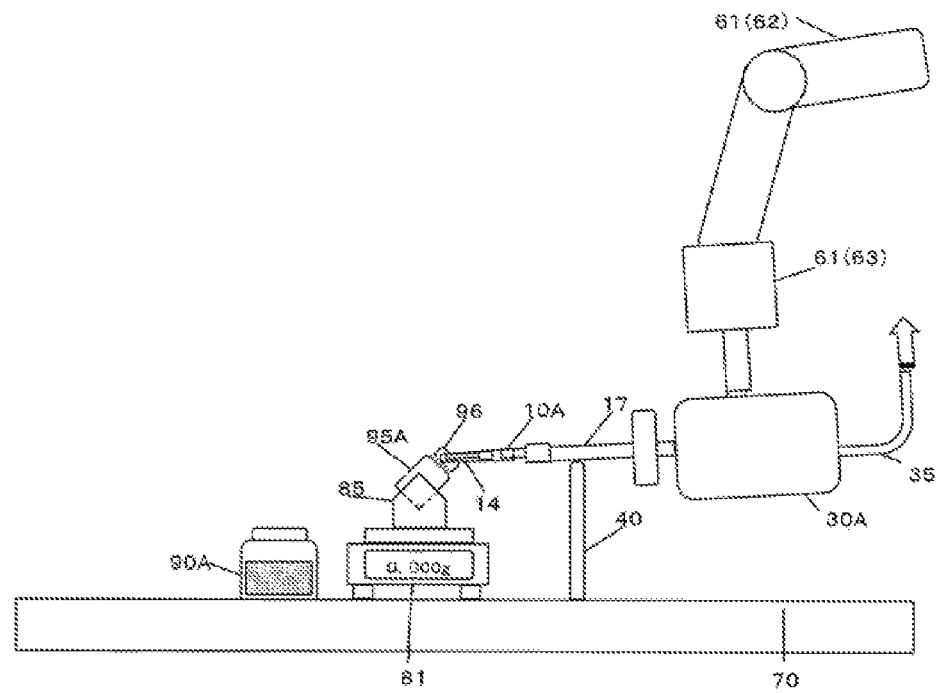
FIG. 25 are explanatory views for illustrating an operation state at a time when the powder is discharged in the automatic powder collecting system of FIG. 24.
Figure 25:
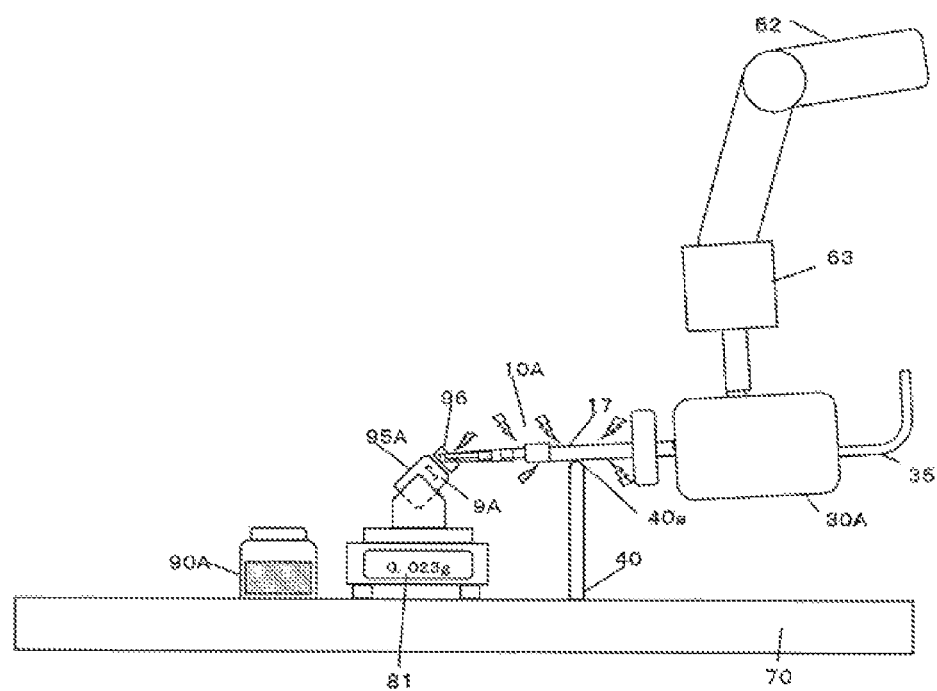

For example, as illustrated in FIG. 24 and FIG. 25, the automatic powder collecting system 6A may have a configuration in which, in the operation of the robot device 61, the robot arm 62 and the robot hand 63 hold the powder collector 10A held by the robot hand 63 so that the collecting part 14 is laid down (FIG. 24(*b*)) after the work of collecting powder (for example, the powder 9A) is finished (FIG. 24(*a*)), and perform the work of moving and discharging the powder while maintaining the state (FIG. 25).

The robot arm 62 and the robot hand 63 illustrated in FIG. 24 hold the powder collector 10A having a substantially linear bar-like outer appearance in its entirety except for the second filter part 18 so that the entire collector stands substantially along a vertical direction with the collecting part 14 being placed at a lowest position as illustrated in FIG. 24(*a*) until the work of collecting the powder 9A is finished. Further, when the work of collecting the powder 9A is finished, as illustrated in FIG. 24(*b*), the robot arm 62 and the robot hand 63 move and newly hold the powder collector 10A so that the entire collector is laid down at an angle of about 90° with the lower end opening 13*a* of the collecting part 14 being substantially the center (fulcrum point) at a position above the first container 90A having collected the powder 9A. As illustrated in FIG. 24(*b*), the powder collector 10A in this case is brought into a state in which the entire powder collector 10A having a substantially linear bar-like outer appearance is laid down substantially horizontally.

Further, as illustrated in FIG. 25, the robot arm 62 and the robot hand 63 in this case are operated so as to perform the work of moving the powder collector 10A from the powder collection position to the powder discharge position and the work of discharging the powder while holding the powder collector 10A under a state in which the entire powder collector 10A is laid down substantially horizontally.

With this, the powder collector 10A is held so that the lower end opening 13*a* of the collecting part 14 is changed from a posture facing downward to a posture facing in a substantially horizontal direction. During this operation, the air intake device 51 is continuously operated to continue air intake.

As a result, in the powder collector 10A after collection of the powder 9A is finished, the powder 9A collected to be kept in the air passage 13 of the collecting part 14 is held stably as compared to the case in which the powder 9A is collected in the collecting part 14 under a state of standing substantially along the vertical direction. Thus, the powder collector 10A is maintained in a state in which there is no risk in that a part of the powder 9A collected in the collecting part 14 that is laid down leaks out from the air passage 13 of the collecting part 14, for example, due to the adverse effects of action of gravity or action of vibration generated at a time of start and stop of movement.

Further, when the automatic powder collecting system 6A is configured to perform the work of moving and discharging the powder while holding the powder collector 10A under a state in which the powder collector 10A is laid down substantially horizontally after the work of collecting the powder 9A is finished as described above, at least one of two configurations described below can be additionally adopted.

According to the first configuration, as illustrated in FIG. 24 and the like, the automatic powder collecting system 6A is configured so that an auxiliary vibration member 40, with which a part of the powder collector 10A can be brought into contact during the work of discharging powder (for example, the powder 9A), is set in the vicinity of the powder discharge position, and that the robot arm 62 and the robot hand 63 of the robot device 61 move the powder collector 10A to a position at which the part of the powder collector 10A can be brought into contact with the auxiliary vibration member 40 when the work of discharging is performed (FIG. 25(*a*)). Further, the automatic powder collecting system 6A is configured so that the vibration device 37 in the support 30A is operated to vibrate the powder collector 10A (FIG. 25(*b*)).

The auxiliary vibration member 40 is a bar-like or plate-like member having, in an upper end portion or the like, a contact portion 40*a* with which the part of the powder collector 10A is brought into contact. Further, the auxiliary vibration member 40 is arranged under a state in which the contact portion 40*a* is fixed to a position of the work table 70 at which the contact portion 40*a* can be brought into contact with the part of the powder collector 10A when the work of discharging the powder is performed. The part of the powder collector 10A which is brought into contact with the contact portion 40*a* of the auxiliary vibration member 40 is, for example, the relaying part 17 as illustrated in FIG. 25(*a*).

In the automatic powder collecting system 6A adopting the first configuration, the work of discharging the powder 9A collected in the collecting part 14 of the powder collector 10A held under a state of being laid down substantially horizontally to the second container 95A is performed while the powder collector 10A is vibrated by the vibration device 37 as described below.

Specifically, in the automatic powder collecting system 6A, vibration from the vibration device 37 can be reliably and satisfactorily transmitted to (the collecting part 14 of) the powder collector 10A as compared to the case in which the part (relaying part 17) of the powder collector 10A is not brought into contact with the contact portion 40a of the auxiliary vibration member 40. That is, in the powder collector 10A receiving vibration from the vibration device 37, the part thereof (relaying part 17) receives an impact every time the part is brought into contact with the fixed contact portion 40a of the auxiliary vibration member 40, and the impact is efficiently transmitted as vibration from the relaying part 17 to the collecting part 14. Therefore, the collecting part 14 itself is reliably vibrated.

As a result, in the automatic powder collecting system 6A in this case, discharge of the powder 9A collected in the collecting part 14 of the powder collector 10A can be stably performed on a small amount basis.

Further, when the first configuration is adopted, the automatic powder collecting system 6A may have the following configuration. An electronic scale capable of outputting information on a measured value as electronic data to the outside is employed as the scale 81. A measuring portion 82 of the electronic scale 81 is connected to the control unit 65 as indicated by the two-dot chain lines of FIG. 7, and the drive of the vibration device 37 in the support 30A is controlled through the drive control part 375 for a vibration device based on data on the measured value obtained from the measuring portion 82.

In this case, it is only required that the control unit 65 perform feedback control of the drive of the vibration device 37 through the drive control part 375 so as to adjust the magnitude and time of vibration of the vibration device 37, for example, based on a value of a difference between the data on the measured value obtained from the measuring portion 82 and the discharge amount (amount to be transferred to be accommodated) of the powder to the second container 95A.

According to the second configuration, as illustrated in FIG. 24 and the like, the automatic powder collecting system 6A has the following configuration. A container (for example, the second container 95A) which is configured to take in powder (for example, the powder 9A) discharged from the powder collector 10A through an upper end opening 96 and accommodate the powder is set so that the upper end opening 96 is inclined with respect to the horizontal direction, and the robot arm 62 and the robot hand 63 of the robot device 61 move the powder collector 10A so that the collecting part 14 enters the second container 95A from the inclined upper end opening 96 of the second container 95A when the work of discharging the powder is performed.

For example, as illustrated in FIG. 24(a) and the like, setting of the second container 95A under a state in which the upper end opening 96 is inclined is performed through use of a container mounting base 85 including an inclined holding portion 86 configured to hold the entire second container 95A under a state in which the entire second container 95A is inclined. In this case, both of the second container 95A and the container mounting base 85 are placed on the measuring platform 811 of the scale 81. Further, it is only required that the upper end opening 96 of the second container 95A be inclined so as to have an inclination angle of, for example, about 45°±10° with respect to the horizontal direction.

In the automatic powder collecting system 6A adopting the second configuration, when the powder 9A collected in the collecting part 14 of the powder collector 10A held under a state of being laid down substantially horizontally is discharged to the second container 95, the collecting part 14 enters the second container 95A from the inclined upper end opening 96 of the second container 95A. Therefore, the lower end opening 13a of the collecting part 14 is surrounded by a part of an inner wall surface of the second container 95A.

As a result, in the automatic powder collecting system 6A, even when a part of the powder 9A discharged from the lower end opening 13a of the collecting part 14 of the powder collector 10A swiftly flies out in response to action of vibration or the like at a time of discharge, the part of the powder 9A may hit against the inner wall surface of the second container 95A. Therefore, scattering of the powder 9A to the outside of the second container 95A can be prevented or suppressed.

With this, when the work of discharging the powder is performed, it may not be required to separately provide a surrounding member configured to prevent scattering of powder by surrounding the upper end opening 96 of the second container 95A. Meanwhile, in order to reliably prevent scattering of powder to the outside of the second container 95 at a time of the work of discharging the powder also in the case of the automatic powder collecting system 6A, for example, a suction mechanism capable of sucking powder that scatters within a range surrounding the upper end opening 96 of the second container 95 may be separately arranged.

In the automatic powder collecting system 6A of the modification example illustrated in FIG. 24 and FIG. 25, the first configuration and the second configuration are simultaneously adopted.

Further, when only the first configuration is adopted, the second container 95A accommodating the powder 9A to be discharged is placed on the measuring platform 811 of the scale 81 so that the upper end opening 96 is brought into a substantially horizontal state (see, for example, FIG. 10 and the like). In this case, it is only required that the powder 9A collected in the collecting part 14 of the powder collector 10A held under a state of being laid down substantially horizontally be discharged so as to drop into the second container 95A by causing the powder 9A to pass through the upper end opening 96 of the second container 95A in a substantially horizontal state.

Further, when only the second configuration is adopted, the work of moving and discharging powder is performed under a state in which the powder collector 10A is held so as to stand substantially along the vertical direction with the collecting part 14 being placed at a lowest position (see, for example, FIG. 15, FIG. 16, and the like). In this case, it is only required that the work of discharging the powder 9A collected in the collecting part 14 placed at the lowest position of the powder collector 10A held so as to stand substantially along the vertical direction to the second container 95 be performed by moving the powder collector 10A so that the collecting part 14 enters the second container 95A from the inclined upper end opening 96 of the second container 95A.

Besides, it is preferred that the automatic powder collecting system 6A that independently adopts the first configuration or the second configuration be employed, for example, in the case of using, as the second container 95, a container in which an opening area of the upper end opening 96 is larger than an opening area of the lower end opening 13a of the collecting part 14.

Further, as necessary, a part of the second configuration may be changed as described below. Specifically, when the work of discharging powder is performed, after the powder collector 10A held under a state of being laid down substantially horizontally is newly held under a state of being inclined so as to be substantially orthogonal to the inclined upper end opening 96 of the second container 95A, the inclined powder collector 10A is moved so that the collecting part 14 placed at the lowest position of the powder collector 10A enters the second container 95A from the inclined upper end opening 96 of the second container 95A.

Further, as a third configuration different from the first and second configurations, the following configuration can also be adopted. When a flask-like container such as a measuring flask is used as the second container 95 for transfer of powder, the flask-like container is set on the scale 81 so that an opening in an end portion that is elongated and protrudes from a part of a container body is directed in a horizontal direction, and the work of discharging the powder by the powder collector 10A held under a state of being laid down substantially horizontally is performed.

When this configuration is adopted, the work of discharging the powder is performed after the powder collector 10A held under a state of being laid down substantially horizontally is moved so that the lower end opening 13a of the collecting part 14 of the powder collector 10A enters the container body through the opening of the flask-like container directed in the horizontal direction.

Second Embodiment

Figure 26:
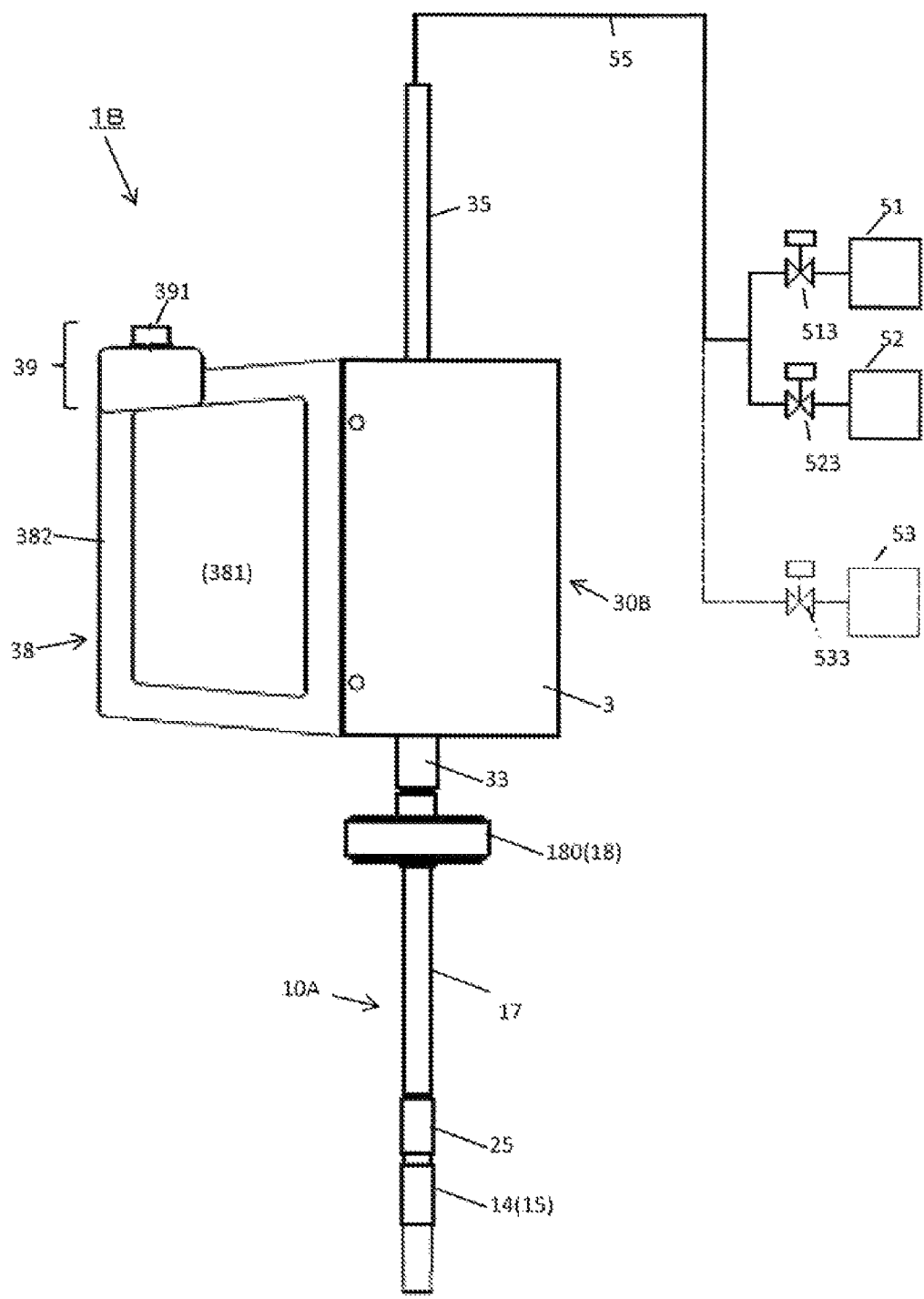
FIG. 26 is a perspective view for illustrating one state (state in which a powder collector and a support are integrated with each other) of a powder collecting device according to a second embodiment.
Figure 27:
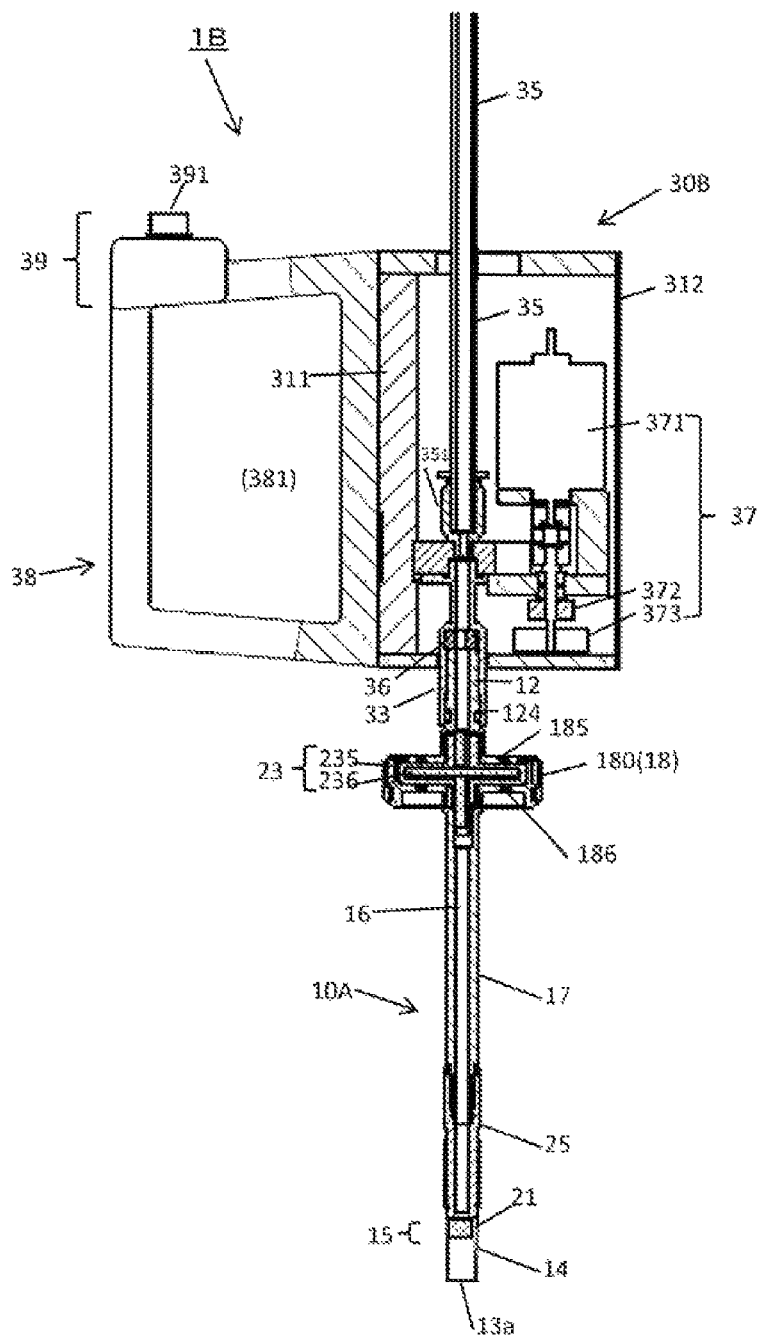
FIG. 27 is a schematic sectional view for illustrating an internal structure and the like of the powder collecting device according to the second embodiment.

FIG. 26 and FIG. 27 are each a view for illustrating a powder collecting device 1B according to a second embodiment.

The powder collecting device 1B has the same configuration as that of the powder collecting device 1A (for robot operation) according to the first embodiment except that the powder collecting device 1B can be used by manual operation and that a support 30B which is partially different from the support 30A is used. That is, the powder collecting device 1B is different from the powder collecting device 1A in that the support 30B includes a gripping part 38 and a manipulation part 39 in place of the arm coupling portion 313 provided to the support 30A in the first embodiment. The gripping part 38 is gripped by the hand of an operator. The manipulation part 39 is manipulated by the operator by hand after selection of an operation.

The gripping part 38 is a site to be used for enabling the operator to hold and use the powder collecting device 1B with the hand. Specifically, the gripping part 38 is a site having a shape including at least a through hole 381 enabling the hand (actually, fingers) of the operator to be inserted, and a portion 382 that is actually gripped with the hand. The manipulation part 39 includes, for example, switches 391 configured to turn on/off the operations of the air intake device 51 and the air supply device 52 and the operation of the vibration device 37 in the support 30B, and a display portion (including a lighting lamp or the like) provided as necessary.

Further, the pipe 35 in the support 30B of the powder collecting device 1B is connected to the air intake device 51 and the air supply device 52 in the same manner as in the case of the pipe 35 in the powder collecting device 1A according to the first embodiment. There are the plurality of powder collectors 10A each having the same configuration as that of the powder collector 10A in the powder collecting device 1A according to the first embodiment.

Also in the powder collecting device 1B for manual operation, in substantially the same manner as in the powder collecting device 1A according to the first embodiment (portions excluding portions which are automated through use of the robot device 61), the work of collecting powder and the like can be performed by manual operation, and the work of collecting each powder 9 of a different kind and the like can be efficiently performed while a foreign matter such as powder of another kind is easily prevented from being mixed.

Third Embodiment

Figure 28:
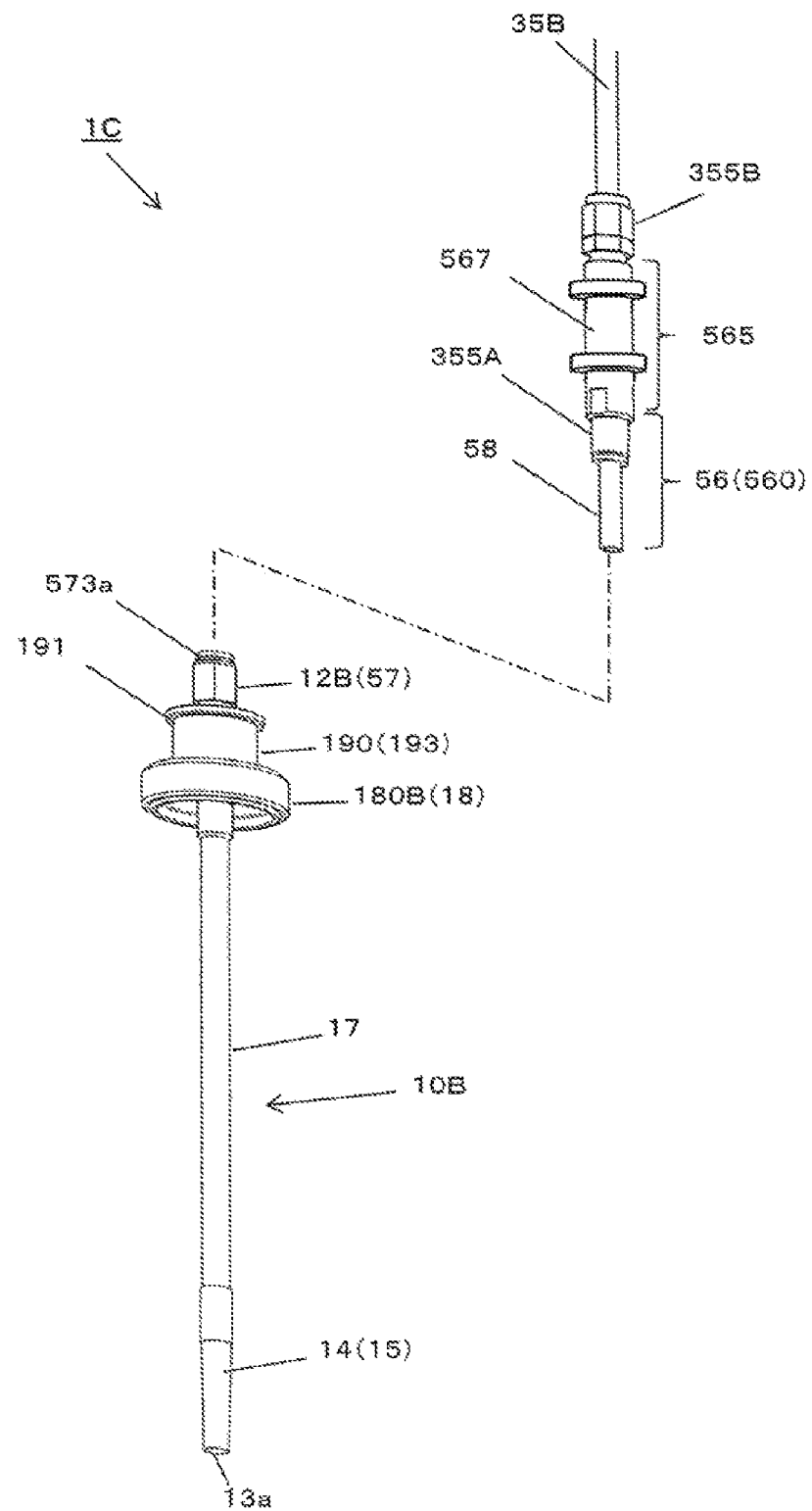
FIG. 28 is a perspective view for illustrating a powder collecting device according to a third embodiment.
Figure 29:
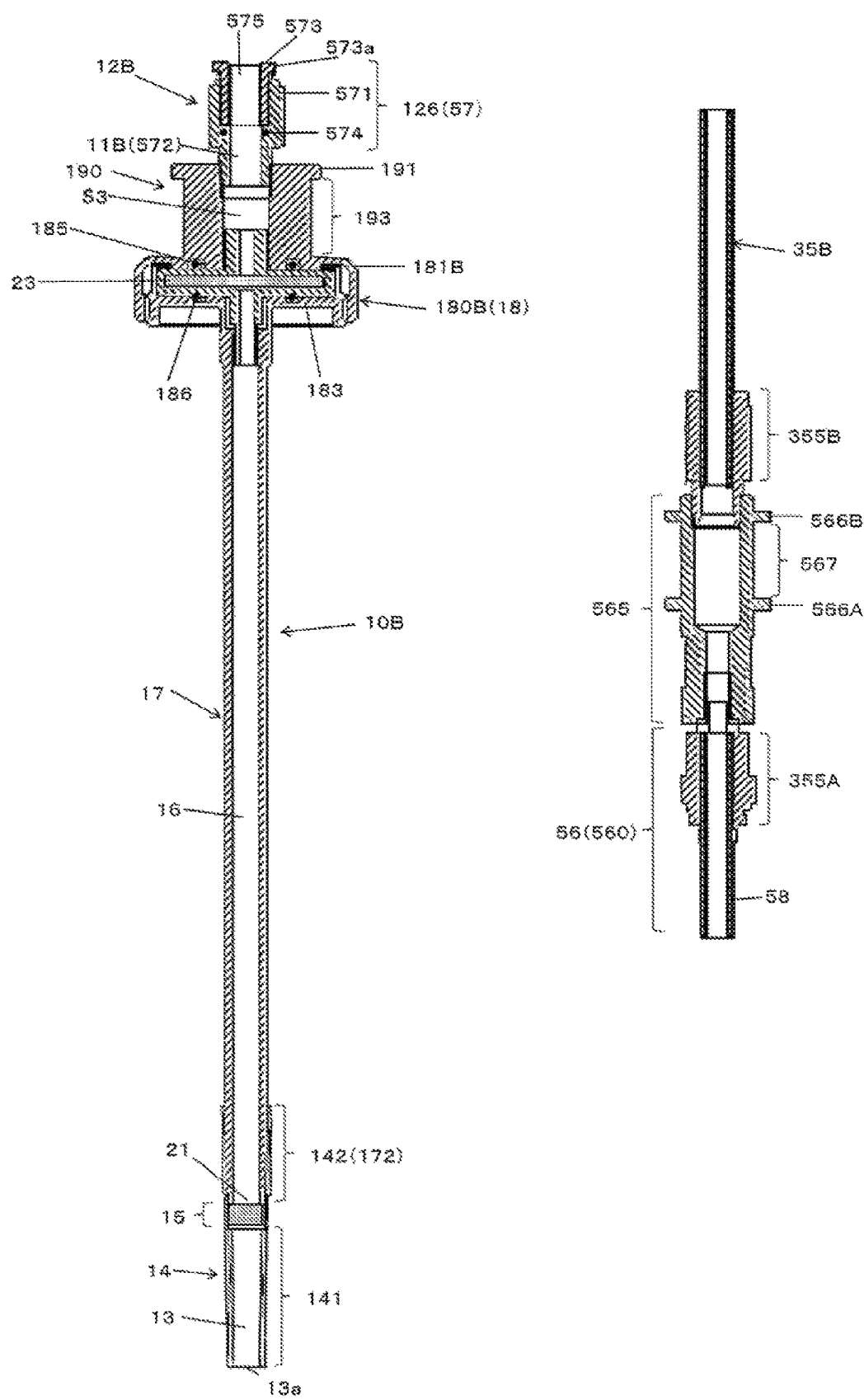
FIG. 29 is a schematic sectional view for illustrating a powder collector and a pipe in the powder collecting device of FIG. 28.
Figure 30:
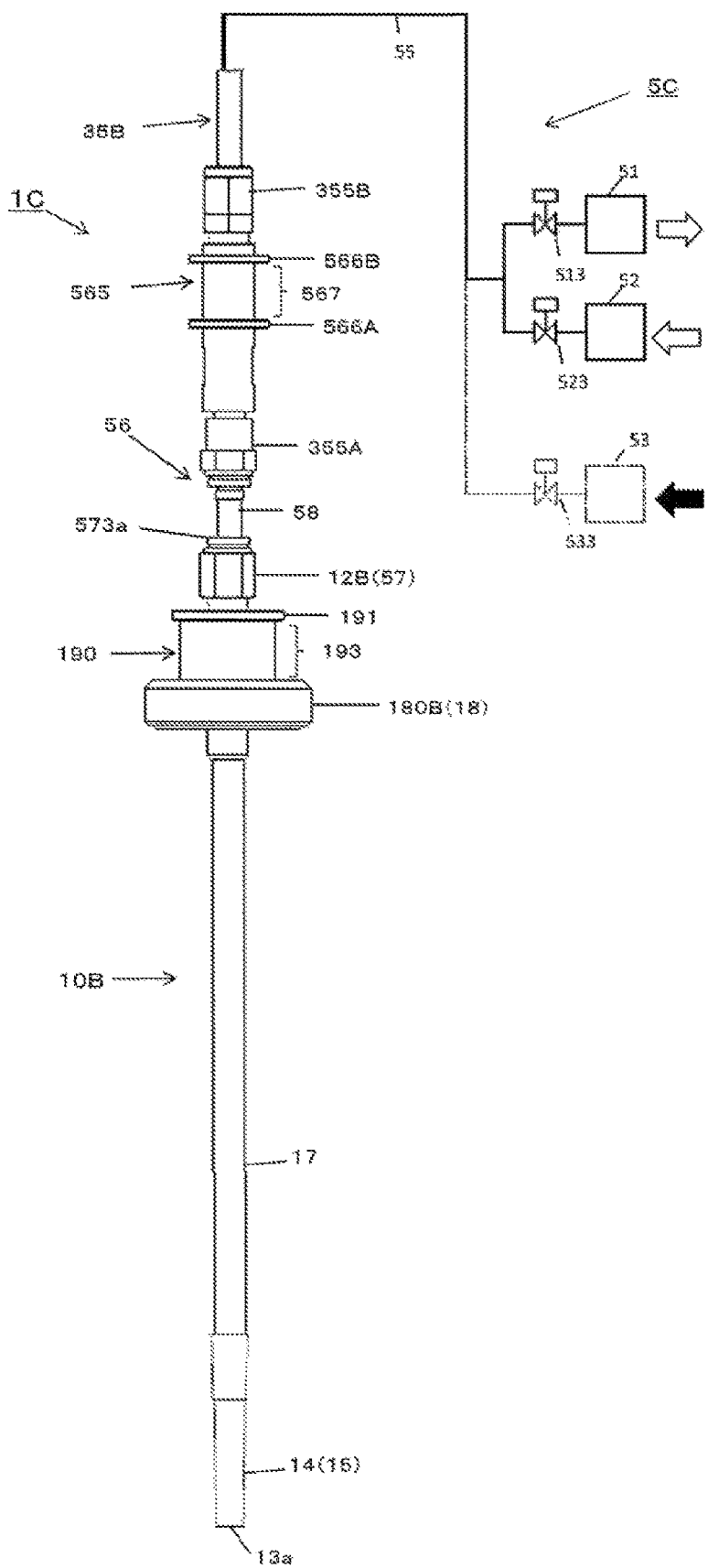
FIG. 30 is an explanatory view for illustrating an overview of a system component of an automatic powder collecting system including the powder collecting device according to the third embodiment.

FIG. 28 to FIG. 30 are each a view for illustrating a powder collecting device 1C using a powder collector 10B according to a third embodiment.

FIG. 28 is a view for illustrating a state in which the powder collector 10B and a pipe 35B are separated from each other in the powder collecting device 1C (actually, a state in which the powder collector 10B is removed from the pipe 35B). FIG. 29 is a view for illustrating cross sections of the powder collector 10B and the pipe 35B. FIG. 30 is a view for illustrating an overview of a system component 5C forming main portions of an automatic powder collecting system when the powder collecting device 1C under a state in which the powder collector 10B and the pipe 35B are integrated with each other (actually, a state in which the powder collector 10B is mounted to the pipe 35B) is used in combination with a robot device.

<Configuration of Powder Collecting Device>

As illustrated in FIG. 28, FIG. 30, and the like, the powder collecting device 1C is a device at least including the pipe 35B for air intake and air supply including a connected part 56, and a plurality of powder collectors 10B, which are used by being removably mounted to the connected part 56 of the pipe 35B and are configured to collect powder through use of a suction force caused by air intake from the pipe 35B and discharge the collected powder through use of a discharge force caused by air supply from the pipe 35B. In FIG. 28, FIG. 30, and the like, only one of the plurality of powder collectors 10B is illustrated for convenience.

The powder collecting device 1C is different from the powder collecting device 1A according to the first embodiment (see FIG. 2 and the like) in that the support 30A is not adopted, and that a system in which the powder collector 10B is removably connected to the pipe 35 is adopted as described later.

Further, powder handled by the powder collecting device 1C (powder collector 10B) is the same as the powder handled by the powder collecting device 1A (powder collector 10A) according to the first embodiment, but may be different therefrom.

<Configuration of Powder Collector>

As illustrated in FIG. 28, FIG. 29, and the like, the powder collector 10B includes a connecting part 12B, the collecting part 14, the first filter part 15, the relaying part 17, and the second filter part 18. The connecting part 12B is removably mounted to the connected part 56 of the pipe 35B, and has an air passage 11B to be connected to the pipe 35B. The collecting part 14 has the air passage 13 in which powder is collected to be kept through use of the above-mentioned suction force reaching the air passage 13 of the collecting part 14 through the air passage 11B of the connecting part 12B. The first filter part 15 is arranged at a midway position of the air passage 13 of the collecting part 14, and is configured to block passage of the powder to be collected. The relaying part 17 has the air passage 16 connecting the air passage 11B of the connecting part 12B and the collecting part 14 to each other. The second filter part 18 is arranged in an end portion of the air passage 16 of the relaying part 17 on the connecting part 12 side, and is configured to block passage of the powder having passed through the first filter part 15.

The powder collector 10B is different from the powder collector 10A in the first embodiment (see FIG. 1, FIG. 6, and the like) in that a connecting part 12B having a different connection system is adopted, and a part of the storage container 180 of the second filter part 18 is changed due to the adoption of the connecting part 12B. However, the powder collector 10B has the same configuration as that of the powder collector 10A in the other main portions, that is, the collecting part 14, the first filter part 15, the relaying part 17, and the second filter part 18.

Further, the powder collector 10B does not adopt the connecting pipe 25 for adaptation in the first embodiment (see FIG. 5, FIG. 6, and the like), and hence the collecting part 14 is directly and removably mounted to the lower end portion 172 of the relaying part 17.

The connecting part 12B is a site to be located mainly on an upper end side at a time of use of the powder collector 10B. Further, as illustrated in FIG. 29, the connecting part 12B includes a site 126 to be connected to the connected part 56 of the pipe 35B with a one-touch mounting and dismounting joint.

The site 126 to be connected with the one-touch mounting and dismounting joint is formed of a one-touch mounting and dismounting joint 57 itself. The one-touch mounting and dismounting joint 57 is not limited to the one described below, and known one-touch mounting and dismounting joints can be suitably selected to be used.

The one-touch mounting and dismounting joint 57 in the first embodiment includes, for example, a cylindrical body portion 571, an open ring 573, a sleeve 574, and a lock claw (not shown) located between the open ring 573 and the elastic sleeve 574.

The body portion 571 has a two-stage through hole 572 penetrating through the body portion 571 in a longitudinal direction in a center portion. The through hole 572 includes a large-diameter hole portion arranged on an upper side, and a small-diameter hole portion arranged on a lower side. The large-diameter hole portion of the through hole 572 is a hole portion having an inner diameter and a length in which a part of the open ring 573, the sleeve 574, and the lock claw can be accommodated and arranged. Further, the small-diameter hole portion of the through hole 572 is a hole portion having an inner diameter and a length in which an auxiliary connecting pipe (58) on the pipe 35 side to be connected can be fitted. Further, the through hole 572 functions as a through hole also serving as the air passage 11B connected to the auxiliary connecting pipe (58) to be fitted.

Further, the body portion 571 has a lower end portion fixed to the auxiliary accommodating space S3 defined in a container upper portion 181B of a storage container 180B in the second filter part 18 through use of means such as a screw thread.

The open ring 573 is a tubular member having, in a center portion, a through hole 575 with an inner diameter and a length in which the auxiliary connecting pipe (58) on the pipe 35B side to be connected can be fitted, and a portion excluding a flange portion 573a in one end portion is movably accommodated in the large-diameter hole portion of the through hole 572 of the body portion 571. Further, at an upper end portion of the open ring 573 protruding from the through hole 572 of the body portion 571, the flange portion 573a having a diameter larger than the hole diameter of the through hole 572 is formed.

The sleeve 574 is a seal member arranged so as to be located on a deep side of the large-diameter hole portion in the through hole 572 of the body portion 571.

The lock claw is a member, which moves so as to fix and lock the auxiliary connecting pipe (58) when the open ring 573 moves to the deep side of the through hole 572 of the body portion 571 together with the auxiliary connecting pipe (58) at a time of connection to the auxiliary connecting pipe (58). Further, the lock claw is also a member configured to act so as to release a locked state when the open ring 573 is pushed into the deep side of the through hole 572 of the body portion 571 at a time of removal of the auxiliary connecting pipe (58).

As the container upper portion 181B, there is adopted a structure having a cylindrical protruding portion 190 that protrudes to an upper surface side.

The protruding portion 190 has the auxiliary accommodating space S3 as a through hole penetrating through the protruding portion 190 in the vertical direction in a center portion. A part of the second filter part 23 is accommodated in a lower portion of the auxiliary accommodating space S3.

Further, the protruding portion 190 has an outer peripheral surface portion between a flange portion 191 arranged in an upper end portion and the container upper portion 181B, and the outer peripheral surface portion is configured as a site 193 to be gripped and held by (the grip part 621 of) the robot hand 53.

Meanwhile, the connected part 56 of the pipe 35B includes a mounting portion 560 to be connected to the connecting part 12B of the powder collector 10B with a one-touch mounting and dismounting joint.

Further, the connected part 56 is connected to the pipe 35B through intermediation of an auxiliary gripping member 565 configured to ensure a site to be gripped and held by (the grip part 621 of) the robot hand 53.

The mounting portion 560 includes the auxiliary connecting pipe 58 to be used for mounting and dismounting connection to the one-touch mounting and dismounting joint 57 in the connecting part 12B of the powder collector 10B. The auxiliary connecting pipe 58 is a pipe member having stiffness, and a part thereof is used as a portion having an outer diameter and a length which can be fitted in the through hole 575 of the sleeve 573 and the small-diameter hole portion of the through hole 572 of the body portion 571 in the one-touch mounting and dismounting joint 57. The auxiliary connecting pipe 58 is connected to a lower portion side of the auxiliary gripping member 565 through intermediation of a pipe coupling member 355A.

The auxiliary gripping member 565 is a cylindrical member having a through hole in a longitudinal direction, and two flange portions 566A and 566B are formed at a required interval in the vertical direction on an outer peripheral portion of the auxiliary gripping member 565. In the auxiliary gripping member 565, an outer peripheral surface portion between the two flange portions 566A and 566B is configured as a portion 567 to be held, which is to be gripped by (the grip part 621 of) the robot hand 53 and a holding tool (776) of a holding member fixed to a movable cylinder of a mounting and dismounting work part (77) described later.

The pipe 35 is connected to an upper portion side of the auxiliary gripping member 565 through intermediation of a pipe coupling member 355B.

Removable connection between the connecting part 12B of the powder collector 10B and the connected part 56 of the pipe 35 through use of the one-touch mounting and dismounting joint 57 is performed as described below.

First, connection is performed by inserting a part of the auxiliary connecting pipe 58 forming the connected part 56 of the pipe 35 into the through hole 575 in the open ring 573 of the one-touch mounting and dismounting joint 57 forming the connecting part 12B. In this case, when the auxiliary connecting pipe 58 passes through the through hole 575 of the open ring 573 to reach the deep side of the small-diameter hole portion of the through hole 572 in the body portion 571, the lock claw is brought into the locked state. Simultaneously with this, the sleeve 574 tightly adheres to an outer peripheral surface of the auxiliary connecting pipe 58 to be sealed.

With this, the auxiliary connecting pipe 58 is fixed in the through hole 572 in the body portion 571 of the one-touch mounting and dismounting joint 57 so that the auxiliary connecting pipe 58 cannot move. Therefore, the auxiliary connecting pipe 58 can be easily connected to the connecting part 12B through intermediation of the one-touch mounting and dismounting joint 57.

Meanwhile, release of connect ion is performed as follows. When the open ring 573 of the one-touch mounting and dismounting joint 57 is maintained under a state of being moved so as to be pushed into the through hole 572 of the body portion 571 in contact with the flange portion 573a, the lock claw is brought into a state of releasing the locked state. Therefore, in this state, the auxiliary connecting pipe 58 is moved in a direction in which the auxiliary connecting pipe 58 is pulled out from the through hole 572 of the body portion 571. Thus, release of connection is performed.

With this, the auxiliary connecting pipe 58 is brought into a state of being movable in the through hole 575 (actually, including the through hole 575 of the sleeve 573) in the body portion 571 of the one-touch mounting and dismounting joint 57. Therefore, connection between the auxiliary connecting pipe 58 and the connecting part 12B can be easily released by completely pulling out the auxiliary connecting pipe 58 from the through hole 575.

As illustrated in FIG. 30, the powder collecting device 1C includes the air intake device 51, which is connected to the pipe 35B and is configured to perform air intake, and the air supply device 52, which is connected to the pipe 35B and is configured to perform air supply.

The configurations regarding the air intake device 51 and the air supply device 52 (including the open/close valves 513 and 523, the connecting pipe 55, and the like) are the same as those regarding the air intake device 51 and the air supply device 52 in the first embodiment.

Further, a set including the powder collecting device 1C (device formed of the pipe 35 and the plurality of powder collectors 10B), the air intake device 51, and the air supply device 52 serves as the system component 5C forming apart (mainly portions excluding the robot device) of an automatic powder collecting system (6C) capable of performing the work of collecting powder and the like by automation through use of the robot device described later (FIG. 30). In this case, the system component 5C can include a storage medium or the like storing a control program to be used in the control unit 65 described above required for operating the robot arm and the robot hand in the robot device in accordance with work contents.

<Configuration of Automatic Powder Collecting System>

The powder collecting device 10 (or the system component 5C) forms a part of the following automatic powder collecting system 6C.

Figure 32:
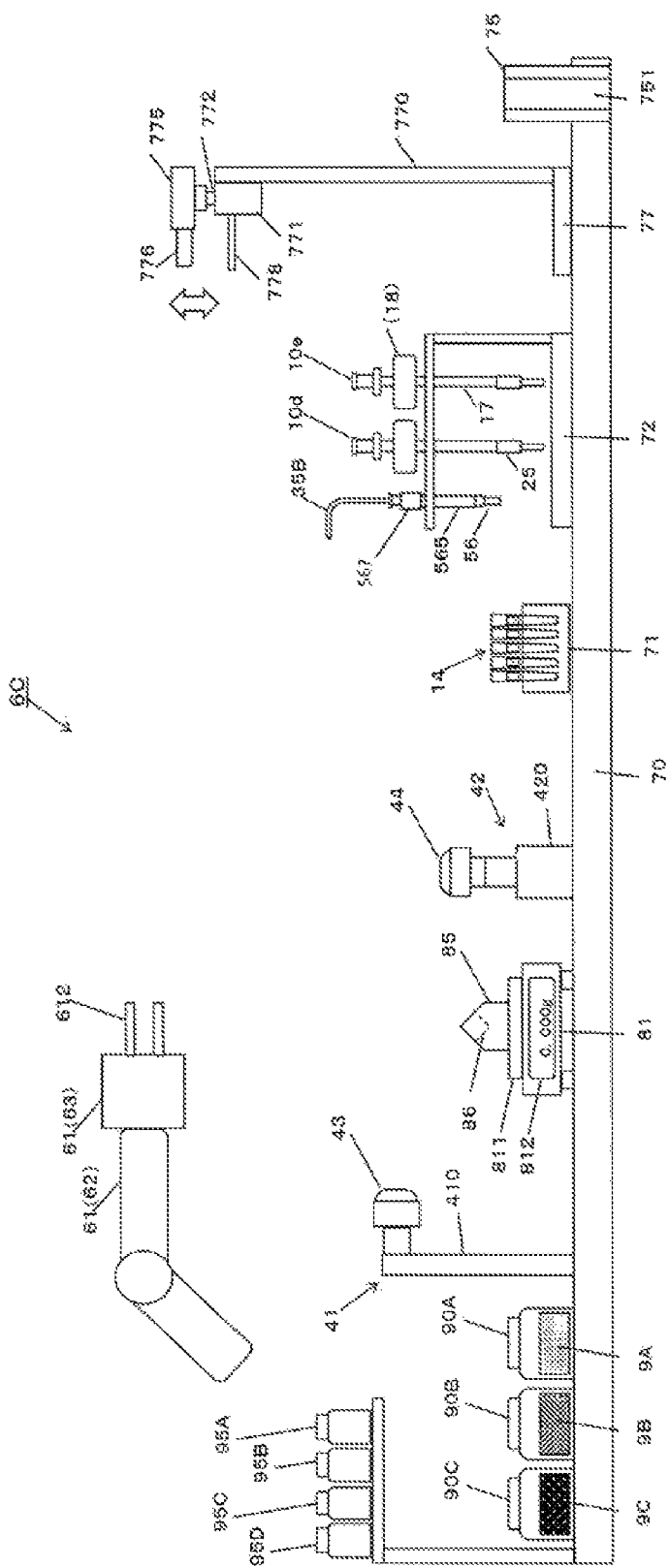
FIG. 32 is an explanatory view for schematically illustrating a configuration (basic configuration) of a practical example of the automatic powder collecting system according to the third embodiment.

As illustrated in FIG. 30, FIG. 32, and the like, the automatic powder collecting system 6C includes the powder collecting device 1C (in particular, the device including the air intake device 51 and the air supply device 52) having the above-mentioned configuration, and the robot device 61 including the robot arm 62 and the robot hand 63 that are operated so as to perform at least the work of collecting, moving, and discharging powder with the powder collector 10A being mounted so as to be removably connected to the pipe 35B of the powder collecting device 10.

Further, the automatic powder collecting system 6C includes the control unit 65 (see FIG. 7) configured to control each operation in the same manner as in the case of the automatic powder collecting system 6A according to the first embodiment.

The robot device 61 is the same as the robot device 61 in the first embodiment. Further, the grip part 621 of the robot hand 63 in the robot device 61 can removably hold (grip) the site 193 to be gripped and held in the powder collector 10B of the powder collecting device 1C and the portion 565 (567) to be held of the connected part 56 in the pipe 35B.

In the automatic powder collecting system 6C (including the control unit 65), the powder collecting device 10, the air intake device 51, and the air supply device 52 except the robot device 61 (the foregoing corresponds to portions of the system component 5C) are operated as described below in substantially the same manner as in the case of the automatic powder collecting system 6A according to the first embodiment.

Figure 31:
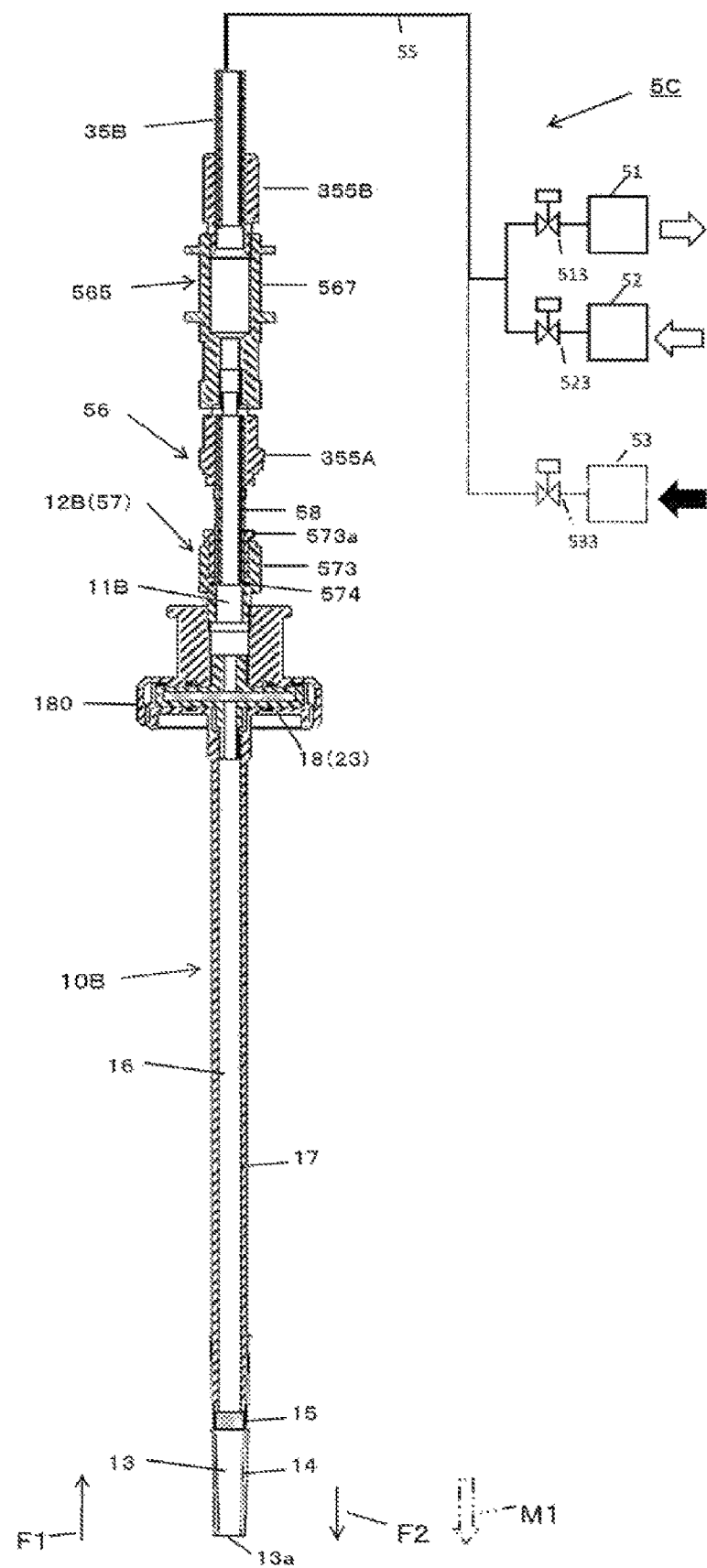
FIG. 31 is an explanatory view for illustrating an operation state of the system component of FIG. 30.

First, when the air intake device 51 is driven by the control of the control unit 65, the air intake device 51 is started, and the open/close valve 513 is opened. Then, as illustrated in FIG. 31, action of air intake that occurs in the air intake device 51 (rightward outlined arrow in FIG. 31) is successively transmitted to each of the air passages 11B, 16, and 13 in the powder collector 10B through the connecting pipe 55 and the pipe 35B, and finally, the suction force F1 for sucking a gas is generated in the lower end opening 13a and further in the air passage 13 of the collecting part 14. With this, the powder collector 10B is brought into a state capable of sucking powder into the air passage 13 of the collecting part 14.

Further, when air intake is performed by the air intake device 51, a gas that is taken in and flows from the lower end opening 13a of the collecting part 14 of the powder collector 10B due to the air intake passes through the first filter part 15 and the second filter part 18 in the powder collector 10A in the stated order.

Meanwhile, when the air supply device 52 is driven by the control of the control unit 65, the air supply device 52 is started, and the open/close valve 523 is opened. Then, as illustrated in FIG. 31, action of air supply that occurs in the air supply device 52 (leftward outlined arrow in FIG. 31) is successively transmitted to each of the air passages 11B, 16, and 13 in the powder collector 10B through the connecting pipe 55 and the pipe 35B, and finally, the discharge force F2 for discharging a gas is generated in the air passage 13 and further in the lower end opening 13a of the collecting part 14. With this, in the powder collector 10A, the powder that is collected and temporarily kept in the air passage 13 of the collecting part 14 can be discharged to the outside from the lower end opening 13a of the collecting part 14.

Further, when air supply is performed by the air supply device 52, a gas flowing from the air passage 11B of the connecting part 12B of the powder collector 10B due to the air supply passes through the second filter part 18 and the first filter part 15 in the powder collector 10B in the stated order.

<Practical Example of Automatic Powder Collecting System>

The automatic powder collecting system 6C can be applied, for example, in order to perform work that is schematically illustrated in FIG. 32.

The automatic powder collecting system 6C illustrated in FIG. 32 is a system configured to perform the work of collecting a predetermined amount of the powder 9A to 9C accommodated in the plurality of first containers 90A to 90C and transferring the powder 9A to 9C to each of the plurality of other second containers 95A to 95E in the same manner as in the case of the automatic powder collecting system 6A according to the first embodiment.

The automatic powder collecting system 6C includes the powder collecting device 1A, the air intake device 51, the air supply device 52 (the foregoing devices correspond to the automatic powder collecting system component 5C), and the robot device 61. The automatic powder collecting system 6C further includes the following components.

As illustrated in FIG. 32 and the like, in substantially the same manner as in the case of the automatic powder collecting system 6A according to the first embodiment (see FIG. 9 and the like), the components include the work table 70, the second holder portion 72, the third holder portion 73, the cleaning treatment portion 75, and the scale 81. The first holder portion 71 is configured to removably hold the plurality of collecting parts 14 (each including the first filter part 15), which are arrayed side by side. The second holder portion 72 is configured to removably hold one pipe 35B and portions 10d and 10e of the plurality of powder collectors 10B before the collecting parts 14 are mounted, which are arrayed side by side. The third holder portion 73 is configured to removably hold the support 30A connected to the pipe 35B. The cleaning treatment portion 75 is configured to clean the remaining portions 10d and 10e of the powder collectors 10B after the collecting parts 14 are removed in the powder collector 10B.

The pipe 35B is connected to the air intake device 51 and the air supply device 52 (not shown). An electronic scale is used as the scale 81, and the measuring portion 82 of the electronic scale is connected to the control unit 65 (see FIG. 7). Further, on the measuring platform 811 of the scale 81, there is arranged the container mounting base 85 including the inclined holding portion 86 configured to hold the entire second container 95A under a state in which the entire second container 95A is inclined, which is described in the modification example of the automatic powder collecting system 6A according to the first embodiment.

Further, the automatic powder collecting system 6C additionally includes the following components.

As illustrated in FIG. 32 and the like, the components include, for example, the mounting and dismounting work part 77, a first vibration applying device 41, and a second vibration applying device 42. The mounting and dismounting work part 77 is configured to perform the work of mounting and dismounting (the connected part 56 of) the pipe 35B with respect to (the connecting parts 12B of) the portions 10d and 10e of the powder collectors 10B. The first vibration applying device 41 is configured to apply vibration to the portions 10d and 10e of the powder collectors 10B by being brought into contact therewith when the work of collecting powder is finished. The second vibration applying device 42 is configured to apply vibration to the portions 10d and 10e of the powder collectors 10B by being brought into contact therewith when the work of discharging powder is performed.

Figure 36:
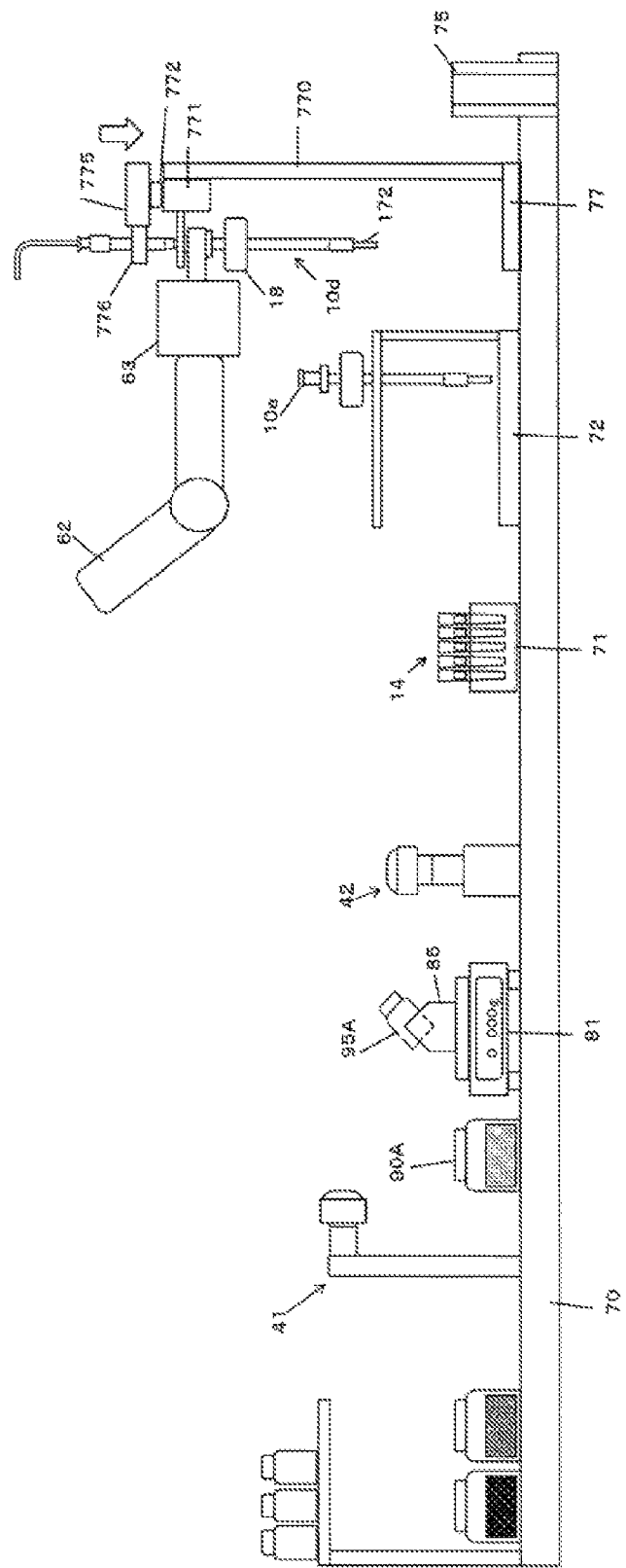
FIG. 36 is an explanatory view for illustrating an operation state at a time when the work of moving and mounting a part of the powder collector to the pipe so as to connect the part to the pipe in the automatic powder collecting system of FIG. 32.
Figure 37:
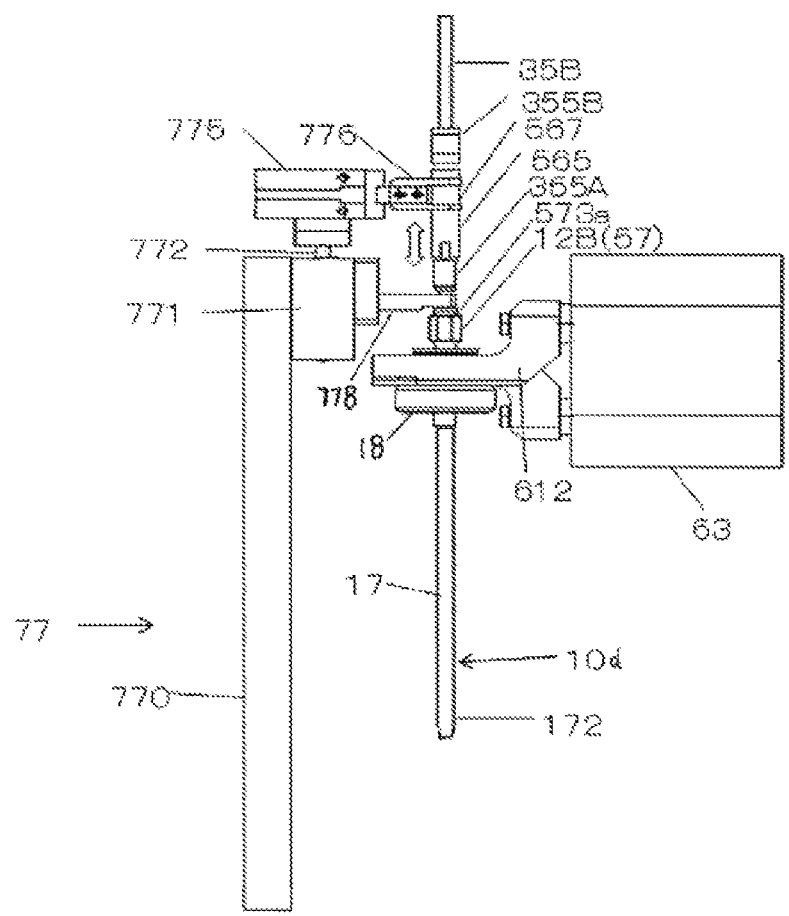
FIG. 37 is an explanatory view for illustrating a configuration of the mounting and dismounting work part and a state at a time of mounting and dismounting work.

As illustrated in FIG. 32, FIG. 36, FIG. 37, and the like, the mounting and dismounting work part 77 includes a support frame 770, a cylinder drive portion 771, a holding portion 775, and a claw pressing portion 778. The support frame 770 is arranged under a state of being fixed to a predetermined position of the work table 70. The cylinder drive portion 771 is arranged so as to be fixed to an upper portion of the support frame 770, and is configured to displace a movable cylinder 772 by a required distance in the vertical direction. The holding portion 775 is mounted so as to be fixed to a distal end portion of the movable cylinder 772, and includes the holding tool (chuck) 776 configured to temporarily pinch and hold a part (portion 567 to be held) of the powder collector 10B at a time of mounting and dismounting work. The claw pressing portion 778 is fixed to the cylinder drive portion 771 under a protruding state, and is configured to temporarily press the flange portion 573a of the sleeve 573 of the one-touch mounting and dismounting joint 57 in the connecting part 12B of the powder collector 10B by being brought into contact therewith at a time of mounting and dismounting work.

The first vibration applying device 41 is arranged at a position in the vicinity of a position (powder collection position) at which the work of collecting powder is performed. The first vibration applying device 41 includes, for example, a support frame 410 arranged under a state of being fixed to the position in the vicinity of the powder collection position of the work table 70, and a vibration applying portion 43 arranged so as to be fixed to an upper portion of the support frame 410. The vibration applying portion 43 includes a contact surface portion that is brought into contact with a part of the powder collector 10B, and a vibration generating source portion that is driven so as to transmit vibration to the contact surface portion. The contact surface portion of the vibration applying portion 43 is arranged under a state of being directed in a horizontal lateral direction.

The second vibration applying device 42 is arranged at a position in the vicinity of a position (powder discharge position) at which the work of discharging powder is performed. The second vibration applying device 42 includes, for example, a support frame 420 arranged under a state of being fixed to the position in the vicinity of the powder discharge position of the work table 70, and a vibration applying portion 44 arranged so as to be fixed to an upper portion of the support frame 420. The vibration applying portion 44 includes a contact surface portion and a vibration generating source portion similarly to the vibration applying portion 43 of the first vibration applying device 41. The contact surface portion of the vibration applying portion 44 is arranged under a state of being directed upward.

As indicated by the two-dot chain lines in FIG. 7, the operations of the first vibration applying device 41 and the second vibration applying device 42 are controlled by a drive control part 415 for a first vibration applying device and drive control parts 425 for a second vibration applying device, which are connected to the control unit 65.

In particular, the drive of the second vibration applying device 42 is controlled based on the data on the measured value obtained from the measuring portion 82 of the electronic scale 81 connected to the control unit 65 as described in the modification example of the automatic powder collecting system according to the first embodiment. In this case, for example, the control unit 65 performs feedback control of the operation of the second vibration applying device 42 through the drive control part 425 so as to adjust the magnitude and time of vibration in the second vibration applying device 42 based on a value of a difference between the data on the measured value obtained from the measuring portion 82 and the discharge amount (amount to be transferred to be accommodated) of the powder to the second container 95A.

<Operation (Work) of Automatic Powder Collecting System>

Now, an operation of the automatic powder collecting system 6C illustrated in FIG. 32 is described. This operation is performed by the control of the control unit 65 described above in the same manner as in the case of the automatic powder collecting system according to the first embodiment.

Figure 33:
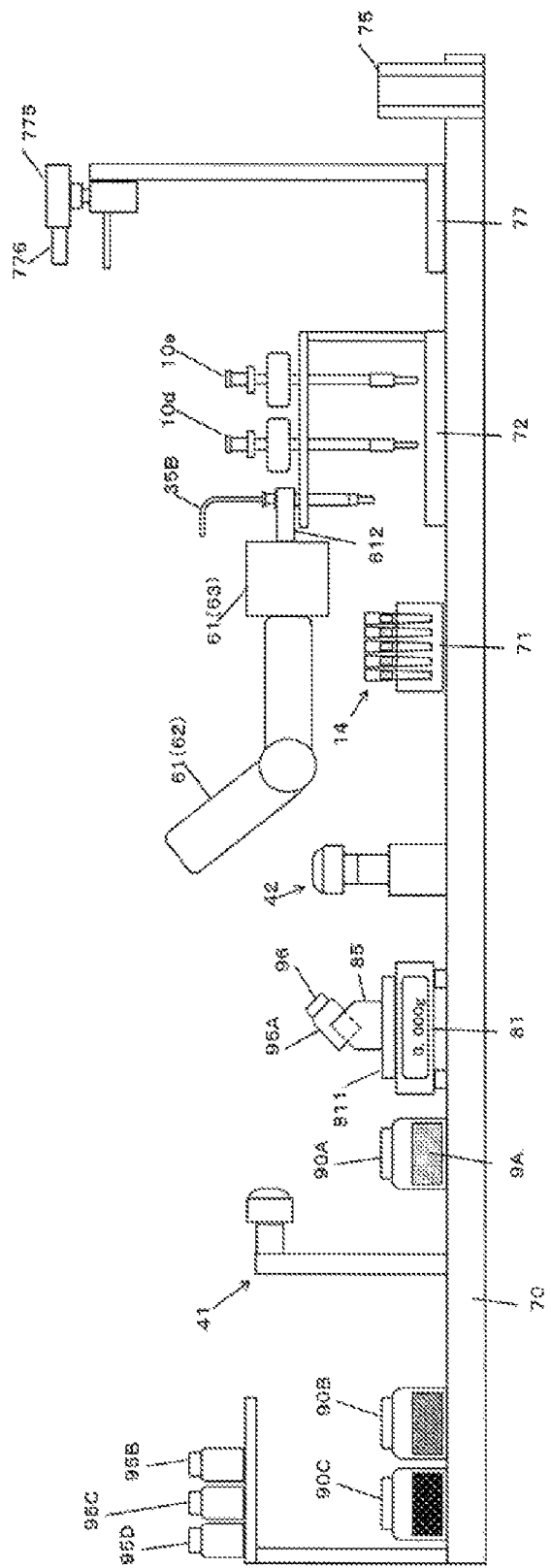
FIG. 33 is an explanatory view for illustrating an operation state in a preparation stage before the work of collecting powder and the like are performed in the automatic powder collecting system of FIG. 32.

First, as illustrated in FIG. 33, the automatic powder collecting system 6C performs the work of moving the first container 90A in which the powder 9A to be collected is accommodated to a collection work position, and the work of placing the second container 95A configured to accommodate the collected powder 9A for transfer on the container mounting base 85 on the measuring platform 811 of the scale 81 by operating the robot arm 62 and the robot hand 63 of the robot device 61.

With the above-mentioned work, preliminary preparation for performing the work of collecting the first powder 9A and the like is completed. In this case, the second container 95A is placed so that the upper end opening 96 is inclined by being held by the inclined holding portion 86 of the container mounting base 85.

Then, as illustrated in FIG. 33 to FIG. 37, through operation of the robot device 61, the automatic powder collecting system 6C performs the work of moving the pipe 35B in the powder collecting device 10 and the portion (10d) of the powder collector 10B to the mounting and dismounting work part 77 and then connecting the pipe 35B and the portion (10d) to each other.

First, as illustrated in FIG. 33, (the grip part 612 of) the robot hand 63 of the robot device 61 grips and holds the portion 567 to be held in the auxiliary gripping member 565 of the pipe 35B in the powder collecting device 1C located in the first holder portion 72.

Figure 34:
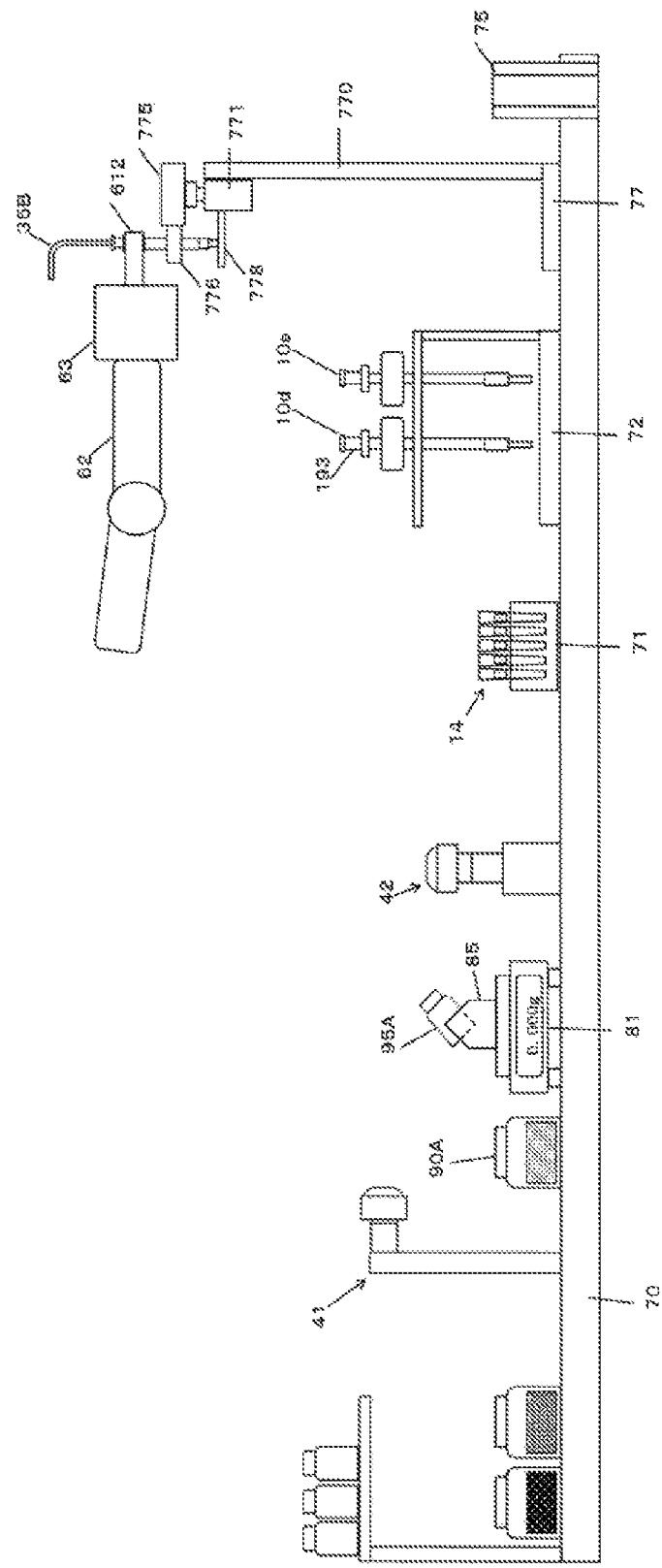
FIG. 34 is an explanatory view for illustrating an operation state at a time when the work of moving and mounting a pipe to a mounting and dismounting work part is performed in the automatic powder collecting system of FIG. 32.

Then, as illustrated in FIG. 34, the robot device 61 moves the pipe 35B to the mounting and dismounting work part 77 and causes the holding portion 775 to hold the pipe 35B. As illustrated in FIG. 37, in this case, the pipe 35B is held under a state in which the portion 567 to be held of the auxiliary gripping member 565 gripped by the robot hand 63 is transferred to be gripped by the holding tool 776 of the holding portion 775 in the mounting and dismounting work part 77. In this case, the pipe 35B may be held in such a manner that the pipe coupling member 355B is gripped by the robot hand 63 and moved to the mounting and dismounting work part 77, and thereafter, the portion 567 to be held is gripped by the holding tool 776 of the holding portion 775.

Figure 35:
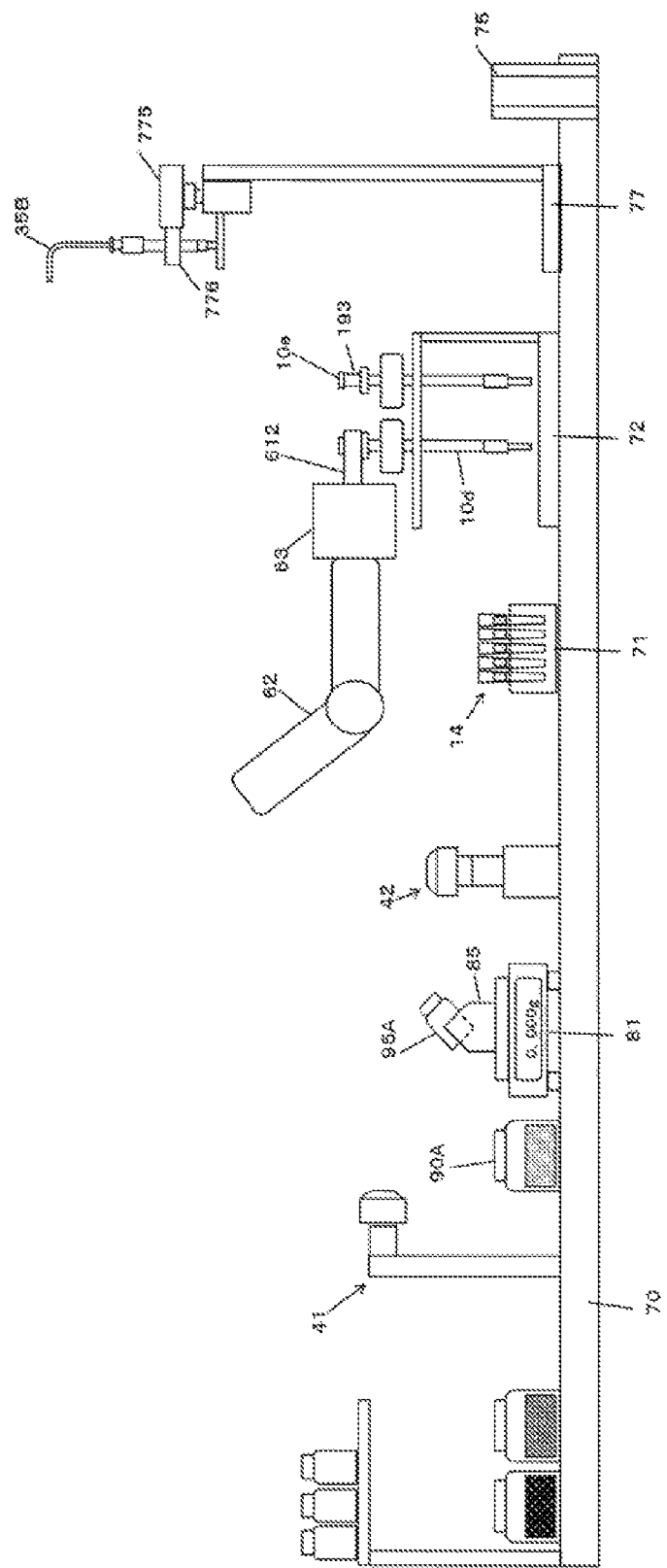
FIG. 35 is an explanatory view for illustrating an operation state at a time when the work of connecting a part (portion excluding the collecting part) of the powder collector to the pipe in the automatic powder collecting system of FIG. 34.

Subsequently, as illustrated in FIG. 35, (the grip part 612 of) the robot hand 63 of the robot device 61 grips and holds the site 193 to be gripped and held of the portion 10d of the powder collector 10B located in the first holder portion 71.

After that, as illustrated in FIG. 36, the robot device 61 moves the portion 10d of the powder collector 10B to the mounting and dismounting work part 77, and then performs the work of connecting the connecting part 12B in the portion 10d of the powder collector 10B to the connected part 56 of the pipe 35B.

In this case, the robot device 61 moves the connecting part 12B in the portion 10d of the powder collector 10B to a position facing the connected part 56 of the pipe 35B held in the mounting and dismounting work part 77. Then, the robot device 61 raises the portion 10d of the powder collector 10B to insert the auxiliary connecting pipe 58 in the connected part 56 of the pipe 35B into the air passage 11B (actually, the through hole 575 of the open ring 573 of the one-touch mounting and dismounting joint 57) of the connecting part 12B up to a predetermined position and stops in this state.

After that, the mounting and dismounting work part 77 drives the cylinder drive portion 771 to lower the movable cylinder 772, to thereby lower the connected part 56 through intermediation of the auxiliary gripping member 565 of the pipe 35B held by the holding member 775. With this, the auxiliary connecting pipe 58 in the connected part 56 of the pipe 35B is further inserted into the through hole 575 in the body portion 571 of the one-touch mounting and dismounting joint 57 of the connecting part 12B in the portion 10d of the powder collector 10B and locked with the lock claw (not shown), with the result that the auxiliary connecting pipe 58 is brought into a state in which the auxiliary connecting pipe 58 cannot move in the through hole 572 of the body portion 571 (see FIG. 31 and the like).

As a result, the connecting part 12B in the portion 10d of the powder collector 10B is connected to the connected part 56 of the pipe 35B (FIG. 30, FIG. 36, and FIG. 37).

Figure 38:
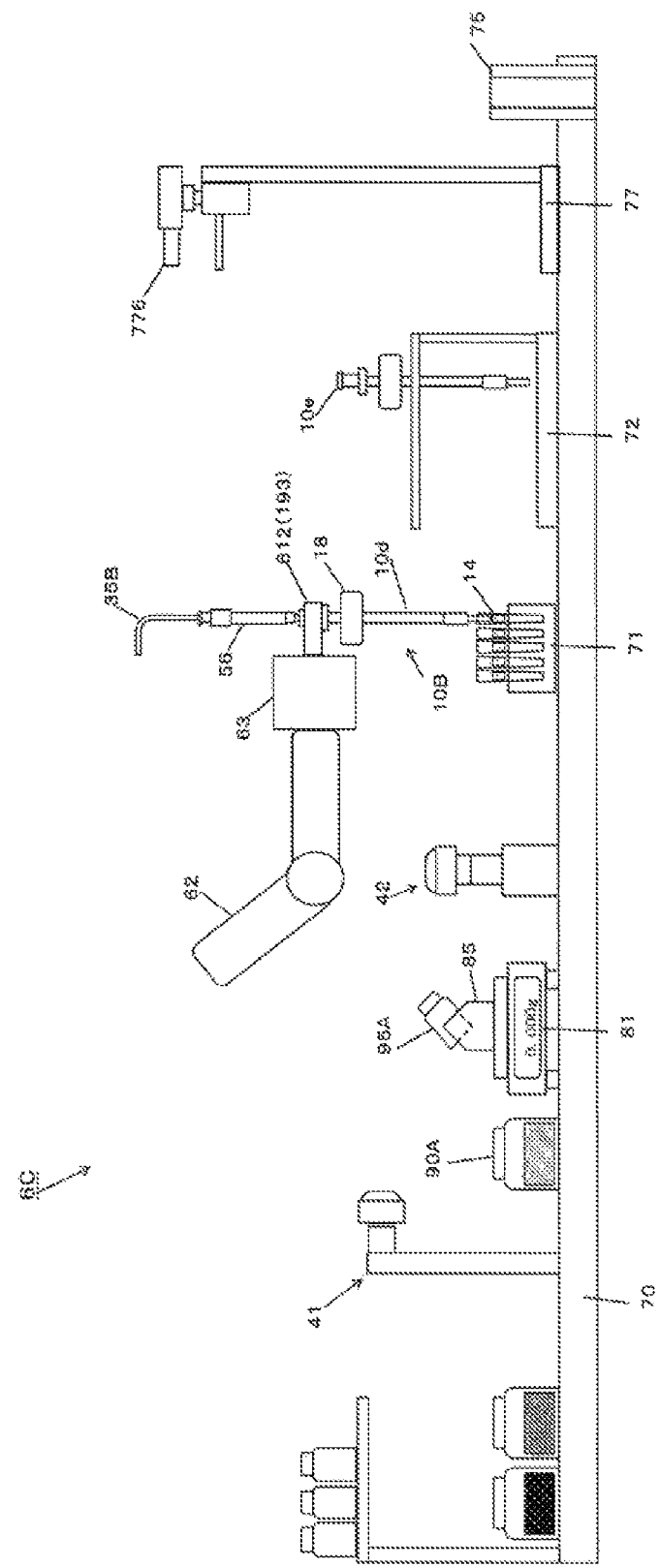
FIG. 38 is an explanatory view for illustrating an operation state of the work of mounting the collecting part to the part of the powder collector in the automatic powder collecting system of FIG. 32.

Subsequently, as illustrated in FIG. 38, through operation of the robot device 61, the collecting system 6C performs the work of removing the portion 10d of the powder collector 10B connected to the pipe 35B from the mounting and dismounting work part 77 and then mounting the first collecting part 14 (having the first filter part 15 arranged thereon) located in the first holder portion 71 on the lower end portion 172 of the relaying part 17 in the portion 10d of the powder collector 10B.

In this case, mounting of the collecting part 14 on the portion 10d of the powder collector 10B is performed by moving the portion 10d of the powder collector 10B gripped and held by the robot hand 63 until the lower end portion 172 of the relaying part 17 is inserted into the connecting portion 142 of the collecting part 14 to be fitted therein.

When the above-mentioned work is carried out, the automatic powder collecting system 6C is brought into a completed state as an automatic powder collecting system configured to perform the work of collecting the powder 9A and the like (FIG. 38).

Figure 39:
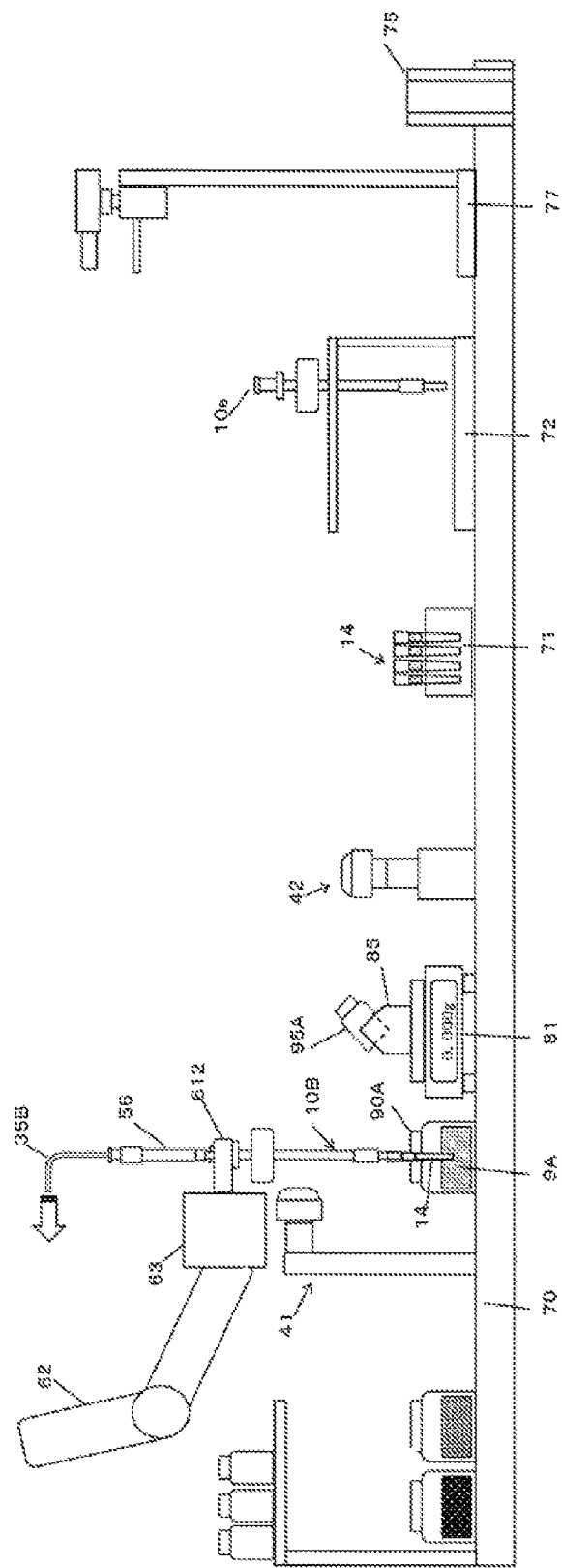
FIG. 39 is an explanatory view for illustrating an operation state of the work of collecting the powder by the powder collector in the automatic powder collecting system of FIG. 32.

As illustrated in FIG. 39, through operation of the robot device 61, the automatic powder collecting system 6C performs the work of collecting the powder 9A through use of the powder collector 10B (including the collecting part 14) held by the robot hand 63.

In this case, through operation of the robot arm 62 and the robot hand 63, the powder collector 10B is moved so that the collecting part 14 enters the first container 90A, and the lower end opening 13a of the collecting part 14 is brought close to a surface of an accumulation of the powder 9A or inserted into a portion of the accumulation of the powder 9A. Further, when the movement of the powder collector 10B is finished, the air intake operation by the air intake device 51 is started.

With this, the powder collector 10B generates the suction force (F1) in the air passage 13 of the collecting part 14 through air intake action by the air intake device 51, and the powder 9A is sucked and collected into the air passage 13.

The passage of the powder 9A collected in the collecting part 14 of the powder collector 10B is blocked by the first filter part 15 arranged in the collecting part 14. Therefore, the collected powder 9A is prevented from flowing and moving to the other air passages 16 and 11B located on an inner side with respect to the first filter part 15 or from flowing and moving to the pipe 35B and the connecting pipe 55 side located beyond the powder collector 10B.

Further, in the powder collector 10B, even when the powder 9A passes through the first filter part 15, the passage of the powder 9A having passed through the first filter part 15 is blocked by the second filter part 18. Therefore, the collected powder 9A is prevented from flowing and moving to the air passage 11B of the powder collector 10B and the pipe 35B and the connecting pipe 55 side beyond the powder collector 10B.

Figure 40:
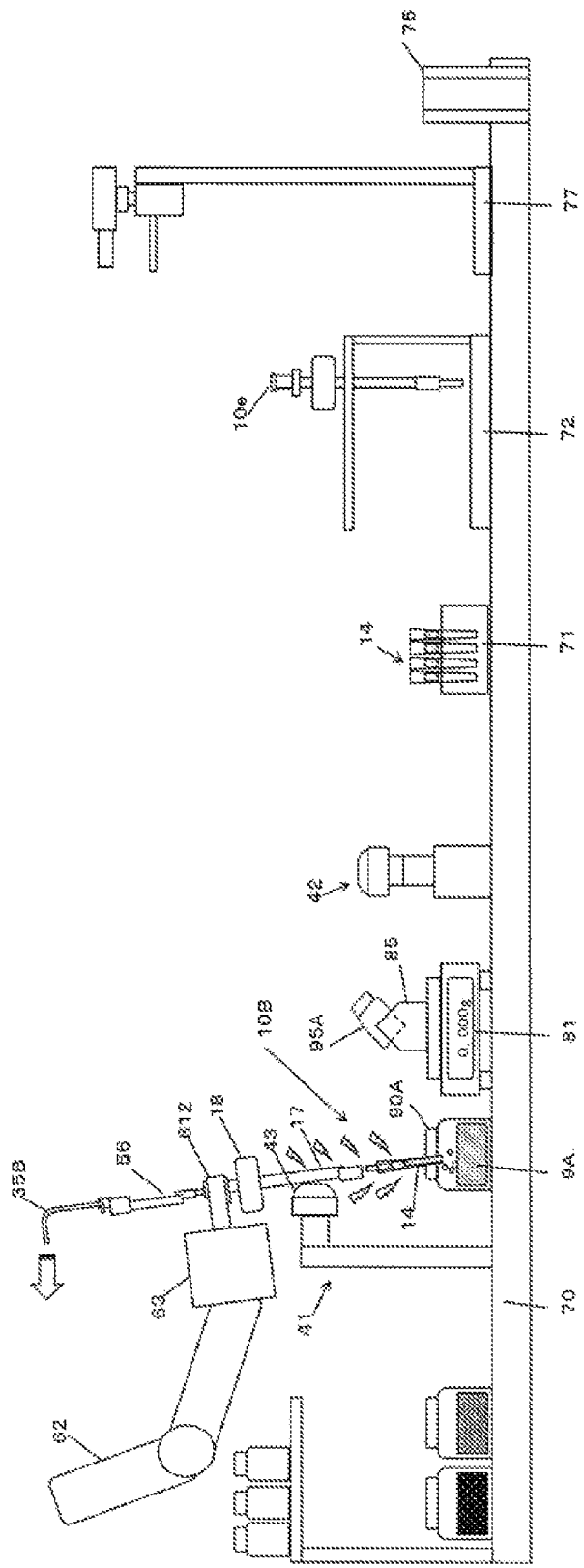
FIG. 40 is an explanatory view for illustrating an operation state at a time when the work of shaking off the powder by applying vibration to the powder collector after collection of the powder is performed in the automatic powder collecting system of FIG. 32.
Figure 41:
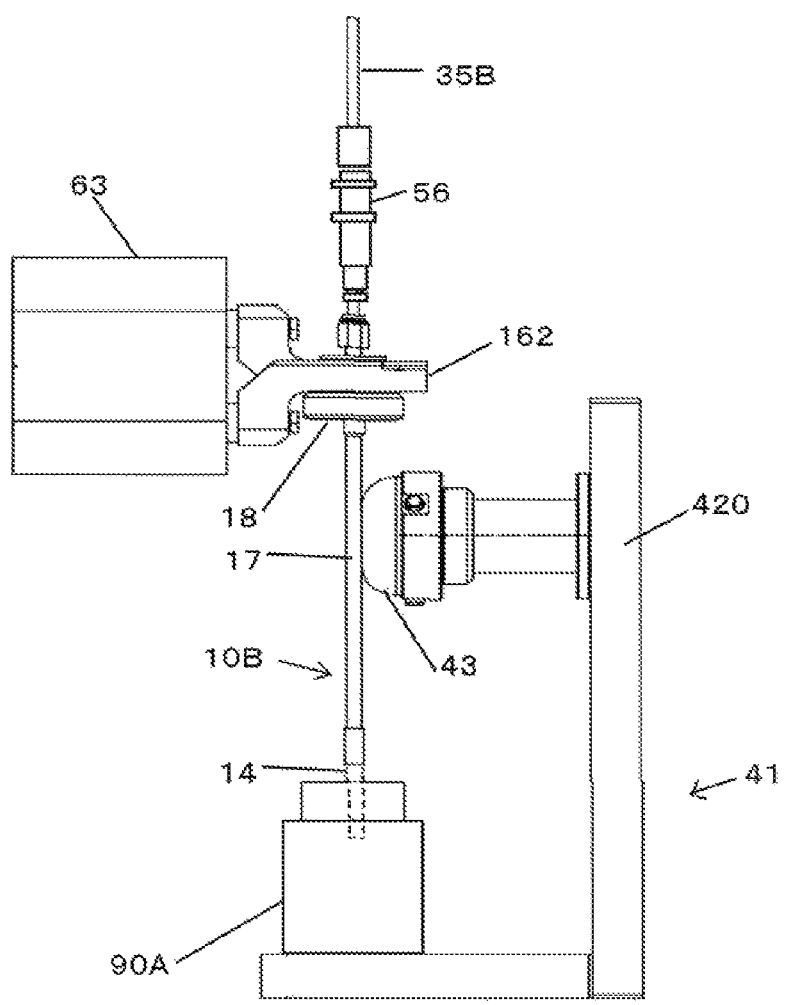
FIG. 41 is an explanatory view for illustrating a configuration of a first vibration applying device and a state at a time of application of vibration.

Subsequently, as illustrated in FIG. 40 and FIG. 41, the automatic powder collecting system 6C performs the work of shaking off the unnecessary powder 9A adhering to an outer peripheral surface of the collecting part 14 in the powder collector 10B after collection of the powder 9A is completed.

In this case, through operation of the robot arm 62, the powder collector 10B is slightly raised so that the lower end opening 13a of the collecting part 14 is separated from the accumulation surface of the powder 9A in the first container 90A. Further, through operation of the robot arm 62, the powder collector 10B is moved so that the relaying part 17 that is a part of the powder collector 10B is brought into contact with the vibration applying portion 43 in the first vibration applying device 41, and thereafter, the first vibration applying device 41 is operated.

In an example illustrated in FIG. 40, the robot arm 62 puts the powder collector 10B in a state in which the powder collector 10B is slightly inclined to the side on which the first vibration applying device 41 is located, and thus the part of the powder collector 10B is brought into contact with the vibration applying portion 43 of the first vibration applying device 41.

Further, in an example illustrated in FIG. 41, the robot arm 62 holds the powder collector 10B under a state in which the powder collector 10B stands along the vertical direction and brings the powder collector 10B close to the side of the first vibration applying device 41. With this, the part of the powder collector 10B is brought into contact with the vibration applying portion 43 of the first vibration applying device 41.

With this, in the powder collector 10B having completed collection of the powder 9A, the unnecessary powder 9A adhering to the outer peripheral surface of the collecting part 14 is shaken off to be removed by vibration. Further, the powder 9A that has been shaken off is returned into the first container 90A.

Figure 42:
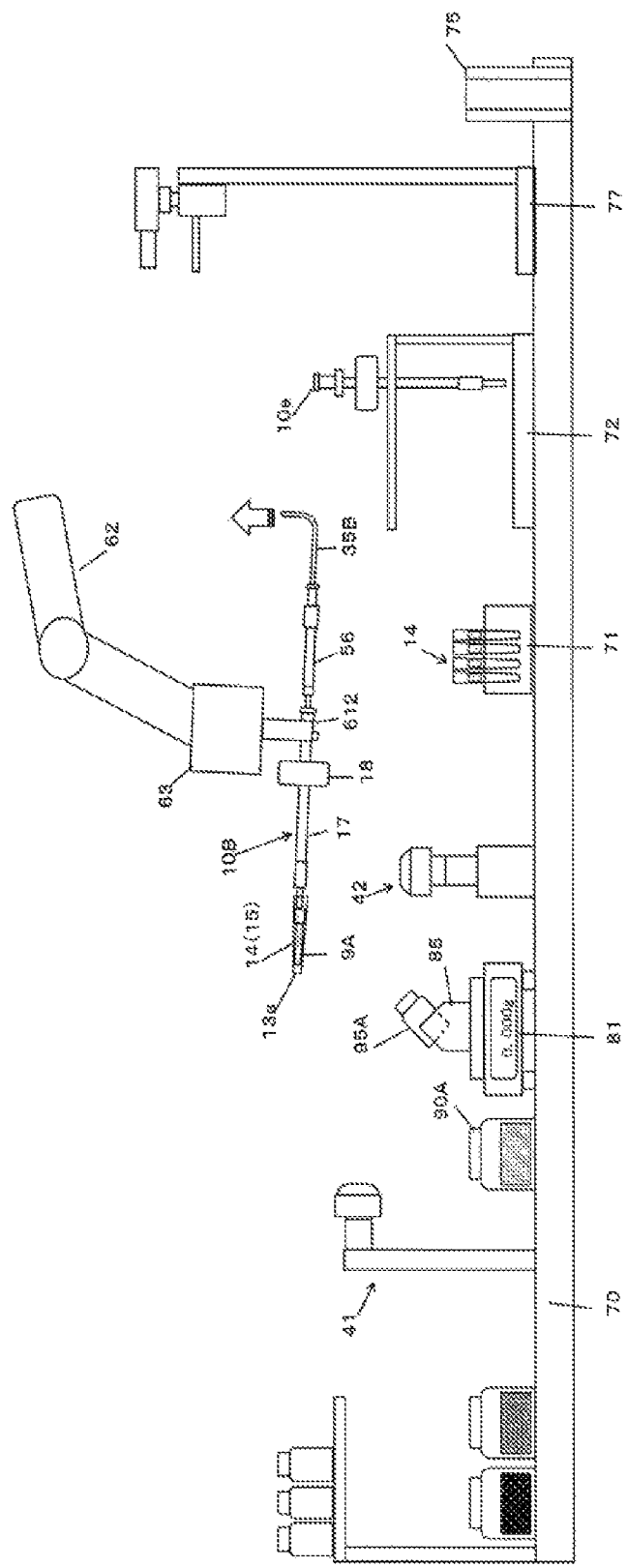
FIG. 42 is an explanatory view for illustrating a held state of the powder collector after the work of collecting the powder is finished in the automatic powder collecting system of FIG. 32.
Figure 44:
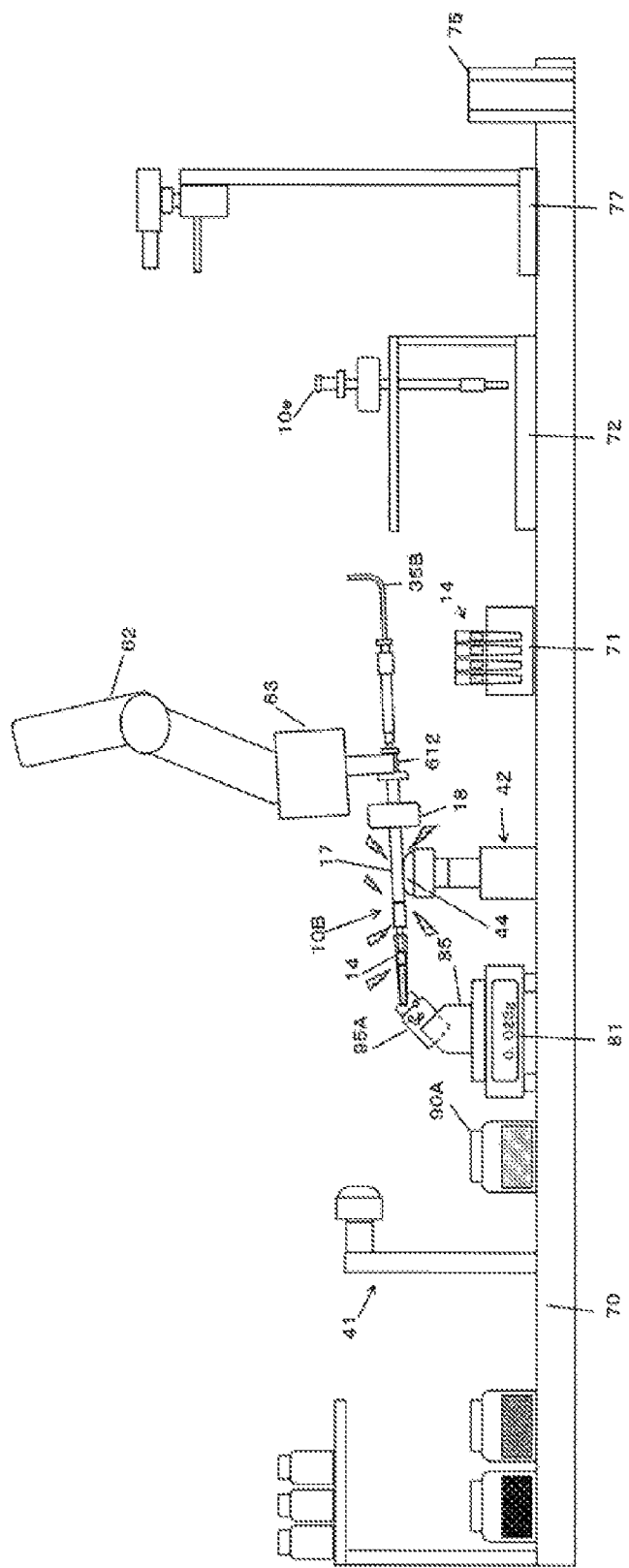
FIG. 44 is an explanatory view for illustrating an operation state at a time when the work of discharging the powder collected in the powder collector is performed in the automatic powder collecting system of FIG. 32.

As illustrated in FIG. 42, the automatic powder collecting system 6C is configured to perform, after completing the work of collecting the powder 9A and shaking off the powder 9A by vibration, the work of holding the powder collector 10B held by the robot hand 63 so that the collecting part 14 is laid down and further moving and discharging the powder 9A while the powder collector 10B is held in this state through operation of the robot device 61 (FIG. 42 and FIG. 44).

In this case, as described in the modification example of the automatic powder collecting system 6A according to the first embodiment, the robot arm 62 and the robot hand 63 are operated as follows. When the work of collecting and shaking off the powder 9A is finished, the robot arm 62 and the robot hand 63 move and newly hold the powder collector 10B so that the entire collector is laid down at an angle of about 90° with the lower end opening 13a of the collecting part 14 being substantially the center (fulcrum point) at a position above the first container 90A having collected the powder 9A (see FIG. 24).

Further, as illustrated in FIG. 42 and FIG. 44, the robot arm 62 and the robot hand 63 in this case are operated so as to perform the work of moving the powder collector 10B from the powder collection position to the powder discharge position and discharging the powder while holding the powder collector 10B under a state in which the entire powder collector 10B is laid down substantially horizontally. Also when the powder collector 10B is moved from the powder collection position to the powder discharge position, the air intake device 51 is continuously operated to continue air intake.

Figure 43:
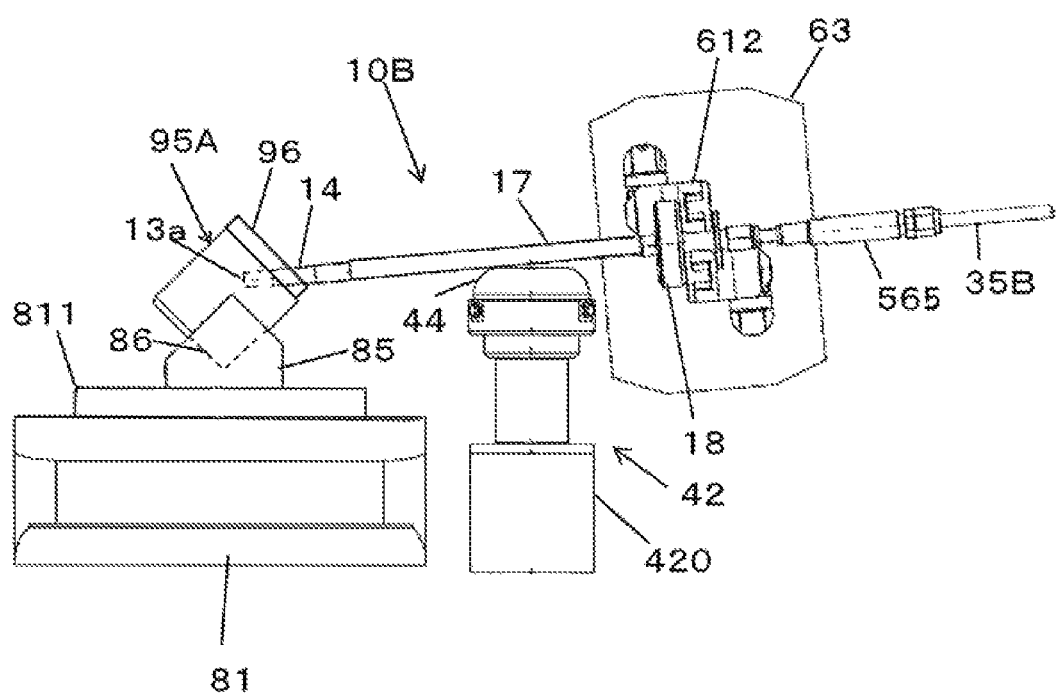
FIG. 43 is an explanatory view for illustrating a container under a state in which the held powder collector is inclined and a state in which the powder collector is moved to a second vibration applying device in the automatic powder collecting system of FIG. 42.

Then, as illustrated in FIG. 43 and the like, the robot arm 62 and the robot hand 63 move the powder collector 10B under a state in which the entire powder collector 10B is laid down substantially horizontally so that the collecting part 14 enters the second container 95A from the inclined upper end opening 96 of the second container 95A and so that the relaying part 17 that is a part of the powder collector 10B is brought into contact with the vibration applying portion 44 in the second vibration applying device 42.

As illustrated in FIG. 44, the work of discharging the powder 9A in the automatic powder collecting system 6C is performed by operating the second vibration applying device 42 to vibrate the powder collector 10B when the movement of the powder collector 10B to the discharge work position is finished. In this case, in principle, the air supply operation by the air supply device 52 and the air intake operation by the air intake device 51 are not performed. However, minute (low pressure) air supply operation and air intake operation may be performed in addition to the above-mentioned vibration applying operation depending on the state of the powder 9A collected in the collecting part 14 and the like.

With this, in the powder collector 10B, by vibration applied from the second vibration applying device 42, the powder 9A collected to be kept in the air passage 13 of the collecting part 14 is shaken and fluidized to move in the air passage 13, and is stably discharged successively in a small amount from the lower end opening 13a to be accommodated in the second container 95A.

The second vibration applying device 42 in this case is operated by the feedback control of the control unit 65 and the drive control part 425 described above. That is, the magnitude and time of vibration generated in the second vibration applying device 42 are suitably adjusted in accordance with a value of a difference between the data on the measured value obtained from the measuring portion 82 of the scale 81 and the discharge setting amount of the powder 9A to the second container 95A.

Figure 45:
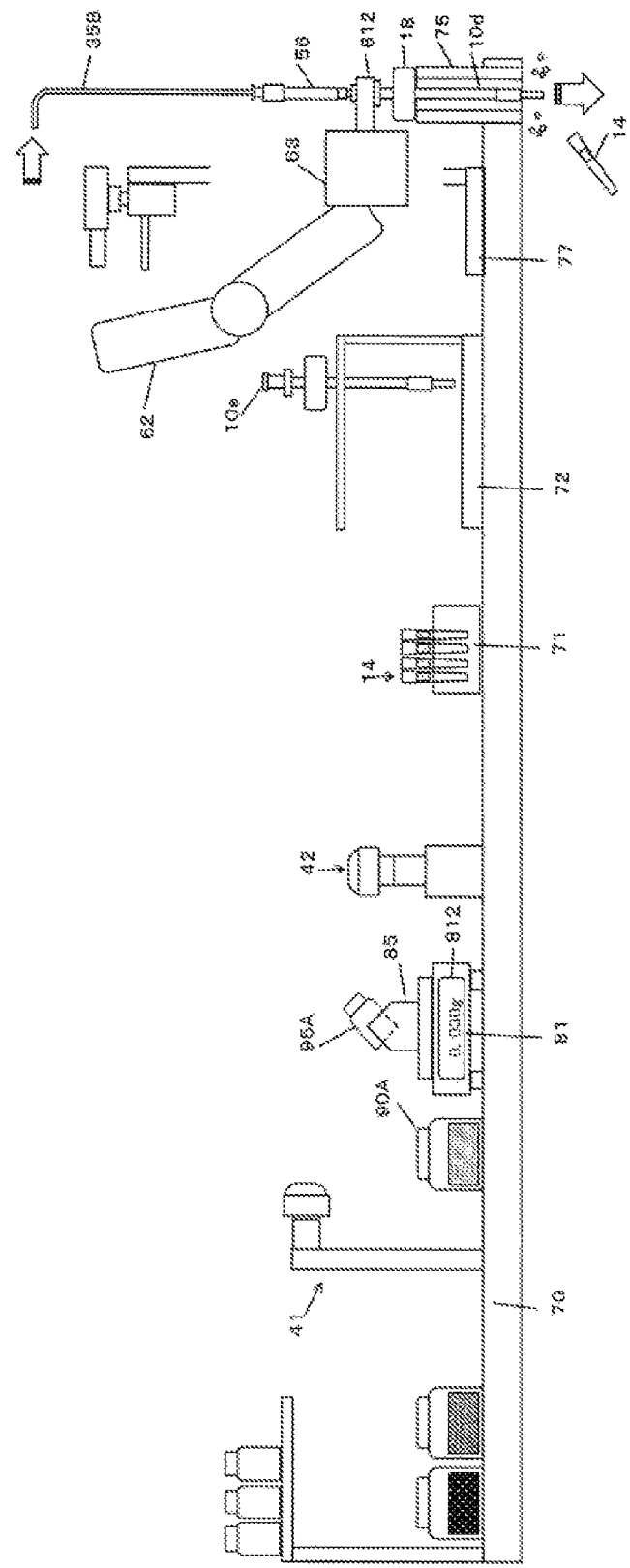
FIG. 45 is an explanatory view for illustrating an operation state of the work of removing the collecting part from the used powder collector and cleaning the collecting part in the automatic powder collecting system of FIG. 32.

As a result, a predetermined amount (for example, 0.030 g indicated on the display portion 812 of the scale 81 in FIG. 45) of the powder 9A collected by the powder collector 10B of the powder collecting device 1C is accommodated accurately and stably in the second container 95A.

After all the operations (work operations illustrated in FIG. 39 to FIG. 44) involving the work of collecting, moving, and discharging the powder 9A are finished, the automatic powder collecting system 6C moves the used powder collector 10B to the cleaning position of the cleaning treatment portion 75 through operation of the robot device 61 as illustrated in FIG. 45.

After that, in the cleaning treatment portion 75, the work of removing the used collecting part 14 from the powder collector 10B, and the work of cleaning the portion 10d of the powder collector 10B after the collecting part 14 is removed are performed.

In this case, through operation of the robot device 61, the used powder collector 10B is moved to positions (removal position and cleaning position) at which the collecting part 14 at the forefront is inserted into the tubular treatment portion 751 of the cleaning treatment portion 75.

After this movement is finished, the work of removing the collecting part 14 is performed. The collecting part 14 is removed, for example, by raising the portion 10d of the powder collector 10B with the robot arm 62 under a state in which the upper end portion of the collecting part 14 is hooked on a hook (not shown) formed in the tubular treatment portion 751. With this operation, the collecting part 14 is automatically pulled out from the portion 10d of the powder collector 10B.

Then, when the removal of the collecting part 14 is finished, the air supply device 52 is operated to start the air supply operation, to thereby perform cleaning work. Further, when the cleaning treatment portion 75 includes a suction device connected to the tubular treatment portion 751, in the same manner as in the case of the automatic powder collecting system 6A according to the first embodiment, the suction device is operated to perform a suction operation alone or in combination with the air supply operation by the air supply device 52.

Further, when the work of collecting the subsequent powder 9B of a different kind and the like are performed, the automatic powder collecting system 6C is operated as described below.

Figure 46:
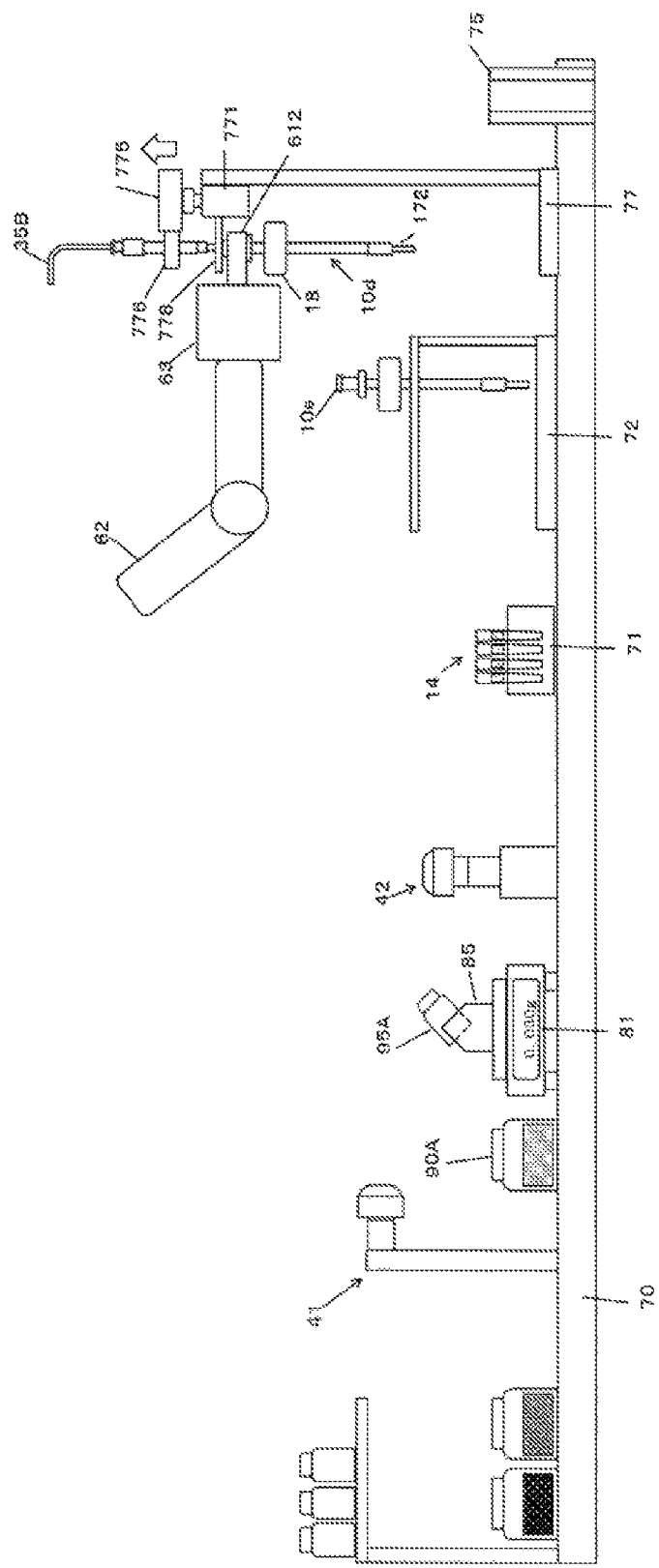
FIG. 46 is an explanatory view for illustrating an operation state of the work of moving and mounting the used powder collector to the mounting and dismounting work part in the automatic powder collecting system of FIG. 32.

First, as illustrated in FIG. 46, the automatic powder collecting system 6C performs, after moving the portion 10d of the used powder collector 10B to the mounting and dismounting work part 77 through operation of the robot device 61, the work of removing the portion 10d of the powder collector 10B from the pipe 35B by operating the mounting and dismounting work part 77.

In this case, through operation of the robot arm 62 and the like, the portion 10d of the used powder collector 10B is slightly raised so that the open ring 573 is pushed into the through hole 572 of the body portion 571 of the joint 57 after the flange portion 573a of the open ring 573 in the one-touch mounting and dismounting joint 57 of the connecting part 12B is brought into contact with the fixed claw pressing member 778 in the mounting and dismounting work part 77 from a lower side and pressed against the fixed claw pressing member 778. With this, in the one-touch mounting and dismounting joint 57, the lock claw (not shown) configured to lock the auxiliary connecting pipe 58 in the connected part 56 of the pipe 35B is brought into a state of releasing the locked state.

Meanwhile, in the pipe 35B held by the holding member 775 in the mounting and dismounting work part 77, the auxiliary connecting pipe 58 in the connected part 56 is slightly moved upward together with the holding member 775 by slightly raising the movable cylinder 772 through drive of the cylinder drive portion 771 of the mounting and dismounting work part 77. With this, the auxiliary connecting pipe 58 in the connected part 56 of the pipe 35B is brought into a state in which the auxiliary connecting pipe 58 can be pulled out from the through hole 572 in the one-touch mounting and dismounting joint 57 of the connecting part 12B.

As a result, the connecting part 12B is released from connection to the connected part 56 of the pipe 35B, and the portion 10d of the powder collector 10B can be separated from the pipe 35B. In this case, the pipe 35B is left to be held by the mounting and dismounting work part 77.

Figure 47:
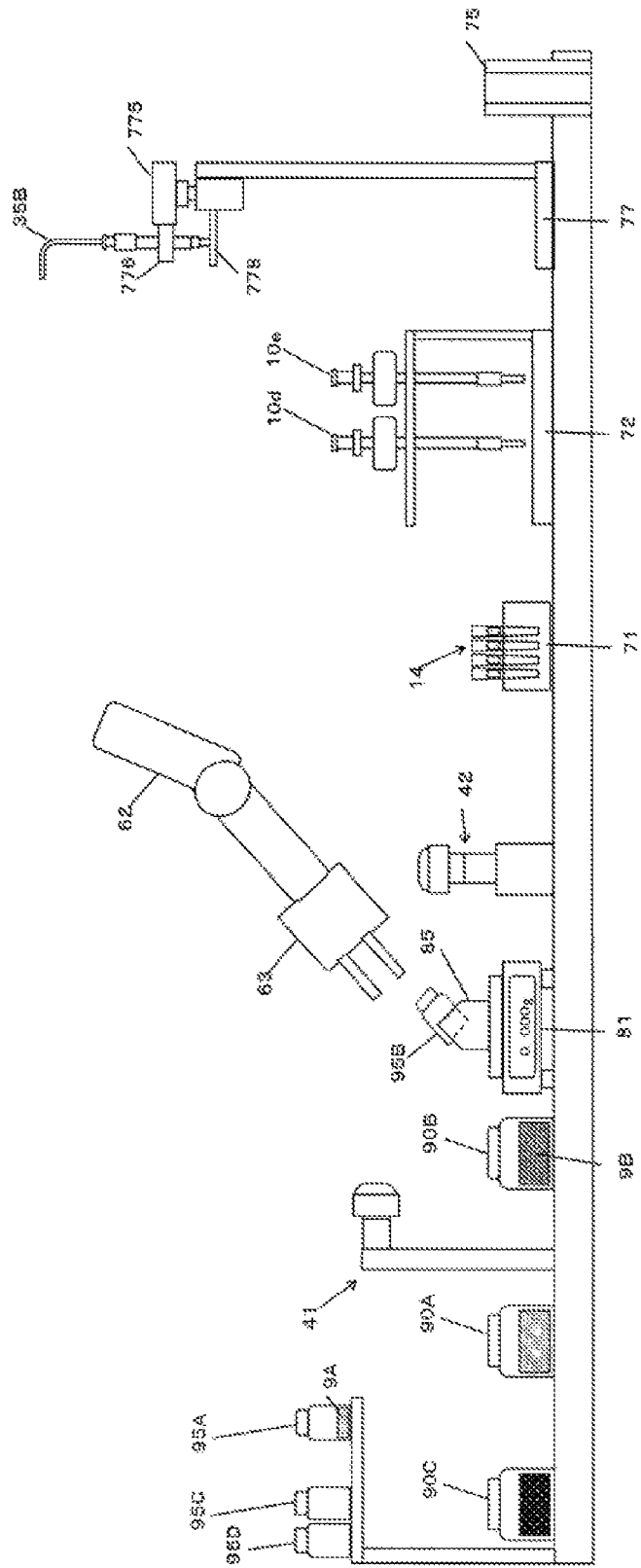
FIG. 47 is an explanatory view for illustrating an operation state in a preparation stage before the work of removing a part of the used powder collector from the pipe and returning the part to a holder and the work of collecting subsequent powder of a different kind and the like are performed in the automatic powder collecting system of FIG. 32.

Subsequently, as illustrated in FIG. 47, the automatic powder collecting system 6C performs the work of returning the portion 10d of the used powder collector 10B to the second holder portion 72 through operation of the robot device 61.

After that, as illustrated in FIG. 47, through operation of the robot arm 62 and the robot hand 63, the automatic powder collecting system 6C performs the work of returning the first container 90A which has handled the powder previously and the second container 95A in which the powder 9A is transferred to be accommodated to original positions, the work of moving the first container 90B in which the subsequent powder 9B is accommodated to the collection work position, and the work of placing the second container 95B configured to accommodate the subsequent powder 9B for transfer on the container mounting base 85 located on the measuring platform 811 of the scale 81.

Figure 48:
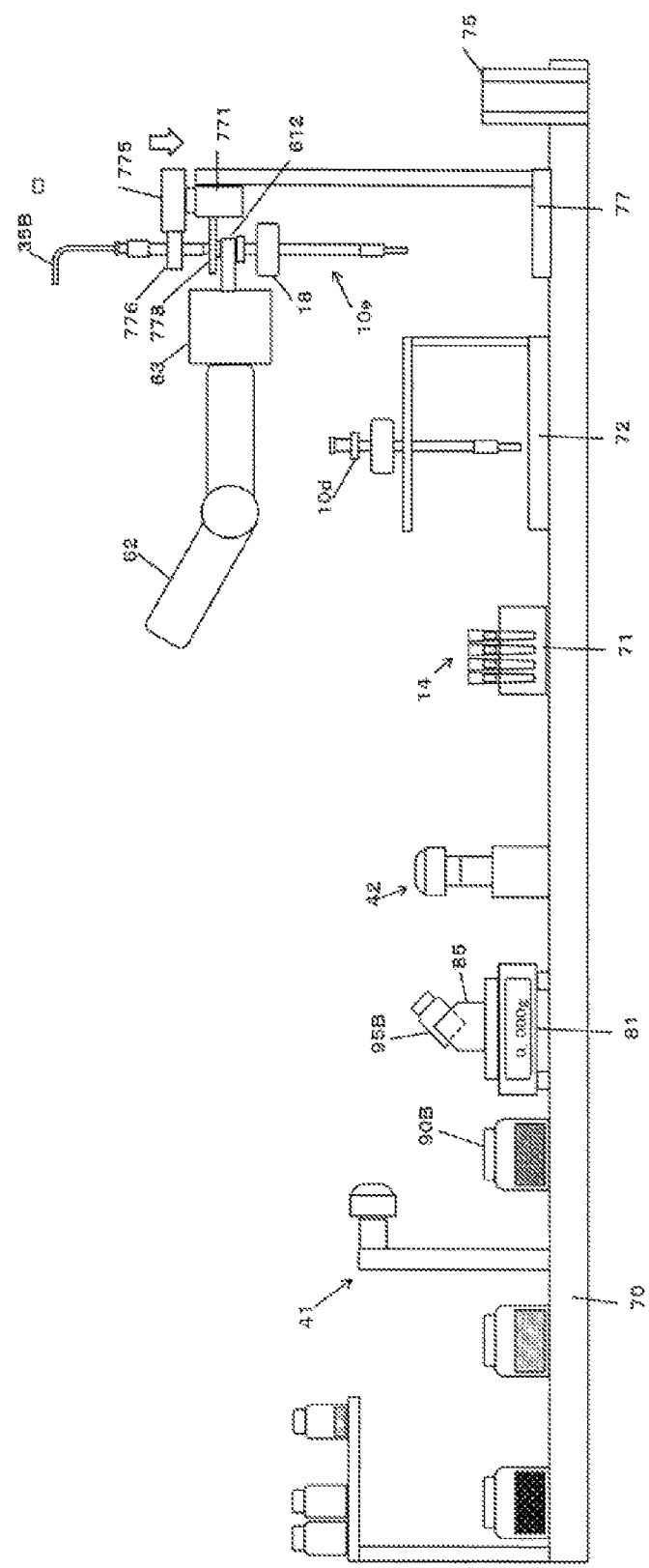
FIG. 48 is an explanatory view for illustrating an operation state at a time when the work of connecting a part (portion excluding the collecting part) of a new powder collector to the pipe is performed in a connecting work part of the automatic powder collecting system of FIG. 32.

Then, as illustrated in FIG. 48, the automatic powder collecting system 6C performs, after taking out the portion 10e of another powder collector 10B located in the second holder portion 72 and moving the portion 10e to the mounting and dismounting work part 77 through operation of the robot arm 62 and the robot hand 63, the work of connecting the portion 10e of the powder collector 10B to the pipe 35B by operating the mounting and dismounting work part 77.

Figure 49:
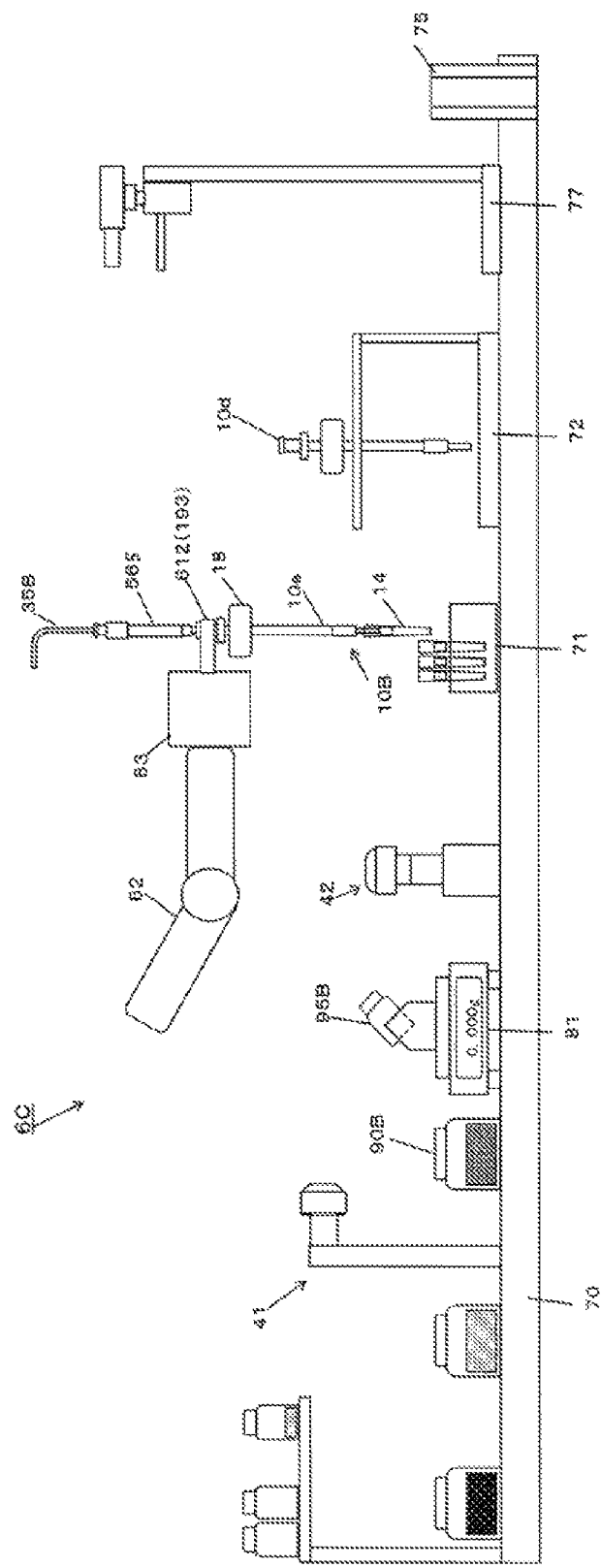
FIG. 49 is an explanatory view for illustrating an operation state of the work of mounting a new collecting part to the part of the powder collector in the automatic powder collecting system of FIG. 48.

After that, as illustrated in FIG. 49, the automatic powder collecting system 6C performs the work of mounting a new second collecting part 14 (having the first filter part 15 arranged thereon) located in the first holder portion 71 on the portion 10e of the powder collector 10B connected to the pipe 35B.

In the automatic powder collecting system 6C, through use of the portion 10e of the powder collector 10B by replacement as described above, the powder 9A remaining on and adhering to the second filter part 18 of the powder collector 10B (or the portion 10d thereof) is prevented from being mixed in the second container 95B in the work of discharging the powder 9B and the like, for example, unlike the case in which the powder collector 10B (or the portion 10d thereof) used in the work of collecting the previous powder 9A and the like is re-used in the work of collecting the powder 9B and the like.

Further, in the automatic powder collecting system 6C, through use of the powder collector 10B having the new collecting part 14 mounted thereto by replacement, the previous powder 9A remaining on and adhering to the collecting part 14 and the first filter part 15 is prevented from being mixed in the second container 95B in the work of collecting and discharging the powder 9B to be subsequently handled and the like, for example, unlike the case of re-using the collecting part 14 and the first filter part 15 having been used in the work of collecting the previous powder 9A and the like.

Thus, in the automatic powder collecting system 6C, when the work of collecting and discharging powder of a different kind (for example, the powder 9B) and the like are performed, a foreign matter (for example, the powder 9A) is reliably prevented from being mixed.

When the above-mentioned work is carried out, the automatic powder collecting system 6C is brought into a completed state as an automatic powder collecting system configured to perform the work of collecting the powder 9B and the like (FIG. 49).

Figure 50:
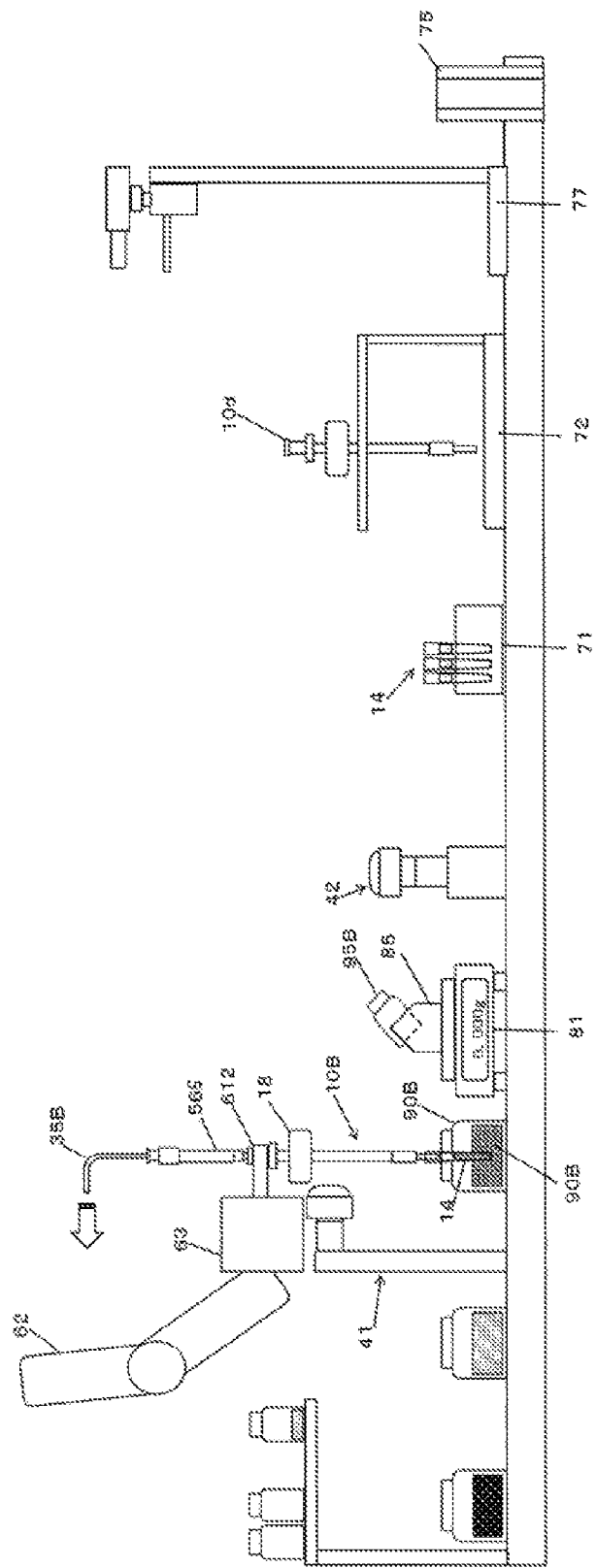
FIG. 50 is an explanatory view for illustrating an operation state at a time when the work of collecting each powder of a different kind by the powder collector is performed in the automatic powder collecting system of FIG. 32.

After that, as illustrated in FIG. 50, the automatic powder collecting system 6C performs the work of collecting the powder 9B accommodated in the first container 90B with a new powder collector 10B (powder collector including the portion 10e of the powder collector and the new collecting part 14) held by the robot hand 63.

The subsequent operations are performed in the same manner as in each of the operations during the above-mentioned work of collecting, moving, discharging, and cleaning the powder 9A and the like described above.

Also in the automatic powder collecting system 6C, the same handling and management as those in the case of the automatic powder collecting system 6A according to the first embodiment can be performed.

As described above, in the powder collecting device 1C using the powder collector 10B, and in the automatic powder collecting system 6C formed through use of the powder collecting device 1C or the like, the work of collecting each powder 9 of a different kind and the like can be performed efficiently (or performed automatically, efficiently, and stably) while a foreign matter such as another kind of powder is easily prevented from being mixed in the same manner as in the case of the automatic powder collecting system 6A according to the first embodiment.

Further, also in the automatic powder collecting system 6C, even when it is required to perform the work of collecting powder harmful for human bodies and the like, a human is not involved in the work, and hence the work can be automatically and efficiently performed without arising any concern about adverse effects on human bodies in the same manner as in the case of the automatic powder collecting system 6A according to the first embodiment.

The automatic powder collecting system 6C according to the fourth embodiment may have the following configuration. There is arranged a third vibration applying device configured to apply vibration to the powder collector 10B moved to a cleaning position such as the cleaning treatment portion 75 by being brought into contact with a part of the powder collector 10B, and vibration is applied to a powder collector 10C in this case by the third vibration applying device.

Powder adhering to the used powder collector 10B can be easily removed by performing the vibration applying treatment together with the cleaning treatment. As the third vibration applying device, for example, a device including a site for applying vibration to the powder collector 10B by being brought into contact with a part of the powder collector 10B can be used in substantially the same manner as in the case of the first vibration applying device 41 and the second vibration applying device 42.

Fourth Embodiment

Figure 51:
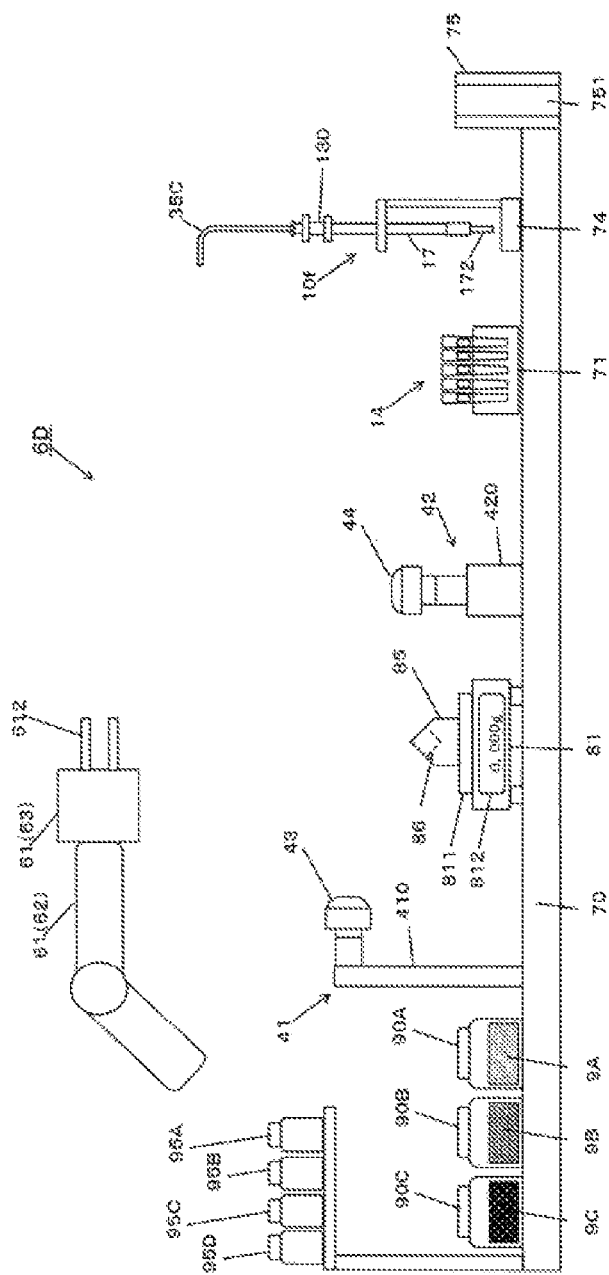
FIG. 51 is an explanatory view for schematically illustrating a configuration (basic configuration) of a practical example of an automatic powder collecting system according to a fourth embodiment.
Figure 52:
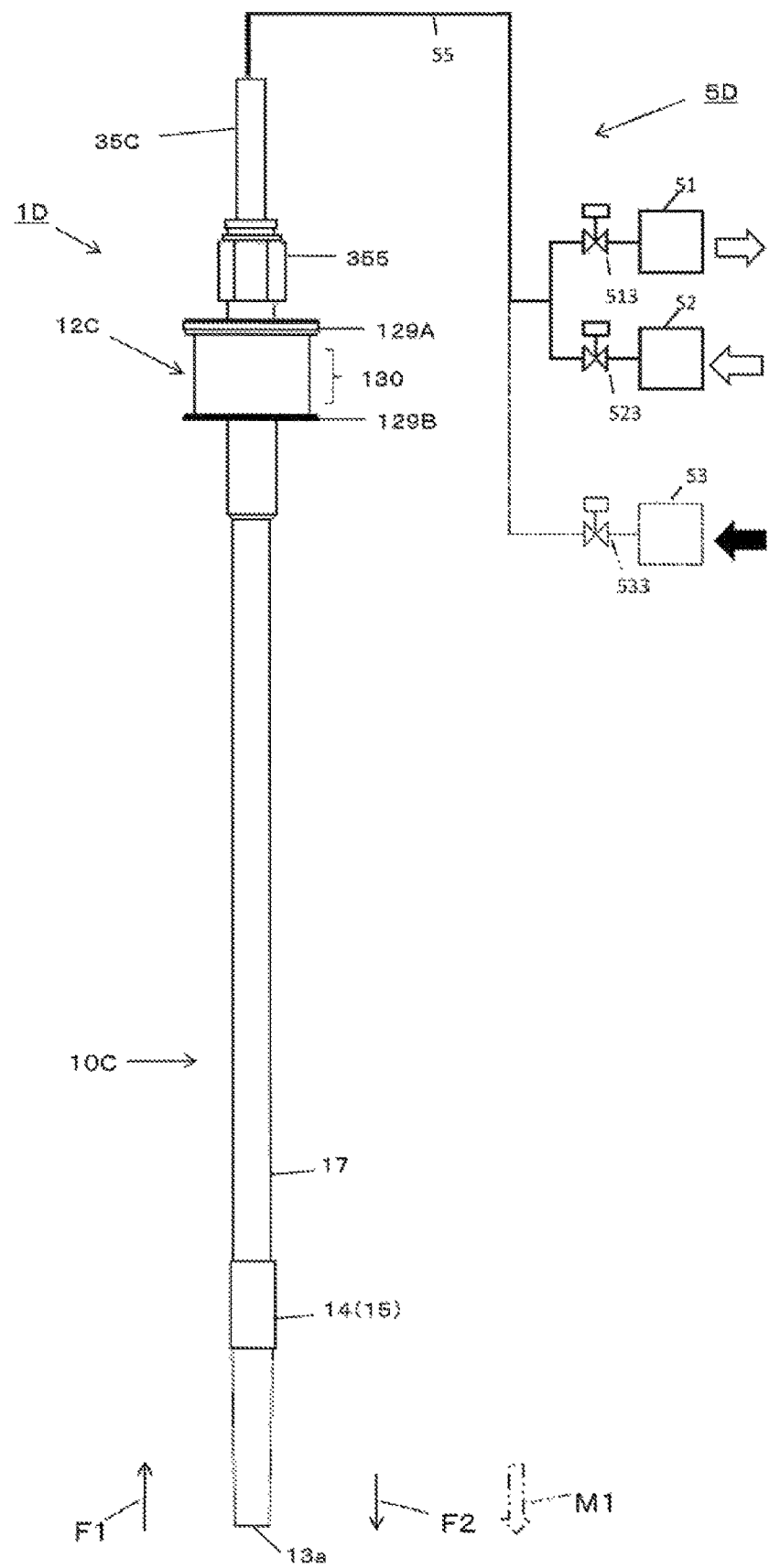
FIG. 52 is an explanatory view for illustrating an overview of a system component including a powder collecting device forming the automatic powder collecting system of FIG. 51.

FIG. 51 and FIG. 52 are each a view for illustrating an automatic powder collecting system 6D according to a fourth embodiment and the like. FIG. 51 is a view for illustrating an overview of the automatic powder collecting system 6D, and FIG. 52 is a view for illustrating a powder collecting device 1D and a system component 5D forming the automatic powder collecting system 6D.

<Configuration of Automatic Powder Collecting System>

The automatic powder collecting system 6D includes the powder collecting device 1D (in particular, the system component 5D including the air intake device 51 and the air supply device 52) illustrated in FIG. 52, and the robot device 61 including the robot arm 62 and the robot hand 63 that are operated so as to perform at least the work of collecting, moving, and discharging the powder with a powder collector 10C being mounted to a pipe 35C of the powder collecting device 1D.

In the same manner as in the cases of the automatic powder collecting systems 6A and 6C according to the first and third embodiments, the automatic powder collecting system 6D illustrated in FIG. 52 is a system that can be used by being configured to perform the work of collecting a predetermined amount of the powders 9A to 9C accommodated in the plurality of first containers 90A to 90C and then transferring the collected powders 9A to 9C to each of the plurality of other second containers 95A to 95E.

Further, the automatic powder collecting system 6D illustrated in FIG. 52 is different from the automatic powder collecting system 6C according to the third embodiment (see FIG. 32) in that the mounting and dismounting work part 77 is not adopted while the powder collecting device 1D using the powder collector 10C and a fourth holder portion 74 configured to hold a portion 10f of the powder collector 10C are adopted. However, the automatic powder collecting system 6D has the same configuration as that of the automatic powder collecting system 6C in the other portions. The portion 10f of the powder collector 10C is a remaining portion before the collecting part 14 is mounted.

<Configuration of Powder Collecting Device>

As illustrated in FIG. 52 and the like, the powder collecting device 1D is a device at least including the pipe 35C for air intake and air supply including the connected part 56, and a plurality of powder collectors 10C, which are used by being removably mounted to the pipe 35C and are configured to collect powder through use of a suction force caused by air intake from the pipe 35C and discharge the collected powder through use of a discharge force caused by air supply from the pipe 35C. In FIG. 52, only one of the plurality of powder collectors 10C is illustrated for convenience.

The powder collecting device 1D is different from the powder collecting device 1C according to the third embodiment (see FIG. 28, FIG. 30, and the like) according to the third embodiment in that the powder collector is changed to the powder collector 10C including only the first filter part 15 as described later and in that the powder collector 10C and the pipe 35C are not removably connected to each other.

Further, powder handled by the powder collecting device 1D (powder collector 10C) is the same as the powder handled by the powder collecting device 1A (powder collector 10A) according to the first embodiment, but may be different therefrom.

<Configuration of Powder Collector>

Figure 53:
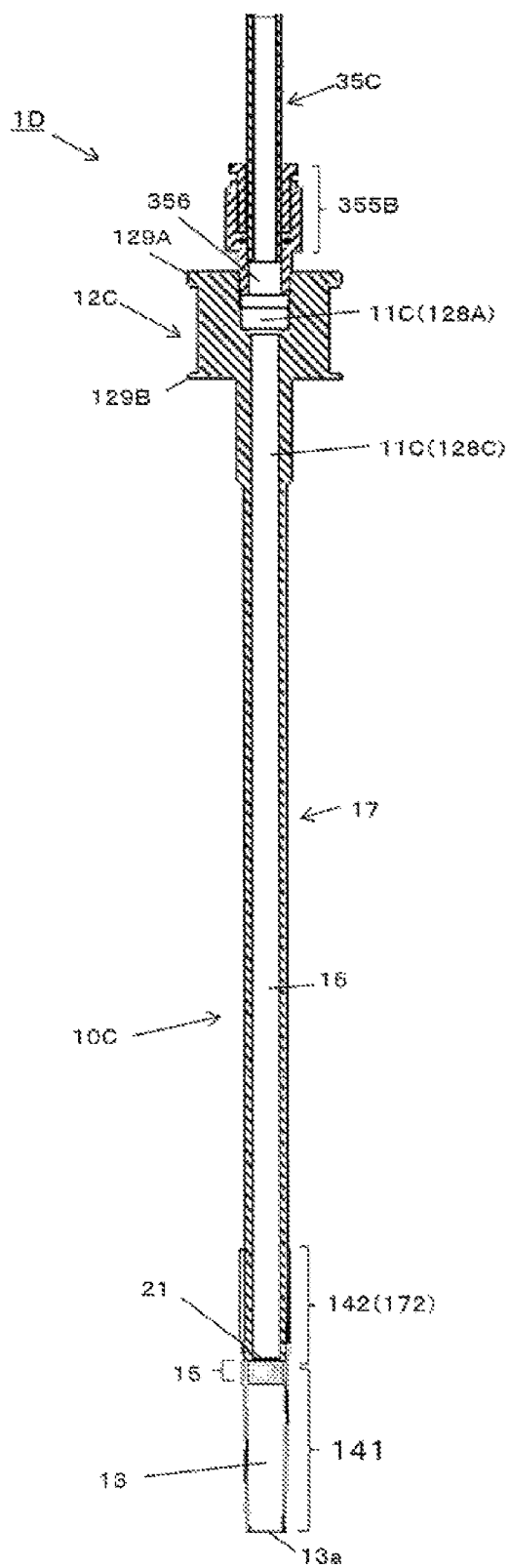
FIG. 53 is a schematic sectional view for illustrating a pipe and a powder collector in the powder collecting device of FIG. 52.

As illustrated in FIG. 52, FIG. 53, and the like, the powder collector 10C includes a connecting part 12C, the collecting part 14, the first filter part 15, and the relay part 17. The connecting part 12C is mounted to the pipe 35C, and has an air passage 11 to be connected to the pipe 35C. The collecting part 14 has the air passage 13 in which powder is collected to be kept through use of the above-mentioned suction force reaching the air passage 13 of the collecting part 14 through the air passage 11C of the connecting part 12C. The first filter part 15 is arranged at a midway position of the air passage 13 of the collecting part 14, and is configured to block passage of the powder to be collected. The relaying part 17 has the air passage 16 connecting the air passage 11C of the connecting part 12B and the collecting part 14 to each other.

The powder collector 10C is different from the powder collectors 10A and 10B according to the first to third embodiments (see FIG. 1, FIG. 6, FIG. 29, and the like) in that the second filter part 18 is not adopted and in that a removable connection system is not adopted in connection to the supports 30A and 30B or the pipe 35C. However, the powder collector 10C has the same configuration as that of each of the powder collectors 10A and 10B in the other main portions, that is, the collecting part 14, the first filter part 15, and the relaying part 17.

Further, in the same manner as in the case of the powder collector 10B according to the third embodiment, the powder collector 10C does not adopt the connecting pipe 25 for adaptation (see FIG. 5, FIG. 6, and the like), and hence the collecting part 14 is directly and removably mounted to the lower end portion 172 of the relaying part 17.

The connecting part 12C is a site to be located mainly on an upper end side at a time of use of the powder collector 10C.

As illustrated in FIG. 52, FIG. 53, and the like, the connecting part 12C in the fourth embodiment is formed of a columnar structure and has, as the air passage 11C, a two-stage through hole 128 penetrating through the connecting part 12C vertically in a center portion. The two-stage through hole 128 includes a large-diameter through hole 128A, which is arranged on an upper side and used for connection to the pipe 35C, and a small-diameter through hole 128B, which is arranged on a lower side and used for connection to the relaying part 17.

Further, the connecting part 12C includes two flange portions 129A and 129B arranged on an outer peripheral surface of the columnar structure at a required distance in the vertical direction, and an outer peripheral surface portion between the two flange portions 129A and 129B is formed as a site 130 to be gripped and held by (the grip part 621 of) the robot hand 53.

The pipe 35C has the pipe coupling member 355B mounted to an end portion on a side connected to the powder collector 10C.

The pipe coupling member 355B is a tubular member having a through hole 356 penetrating therethrough in the vertical direction in a center portion, and one end portion of the pipe 35C is fitted in and fixed to the through hole 356. Further, the pipe coupling member 355 has a lower end portion which is fitted in and fixed to the large-diameter through hole 128A in the connecting part 12C of the powder collector 10C through use of means such as a screw thread.

As illustrated in FIG. 52, the powder collecting device 1D includes the air intake device 51, which is connected to the pipe 35C and is configured to perform air intake, and the air supply device 52, which is connected to the pipe 35C and is configured to perform air supply.

The configurations regarding the air intake device 51 and the air supply device 52 (including the open/close valves 513 and 523, the connecting pipe 55, and the like) are the same as those regarding the air intake device 51 and the air supply device 52 in the first embodiment.

<Operation (Work) of Automatic Powder Collecting System>

The automatic powder collecting system 6D illustrated in FIG. 51 is operated as described below. The operation in this case is performed by the control of the above-mentioned control unit 65 in the same manner as in the cases of the automatic powder collecting systems according to the first and third embodiments.

Figure 54:
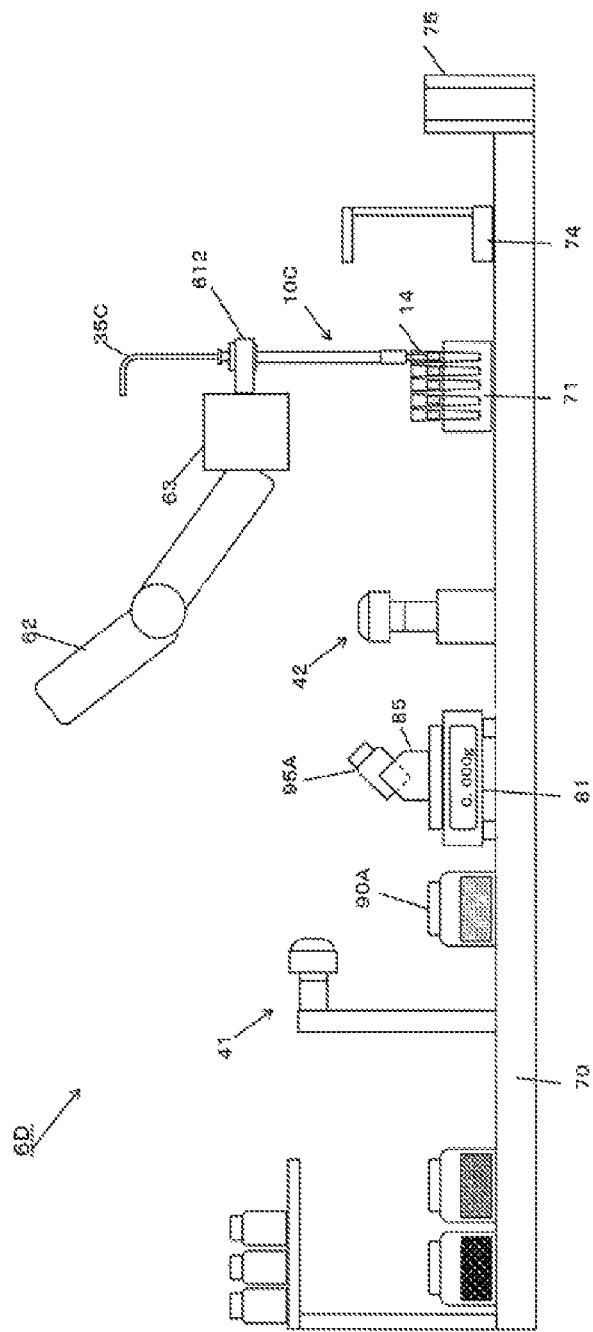
FIG. 54 is an explanatory view for illustrating an operation state at a time when the work of mounting the collecting part to a part of the powder collector is performed in the automatic powder collecting system of FIG. 51.

First, as illustrated in FIG. 54, the automatic powder collecting system 6D performs the work of moving the first container 90A in which the powder 9A to be collected is accommodated to a collection work position, and the work of placing the second container 95A configured to accommodate the collected powder 9A for transfer on the container mounting base 85 on the measuring platform 811 of the scale 81 by operating the robot arm 62 and the robot hand 63 of the robot device 61.

With the above-mentioned work, preliminary preparation for performing the work of collecting the first powder 9A and the like is completed.

Subsequently, as illustrated in FIG. 54, through operation of the robot device 61, the automatic powder collecting system 6D performs the work of holding and removing the portion 10f of the powder collector 10C under a state of being connected to the pipe 35C located in the fourth holder portion 74 and then mounting a first collecting part 14 (having the first filter part 15 arranged thereon) located in the first holder portion 71 on the lower end portion 172 of the relaying part 17 in the portion 10f of the powder collector 10C.

When the above-mentioned work is carried out, the automatic powder collecting system 6D is brought into a completed state as an automatic powder collecting system configured to perform the work of collecting the powder 9A and the like (FIG. 54).

Figure 55:
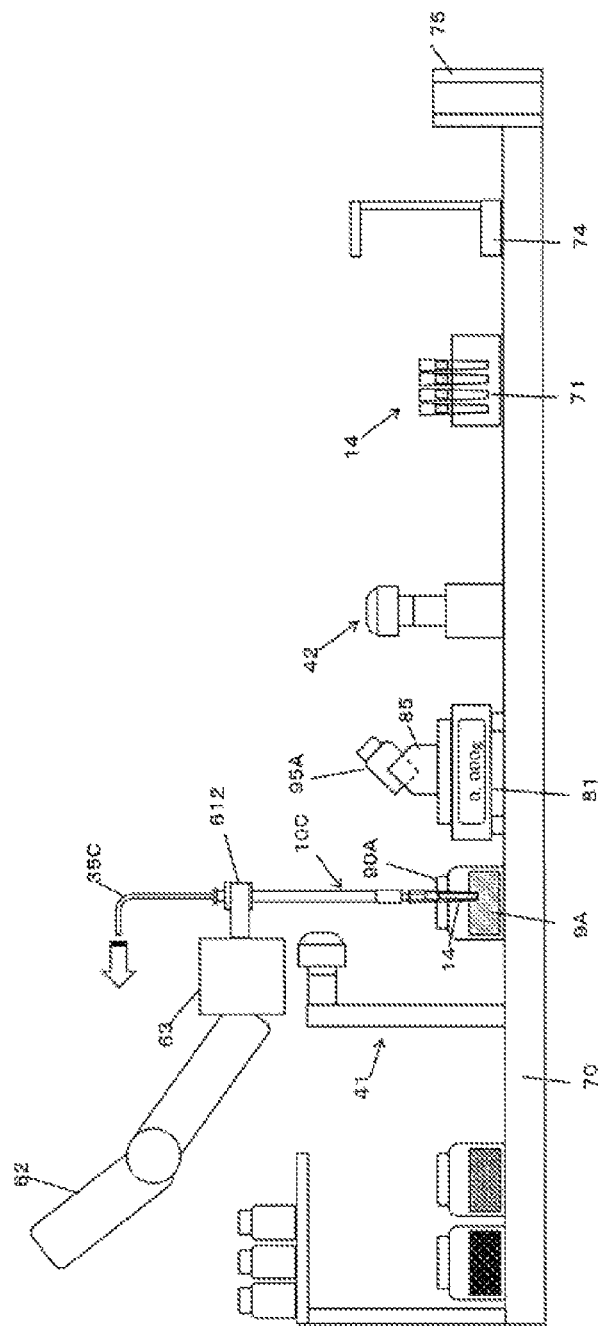
FIG. 55 is an explanatory view for illustrating an operation state at a time when the work of collecting the powder by the powder collector is performed in the automatic powder collecting system of FIG. 51.

As illustrated in FIG. 55, through operation of the robot device 61, the automatic powder collecting system 6D performs the work of collecting the powder 9A through use of the powder collector 10B (including the collecting part 14) held by the robot hand 63.

In this case, through operation of the robot arm 62 and the robot hand 63, the powder collector 10C is moved so that the collecting part 14 enters the first container 90A, and the lower end opening 13a of the collecting part 14 is brought close to a surface of an accumulation of the powder 9A or inserted into a portion of the accumulation of the powder 9A. Further, when the movement of the powder collector 10C is finished, the air intake operation by the air intake device 51 is started.

With this, the powder collector 10C generates the suction force (F1) in the air passage 13 of the collecting part 14 through air intake action by the air intake device 51, and the powder 9A accommodated in the first container 90A is sucked and collected into the air passage 13.

The passage of the powder 9A collected in the collecting part 14 of the powder collector 10C is blocked by the first filter part 15 arranged in the collecting part 14. Therefore, the collected powder 9A is prevented from flowing and moving to the other air passages 16 and 11C located on an inner side with respect to the first filter part 15 or from flowing and moving to the pipe 35C and the connecting pipe 55 side located beyond the powder collector 10C.

Figure 56:
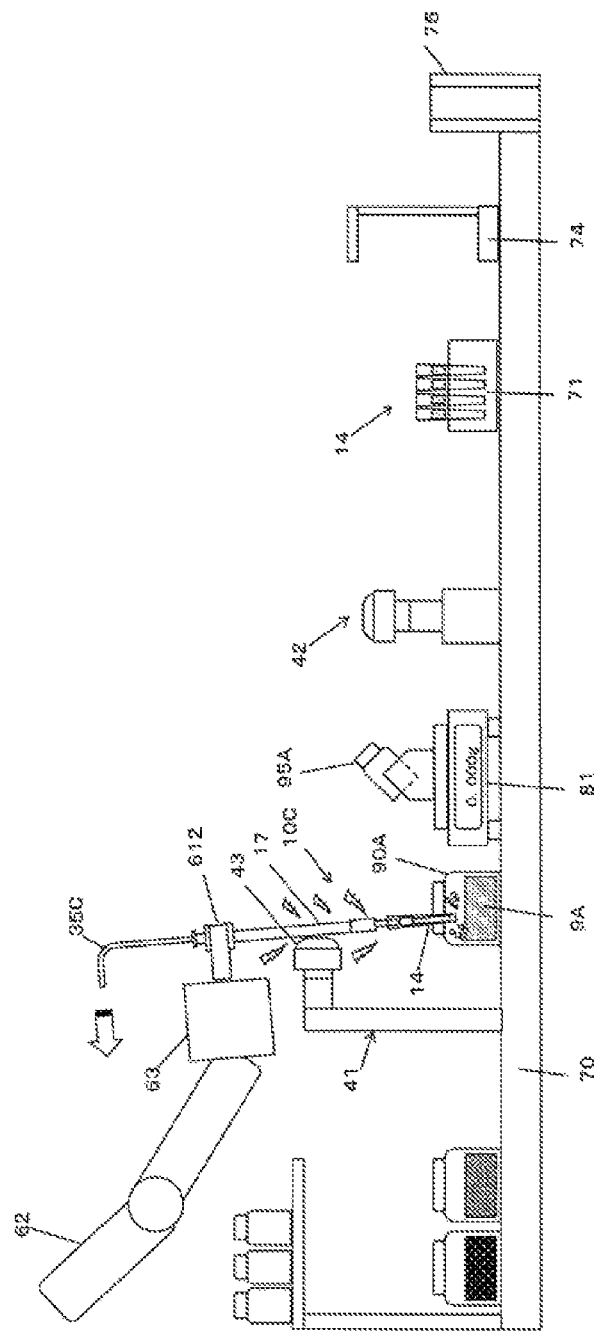
FIG. 56 is an explanatory view for illustrating an operation state at a time when the work of shaking off the powder by applying vibration to the powder collector after collection of the powder is performed in the automatic powder collecting system of FIG. 51.

Subsequently, as illustrated in FIG. 56, the automatic powder collecting system 6D performs the work of shaking off the unnecessary powder 9A adhering to an outer peripheral surface of the collecting part 14 in the powder collector 10C after collection of the powder 9A is completed.

In this case, through operation of the robot arm 62, the powder collector 10C is slightly raised so that the lower end opening 13a of the collecting part 14 is separated from the accumulation surface of the powder 9A in the first container 90A. Further, through operation of the robot arm 62, the powder collector 100 is moved so that the relaying part 17 that is a part of the powder collector 10C is brought into contact with the vibration applying portion 43 in the first vibration applying device 41, and thereafter, the first vibration applying device 41 is operated.

With this, in the powder collector 10C having completed collection of the powder 9A, the unnecessary powder 9A adhering to the outer peripheral surface of the collecting part 14 is shaken off to be removed by vibration. Further, the powder 9A that has been shaken off is returned into the first container 90A.

Figure 57:
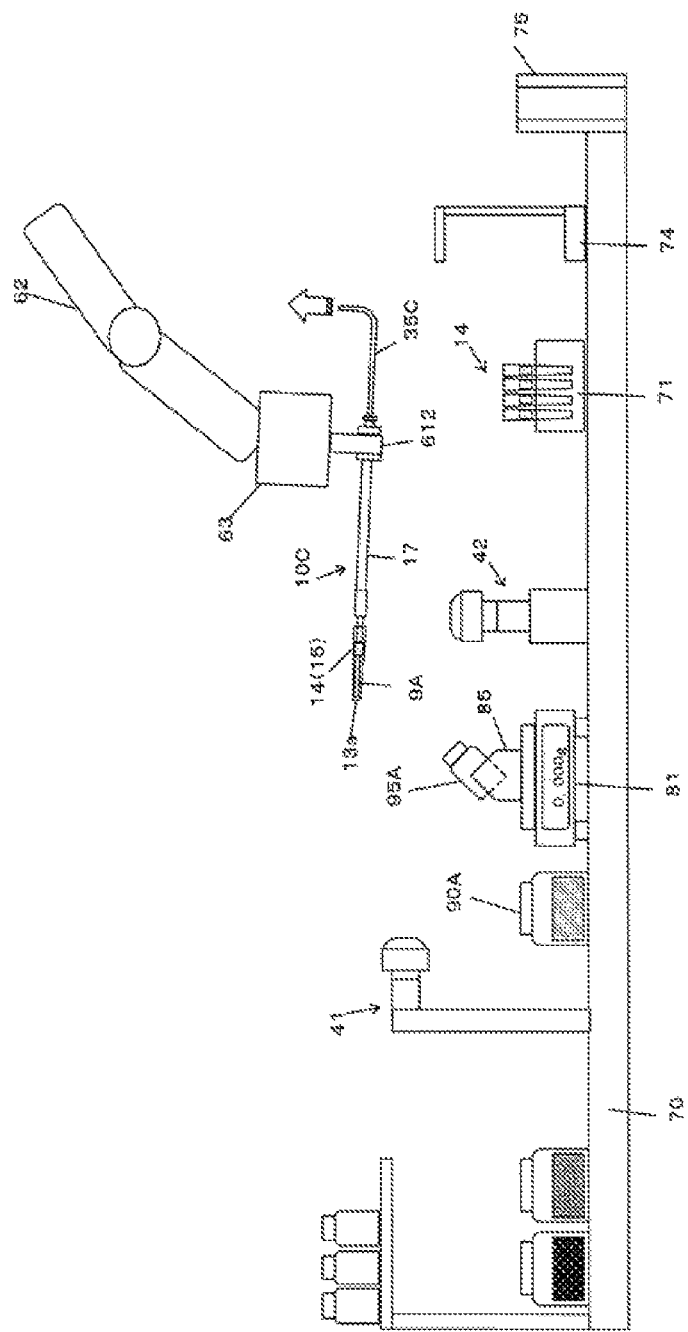
FIG. 57 is an explanatory view for illustrating a held state of the powder collector after the work of collecting the powder is finished in the automatic powder collecting system of FIG. 51.
Figure 58:
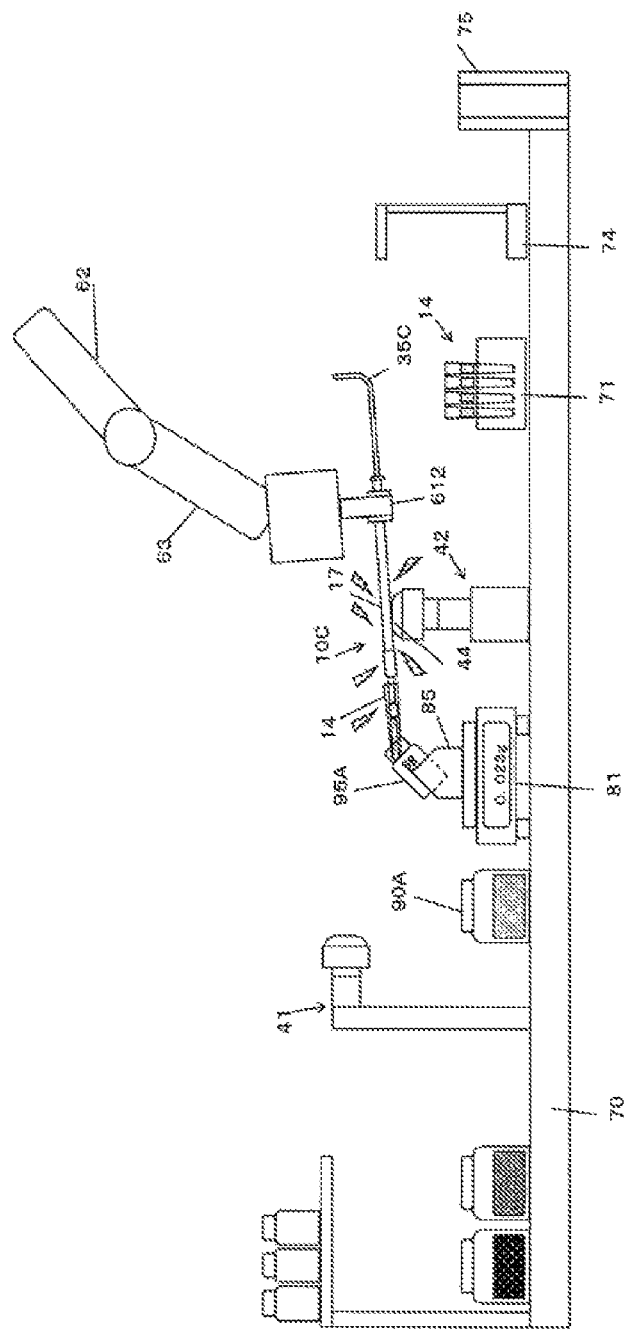
FIG. 58 is an explanatory view for illustrating an operation state at a time when the work of discharging the collected powder is performed in the automatic powder collecting system of FIG. 51.

As illustrated in FIG. 57, the automatic powder collecting system 6D is configured to perform, after completing the work of collecting the powder 9A and shaking off the powder 9A by vibration, the work of holding the powder collector 10C held by the robot hand 63 so that the collecting part 14 is laid down and further moving and discharging the powder 9A while the powder collector 10C is held in this state through operation of the robot device 61 (FIG. 57 and FIG. 58). The content of each operation in this case is the same as that of each operation in the automatic powder collecting system 6C according to the third embodiment (FIG. 42 to FIG. 44).

For example, as illustrated in FIG. 58 and the like, the robot arm 62 and the robot hand 63 move the powder collector 10C under a state in which the entire powder collector 10C is laid down substantially horizontally so that the collecting part 14 enters the second container 95A from the inclined upper end opening 96 of the second container 95A and so that the relaying part 17 that is a part of the powder collector 10C is brought into contact with the vibration applying portion 44 in the second vibration applying device 42.

Further, as illustrated in FIG. 58, the work of discharging the powder 9A is performed by operating the second vibration applying device 42 to vibrate the powder collector 10B when the movement of the powder collector 10B to the discharge work position is finished. In this case, in principle, the air supply operation by the air supply device 52 and the air intake operation by the air intake device 51 are not performed as well as in the case of the automatic powder collecting system 6C according to the third embodiment.

Figure 59:
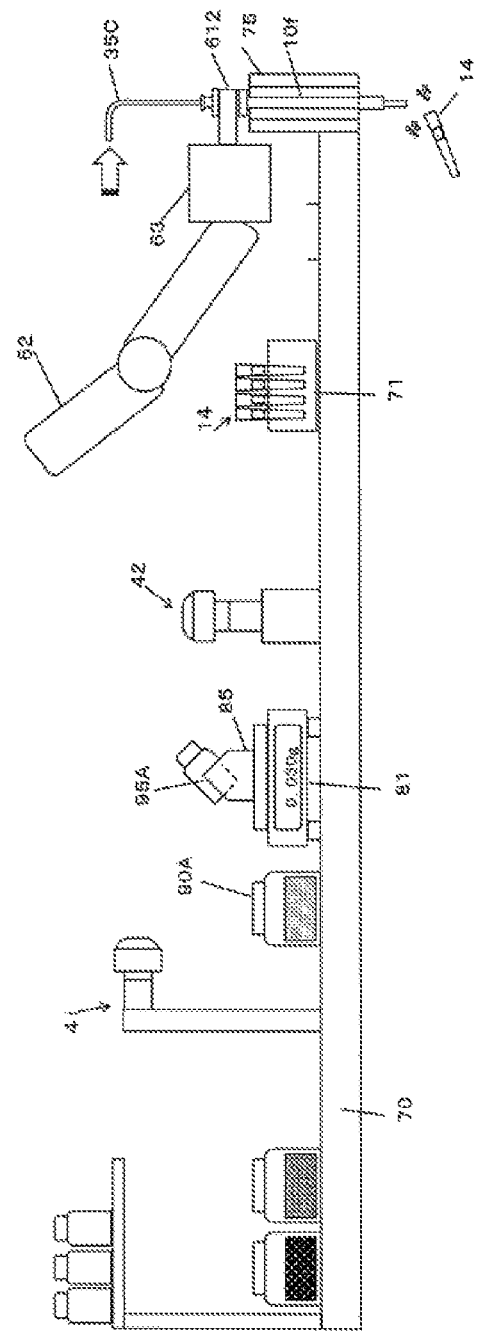
FIG. 59 is an explanatory view for illustrating an operation state of the work of removing the collecting part from the used powder collector and cleaning the collecting part in the automatic powder collecting system of FIG. 51.

After all the operations (work operations illustrated in FIG. 55 to FIG. 58) involving the work of collecting, moving, and discharging the powder 9A are finished, the automatic powder collecting system 6D moves the used powder collector 10C to the cleaning position of the cleaning treatment portion 75 through operation of the robot device 61 as illustrated in FIG. 59.

After that, in the cleaning treatment portion 75, the work of removing the used collecting part 14 from the powder collector 10C, and the work of cleaning the portion 10f of the powder collector 10C after the collecting part 14 is removed are performed.

The content of each operation in this case is the same as that of each operation in the automatic powder collecting system 6C according to the third embodiment (FIG. 45).

Further, when the work of collecting the subsequent powder 9B of a different kind and the like are performed, the automatic powder collecting system 6D is operated as described below.

Figure 60:
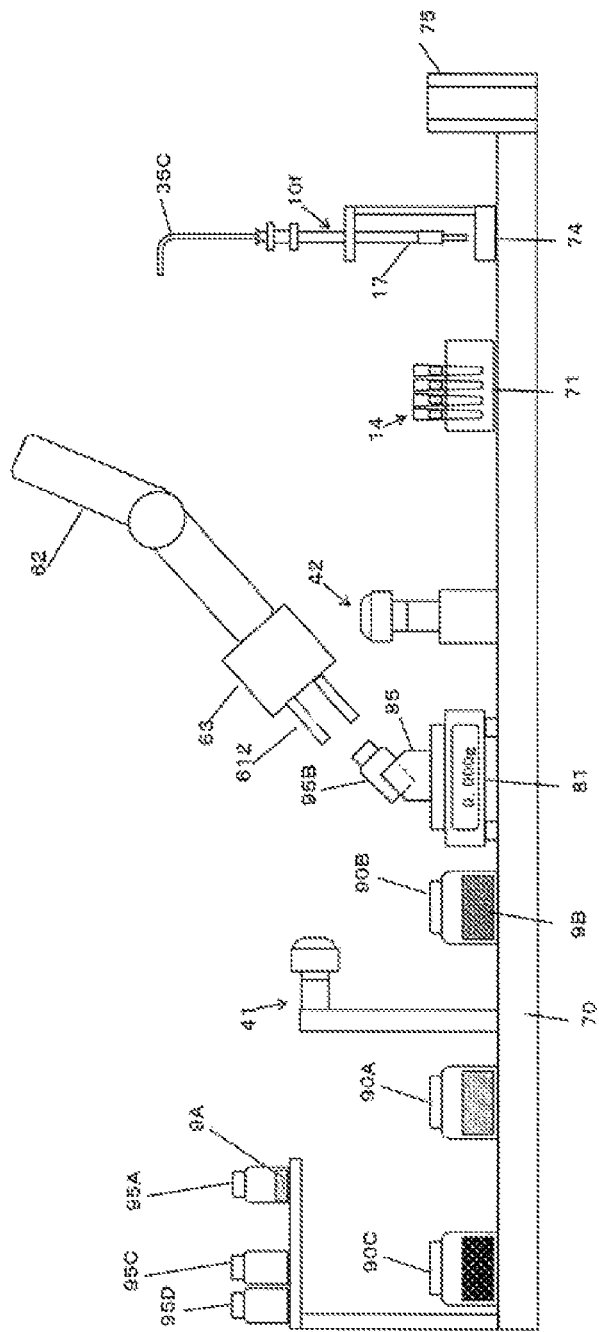
FIG. 60 is an explanatory view for illustrating an operation state in a preparation stage before the work of returning the part of the used powder collector having been cleaned to a holder and the work of collecting subsequent powder of a different kind and the like are performed in the automatic powder collecting system of FIG. 51.

First, as illustrated in FIG. 60, the automatic powder collecting system 6C performs the work of returning the portion 10f of the used powder collector 10C having been cleaned to the fourth holder portion 74 through operation of the robot device 61.

Figure 61:
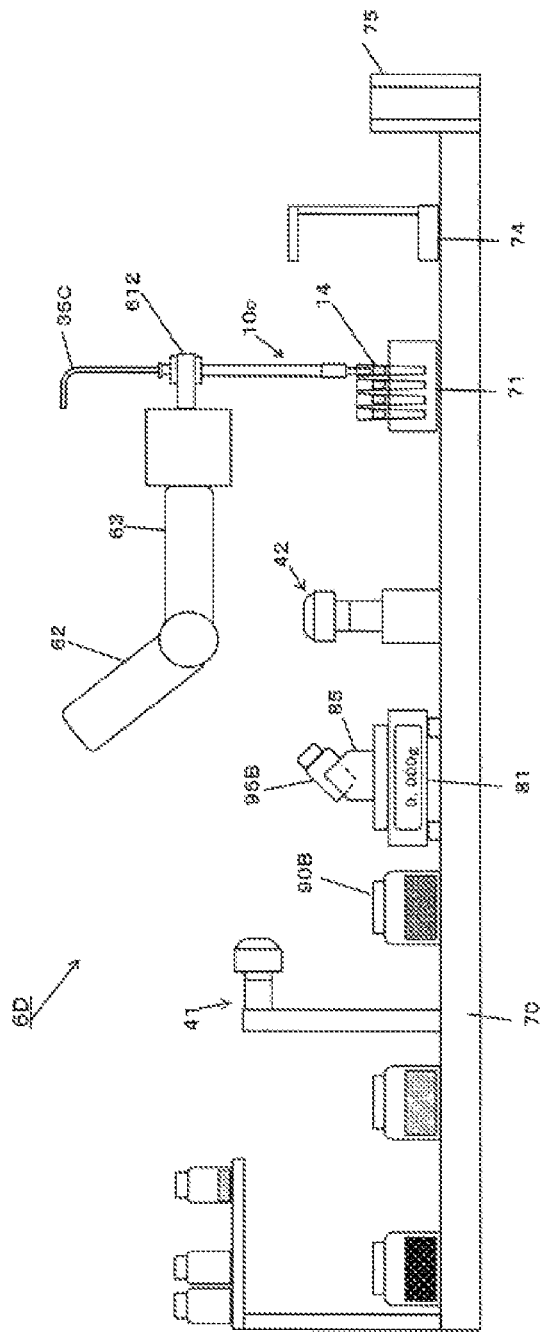
FIG. 61 is an explanatory view for illustrating an operation state at a time when the work of mounting a new collecting part to the part of the powder collector is performed in the automatic powder collecting system of FIG. 60.

After that, as illustrated in FIG. 61, through operation of the robot arm 62 and the robot hand 63, the automatic powder collecting system 6D performs the work of returning the first container 90A which has handled the powder previously and the second container 95A in which the powder 9A is transferred to be accommodated to original positions, the work of moving the first container 90B in which the subsequent powder 9B is accommodated to the collection work position, and the work of placing the second container 95B configured to accommodate the subsequent powder 9B for transfer on the container mounting base 85 located on the measuring platform 811 of the scale 81.

Subsequently, as illustrated in FIG. 61, through operation of the robot arm 62 and the robot hand 63, the automatic powder collecting system 6D performs the work of mounting a new second collecting part 14 (having the first filter part 15 arranged thereon) located in the first holder portion 71 on the portion 10f of the powder collector 10C left to be connected to the pipe 35C.

In the automatic powder collecting system 6D, through use of the powder collector 10C having the new collecting part 14 mounted thereto by replacement, the previous powder 9A remaining on and adhering to the collecting part 14 and the first filter part 15 is prevented from being mixed in the second container 95B in the work of collecting and discharging the powder 9B to be subsequently handled and the like, for example, unlike the case of re-using the collecting part 14 and the first filter part 15 having been used in the work of collecting the previous powder 9A and the like.

Thus, in the automatic powder collecting system 6D, when the work of collecting and discharging each powder of a different kind (for example, the powder 9B) and the like are performed, mixing of a foreign matter (for example, the powder 9A) is prevented or suppressed.

When the above-mentioned work is carried out, the automatic powder collecting system 6D is brought into a completed state as an automatic powder collecting system configured to perform the work of collecting the powder 9B and the like (FIG. 61).

Figure 62:
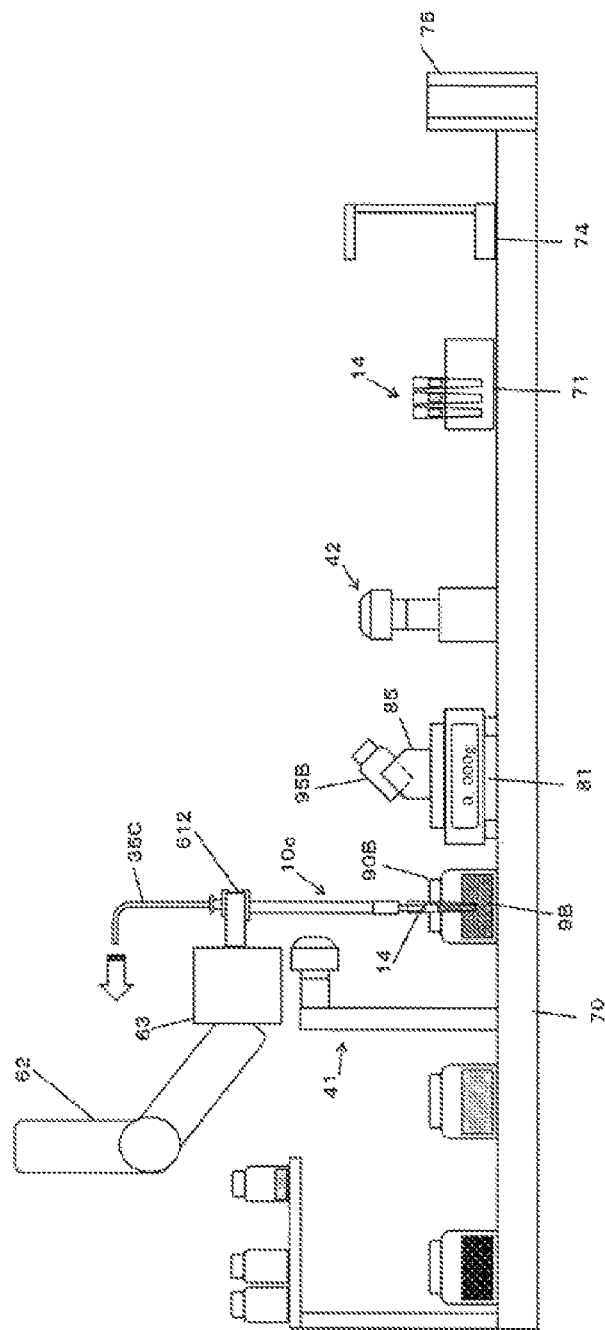
FIG. 62 is an explanatory view for illustrating an operation state at a time when the work of collecting each powder of a different kind by the powder collector is performed in the automatic powder collecting system of FIG. 60.

After that, as illustrated in FIG. 62, the automatic powder collecting system 6D performs the work of collecting the powder 9B accommodated in the first container 90B with a new powder collector 10C (powder collector including the portion 10f of the powder collector and the new collecting part 14) held by the robot hand 63.

The subsequent operations are performed in the same manner as in each of the operations during the above-mentioned work of collecting, moving, discharging, and cleaning the powder 9A and the like.

As described above, in the automatic powder collecting system 6D including the powder collecting device 1D using the powder collector 10C and the like, the work of collecting powder and the like and the work of collecting each powder 9 of a different kind and the like can be efficiently performed by automation with a simple configuration. Further, in the automatic powder collecting system 6D, the work of collecting each powder 9 of a different kind and the like can be performed efficiently (or performed automatically, efficiently, and stably) while mixing of a foreign matter such as another kind of powder is easily suppressed in substantially the same manner as in the cases of the automatic powder collecting systems 6A and 6C according to the first and third embodiments.

Further, also in the automatic powder collecting system 6D, even when it is required to perform the work of collecting powder harmful for human bodies and the like, a human is not involved in the work, and hence the work can be automatically and efficiently performed by automation without arising concerns about adverse effects on human bodies in the same manner as in the case of the automatic powder collecting systems 6A and 6C according to the first and third embodiments.

<Modification Example of Automatic Powder Collecting System>

The automatic powder collecting system 6D according to the fourth embodiment can be changed in a part of the configuration as exemplified below.

For example, the automatic powder collecting system 6D may adopt the connection system between the pipe 35B and the powder collector 10B in the powder collecting device 1C according to the third embodiment (see FIG. 29 and FIG. 30) in place of the connection system between the pipe 35C and the powder collector 10C in the powder collecting device 1D (see FIG. 52 and the like). That is, the connection system between the pipe 35C and the powder collector 100 can also be changed to a system in which the pipe 35C and the powder collector 10C are removably connected to each other with the one-touch mounting and dismounting joint (57).

In this case, in the automatic powder collecting system 6D, it is only required to adopt the pipe 35B, the second holder portion 72 in which the portion 10d of the powder collector 10B and the like are set, and the mounting and dismounting work part 77 used in the automatic powder collecting system 6C according to the third embodiment (see FIG. 33 and the like) be adopted.

Further, the automatic powder collecting system 6D may have the following configuration. There is arranged a third vibration applying device configured to apply vibration to the powder collector 10C moved to a cleaning position such as the cleaning treatment portion 75 by being brought into contact with a part of the powder collector 10C, and vibration is applied to the powder collector 10C in this case by the third vibration applying device. Powder adhering to the used powder collector 10C can be easily removed by performing the vibration applying treatment together with the cleaning treatment.

Further, the automatic powder collecting system 6D can also have the following configuration. There is arranged a diselectrifying device configured to diselectrify (remove static electricity and charge of) the powder collector 10C moved to the cleaning position such as the cleaning treatment portion 75 is arranged, and the powder collector 10C in this case is diselectrified by the diselectrifying device. Powder adhering to the used powder collector 10C through static electricity can be easily removed by performing the diselectrifying treatment together with the cleaning treatment.

The automatic powder collecting system 6D can also have the following configuration. The third vibration applying device and the diselectrifying device are both arranged, and the vibration applying treatment and the diselectrifying treatment are performed together when the used powder collector 10C is cleaned.

Other Embodiments

In the first to third embodiments, as the powder collectors 10A and 10B, description is given of the configuration example in which the second filter part 18 is arranged in the upper end portion of the relaying part 17 (through intermediation of the storage container 180). However, as a configuration of each of the powder collectors 10A and 10B, the second filter part 18 may be arranged at a midway position of the relaying part 17.

Further, in the first to third embodiments, as the second filter part 18 in each of the powder collectors 10A and 10B, description is given of the configuration example in which the second filter member 23 is stored in the storage container 180 having a structure of a combination of the container upper portion 181 formed in the lower end portion of the connecting part 12 and the container lower portion 183 formed in the upper end portion of the relaying part 17. However, the second filter part 18 having the following configuration may be adopted.

For example, when there is a filter structure in which the second filter member 23 is accommodated in advance in a container (accommodating case) such as the storage container 180, without providing the storage container 180, there may be employed the second filter part 18 having a configuration in which filter structure is mounted to the lower end portion of the connecting part 12 and the upper end portion of the relaying part 17 directly or through intermediation of a connecting pipe for mounting. Further, for example, there may be employed the second filter part 18 having a configuration in which the second filter member 23 is set directly in the air passage 16 of the relaying part 17 without being stored in the storage container 180.

Further, in the first and second embodiments, as the connecting part 12 in the powder collector 10A, description is given of the configuration example in which the connecting part 12 is removably mounted to the mounting part 33 of the support 30 by magnetic force. However, the connecting part 12 (and the mounting part 33) adopting other mounting and dismounting means, for example, fixing means using a screw (screw thread) may be adopted. Further, in the first to fourth embodiments, as the collecting part 14 in the powder collector 10A, there is exemplified the collecting part 14 that is used by being removably mounted to the relaying part 17 directly or through intermediation of the connecting pipe 25 for adaptation. However, the collecting part 14, which is fixed to the relaying part 17 and cannot be replaced, may be adopted.

Besides, as the supports 30A and 30B in the powder collecting devices 1A and 1B, a configuration in which the vibration device 37 is not provided may be adopted. When it is required to shaken off excessive powder in the powder collector 10A by vibration and to perform auxiliary discharge or small amount discharge of the collected powder from the powder collector 10A through use of the vibration, it is preferred that the supports 30A and 30B each including the vibration device 37 be employed.

Further, as the powder collecting devices 1A, 1C, and 1D and the automatic powder collecting systems 6A, 6C, and 6D, there may be adopted a configuration in which a water supply device 53 configured to supply water for cleaning to the powder collector 10 through the pipe 35 of the support 30 is added.

In FIG. 3, FIG. 8, FIG. 26, FIG. 30, and FIG. 52, there are illustrated the configuration in which the water supply device 53 is connected to the pipe 35 of the support 30 and the independent pipes 35B and 35C through intermediation of the connecting pipe 55, and the configuration in which an open/close valve 533 is provided at a midway position of the connecting pipe 55. Further, in FIG. 7, there is illustrated the configuration in which a drive control part 535 for a water supply device configured to control the drive of the water supply device 53 is added to be connected to the control unit 65 of the system 6.

When the water supply device 53 is added, in the case of cleaning a part of each powder collector 10 after the used collecting part 14 is removed, water is supplied from the water supply device 53 to the part of the powder collector 10 (leftward black solid arrow in FIG. 8, FIG. 31, and the like) to cause a cleaning force M1 of the water to act on the part of the powder collector 10, and thus the air passage and the like can be cleaned.

REFERENCE SIGNS LIST 1A, 1B, 1C . . . powder collecting device
5A, 5C, 5D . . . system component of automatic powder collecting system
6A, 6B, 6C, 6D . . . automatic powder collecting system
9 . . . powder
10A, 10B, 10C . . . powder collector
11, 13, 16, 26 . . . air passage
12 . . . connecting part
14 . . . collecting part
15 . . . first filter part
17 . . . relaying part
18 . . . second filter part
25 . . . connecting pipe for adaptation
30A, 30B . . . support
31 . . . body portion
35 . . . pipe
36 . . . magnet
40 . . . auxiliary vibration member
41 . . . first vibration applying device
42 . . . second vibration applying device
51 . . . air intake device
52 . . . air supply device
61 . . . robot device
62 . . . robot arm
63 . . . robot hand
95 . . . second container
96 . . . upper end opening

The invention claimed is:

1. An automatic powder collecting system, comprising:
a powder collecting device including:
   a pipe for sucking air and supplying air including a connected part; and
   a plurality of powder collectors, which are used by being mounted to the pipe;
an air sucker, which is connected to the pipe of the powder collecting device, and is configured to suck air;
an air supplier, which is connected to the pipe of the powder collecting device, and is configured to perform air supply;
a robot device including a robot arm and a robot hand that are operated so as to perform at least work of collecting, moving, and discharging the powder with the powder collector being mounted through intermediation of the pipe of the powder collecting device; and
a first vibrator configured to apply vibration to the powder collector by being brought into contact with a part of the powder collector when the work of collecting the powder is finished,
the powder collector including:
   a connector having an air passage to be connected to the pipe;
   a powder holder having an air passage in which powder is collected to be kept through use of a suction force caused by sucking air from the pipe reaching the air passage of the powder holder through the air passage of the connector and from which the collected powder is discharged through use of a discharge force caused by air supply from the pipe;
   a connecting pipe having an air passage connecting the air passage of the connector and the air passage of the powder holder to each other; and
   a filter part, which is arranged at a predetermined position of the air passage of the powder holder, and is configured to block passage of the powder to be collected,
wherein the automatic powder collecting system is configured so that, when the work of collecting the powder is finished, the robot arm and the robot hand of the robot device move the powder collector to a position at which the part of the powder collector is brought into contact with the first vibrator, and the first vibrator applies vibration to the powder collector, and
wherein the robot device is configured to cause the robot arm and the robot hand to hold the powder collector so that the powder holder is laid down after the work of collecting the powder is finished and to perform the work of moving and discharging the powder while holding the powder collector under a state in which the powder holder is laid down.

2. An automatic powder collecting system, comprising:
a powder collecting device including:
   a pipe for sucking air and supplying air including a connected part; and
   a plurality of powder collectors, which are used by being mounted to the pipe;
an air sucker, which is connected to the pipe of the powder collecting device, and is configured to suck air;
an air supplier, which is connected to the pipe of the powder collecting device, and is configured to perform air supply;
a robot device including a robot arm and a robot hand that are operated so as to perform at least work of collecting, moving, and discharging the powder with the powder collector being mounted through intermediation of the pipe of the powder collecting device; and
a second vibrator configured to apply vibration to the powder collector by being brought into contact with a part of the powder collector when the work of discharging the powder is performed,
the powder collector including:
   a connector having an air passage to be connected to the pipe;
   a powder holder having an air passage in which powder is collected to be kept through use of a suction force caused by sucking air from the pipe reaching the air passage of the powder holder through the air passage of the connector and from which the collected powder is discharged through use of a discharge force caused by air supply from the pipe;
   a connecting pipe having an air passage connecting the air passage of the connector and the air passage of the powder holder to each other; and
   a filter part, which is arranged at a predetermined position of the air passage of the powder holder and is configured to block passage of the powder to be collected,
wherein the automatic powder collecting system is configured so that, when the work of discharging the powder is performed, the robot arm and the robot hand of the robot device move the powder collector to a position at which the part of the powder collector is brought into contact with the second vibrator, and the second vibrator applies vibration to the powder collector, and
wherein the robot device is configured to cause the robot arm and the robot hand to hold the powder collector so that the powder holder is laid down after the work of collecting the powder is finished and to perform the work of moving and discharging the powder while holding the powder collector under a state in which the powder holder is laid down.

3. An automatic powder collecting system according to claim 1 or 2,
- wherein a container which is configured to take in the powder discharged from the powder collector through an upper end opening and accommodate the powder is set so that the upper end opening is inclined, and
- wherein, when the work of discharging the powder is performed, the robot arm and the robot hand of the robot device move the powder collector so that the powder holder enters the container from the upper end opening under a state of being inclined.

4. An automatic powder collecting system according to claim 1 or 2,
- wherein the robot device is configured to cause the robot arm and the robot hand to move the powder collector to a cleaning position, directly or after the powder holder is removed, to perform work of cleaning, and
- wherein the air supplier is configured to supply air to the powder collector having moved to the cleaning position.

5. An automatic powder collecting system according to claim 1 or 2, wherein the robot device is configured to cause the robot arm and the robot hand to perform work of replacing the powder holder in the powder collector.

\* \* \* \* \*